United States Patent
Killoran, Jr. et al.

(10) Patent No.: US 12,438,862 B2
(45) Date of Patent: *Oct. 7, 2025

(54) EMAIL-BASED AUTHENTICATION FOR ACCOUNT LOGIN, ACCOUNT CREATION AND SECURITY FOR PASSWORDLESS TRANSACTIONS

(71) Applicant: SWOOP IP HOLDINGS LLC, Wilmington, DE (US)

(72) Inventors: John P. Killoran, Jr., Albuquerque, NM (US); Graham Bass, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/653,307

(22) Filed: May 2, 2024

(65) Prior Publication Data
US 2024/0283782 A1    Aug. 22, 2024

Related U.S. Application Data

(63) Continuation of application No. 16/649,127, filed as application No. PCT/US2018/051984 on Sep. 20, 2018, now Pat. No. 11,979,390.
(Continued)

(51) Int. Cl.
*G06Q 10/107*        (2023.01)
*G06F 16/245*        (2019.01)
(Continued)

(52) U.S. Cl.
CPC ............ *H04L 63/08* (2013.01); *G06F 16/245* (2019.01); *G06F 16/27* (2019.01); *G06Q 10/107* (2013.01);
(Continued)

(58) Field of Classification Search
CPC ..... H04L 63/08; H04L 51/42; H04L 61/4511; H04L 63/102; H04L 63/18; H04L 67/141; H04L 69/329; G06F 16/245; G06F 16/27
See application file for complete search history.

(56) References Cited

U.S. PATENT DOCUMENTS 6,101,485 A    8/2000    Fortenberry et al.
6,167,435 A    12/2000    Druckenmiller et al.
(Continued)

OTHER PUBLICATIONS

M. Kucherawy, RFC 7001. "Message Header Field for Indicating Message Authentication Status" Section 1.1 Purpose, pp. 4-5. Sep. 2013 (Year: 2013).*

*Primary Examiner* — Chris Parry
*Assistant Examiner* — Steven C Nguyen
(74) *Attorney, Agent, or Firm* — Volpe Koenig

(57) ABSTRACT

A system and method is disclosed for providing vendors an alternative to a password-based security system. The system and method also allows vendors to manage secure transactions by leveraging various message authentication techniques while allowing the vendor full control over related processes such as payment processing and fulfillment. The system and method also monitors message requests from customers for the vendor to guarantee that the communication has not been compromised. Consolidating the authentication of users to their messaging minimizes the need for each individual vendor to maintain their own password for access to a customer account. This eliminates the requirement that customers generate a password thus increasing convenience and decreasing security risks associated with the use of passwords. This decreases risk not only for customer and vendor but also decreases the risk exposure across the internet—as the system scales.

20 Claims, 40 Drawing Sheets

Related U.S. Application Data

(60) Provisional application No. 62/561,128, filed on Sep. 20, 2017, provisional application No. 62/561,127, filed on Sep. 20, 2017.

(51) Int. Cl.
  *G06F 16/27* (2019.01)
  *G06Q 30/018* (2023.01)
  *H04L 9/40* (2022.01)
  *H04L 51/42* (2022.01)
  *H04L 61/4511* (2022.01)
  *H04L 67/141* (2022.01)
  *H04L 69/329* (2022.01)

(52) U.S. Cl.
  CPC ......... *G06Q 30/0185* (2013.01); *H04L 51/42* (2022.05); *H04L 61/4511* (2022.05); *H04L 63/102* (2013.01); *H04L 63/18* (2013.01); *H04L 67/141* (2013.01); *H04L 69/329* (2013.01); *H04L 2463/082* (2013.01)

(56) References Cited

U.S. PATENT DOCUMENTS

| | | | |
|---|---|---|---|
| 8,538,845 B2 | 9/2013 | Liberty | |
| 8,606,703 B1 * | 12/2013 | Dorsey | G06Q 10/107 705/40 |
| 8,725,635 B2 | 5/2014 | Klein et al. | |
| 8,762,272 B1 * | 6/2014 | Cozens | G06Q 10/107 705/40 |
| 9,189,785 B2 | 11/2015 | Liberty et al. | |
| 9,208,488 B2 | 12/2015 | Liberty | |
| 9,378,491 B1 * | 6/2016 | Grassadonia | G06Q 10/107 |
| 9,892,386 B2 | 2/2018 | Liberty | |
| 10,395,223 B2 | 8/2019 | Muthu et al. | |
| 10,515,345 B2 | 12/2019 | Koh et al. | |
| 2006/0253335 A1 | 11/2006 | Keena et al. | |
| 2007/0255620 A1 | 11/2007 | Tumminaro et al. | |
| 2008/0052245 A1 | 2/2008 | Love | |
| 2009/0006233 A1 | 1/2009 | Chembtob | |
| 2009/0228340 A1 * | 9/2009 | Bohannon | G06Q 30/0217 709/204 |
| 2010/0070419 A1 | 3/2010 | Vadhri | |
| 2012/0130898 A1 | 5/2012 | Snyder et al. | |
| 2013/0273882 A1 * | 10/2013 | Walsh | G06Q 20/3267 455/407 |
| 2013/0333030 A1 * | 12/2013 | Farris | H04L 51/212 726/22 |
| 2013/0346302 A1 | 12/2013 | Purves | |
| 2014/0293832 A1 | 10/2014 | Parikh | |
| 2015/0058203 A1 | 2/2015 | Morozov | |
| 2015/0178819 A1 | 6/2015 | Kassemi | |
| 2016/0196539 A1 * | 7/2016 | Koh | G06Q 20/10 705/44 |
| 2016/0217454 A1 * | 7/2016 | Killoran, Jr. | G06Q 20/3821 |
| 2016/0321654 A1 * | 11/2016 | Lesavich | H04L 67/104 |
| 2017/0148011 A1 | 5/2017 | Killoran, Jr. et al. | |

* cited by examiner

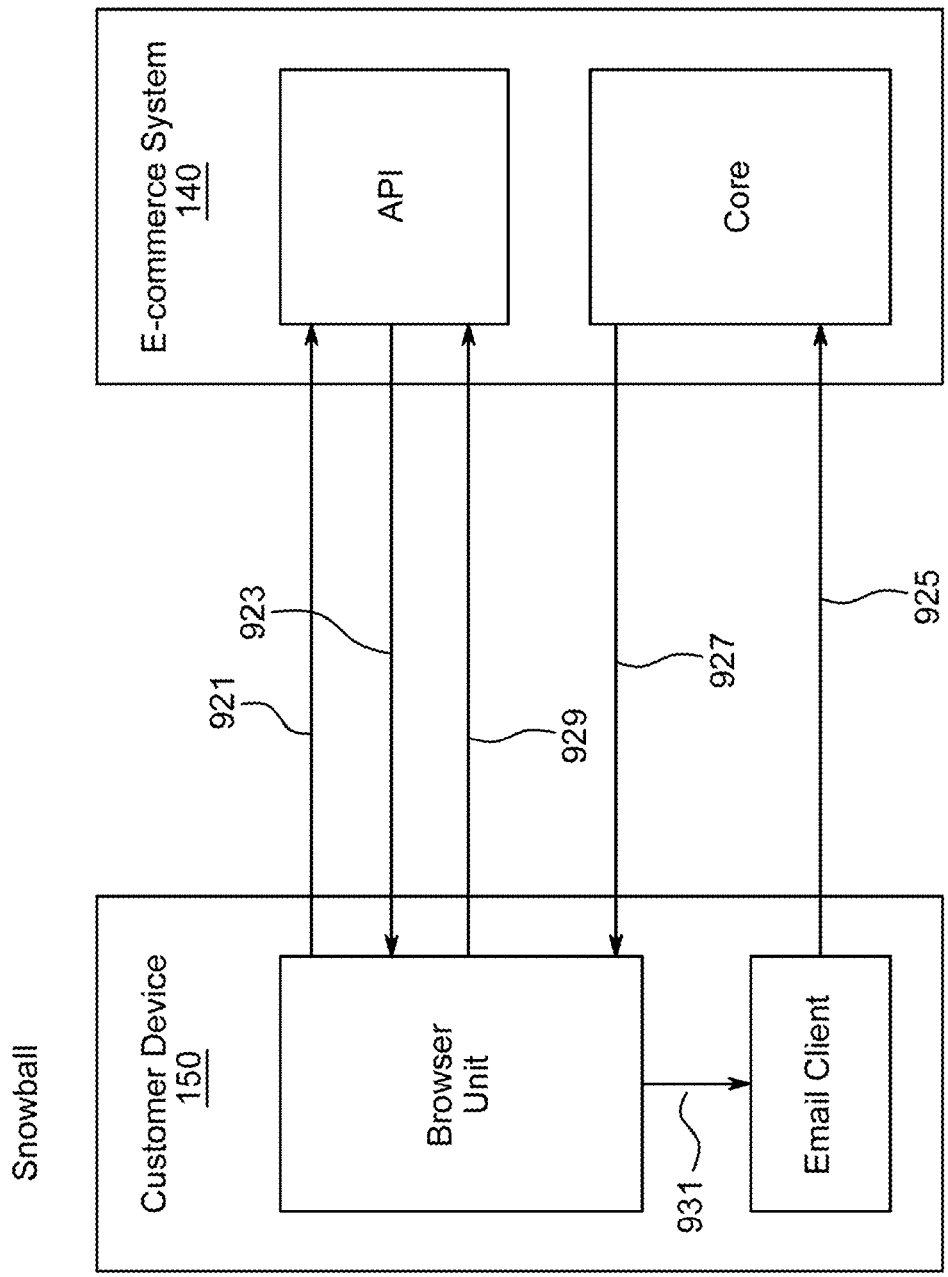

EMAIL-BASED AUTHENTICATION FOR ACCOUNT LOGIN, ACCOUNT CREATION AND SECURITY FOR PASSWORDLESS TRANSACTIONS

CROSS REFERENCE TO RELATED APPLICATIONS

This application is a continuation of U.S. patent application Ser. No. 16/649,127 filed Mar. 19, 2020, which is a 371 national phase application of PCT/US2018/051984 filed Sep. 20, 2018, which claims the benefit of U.S. Provisional Application No. 62/561,128 having a filing date of Sep. 20, 2017, and U.S. Provisional Application No. 62/561,127 having a filing date of Sep. 20, 2017, which are incorporated by reference as if fully set forth.

FIELD OF INVENTION

The present invention is related to electronic commerce and security systems. More particularly, the present invention is a system and method that facilitates electronic commerce and security by using email authentication to log in to secure accounts without a password.

BACKGROUND

In order to insure customer privacy and security, online vendors are required to provide their customers with password-secured accounts. These accounts depend upon the vendor to manage and secure customer information. The storage of customer passwords becomes a burdensome necessity for vendors. Furthermore, this exposes the vendor to undue security threats. Thus far there are no practical alternatives to this process.

In addition, standard web-based checkouts and logins are cumbersome and complicated to use. They require the customer to remember a password each time they wish to checkout or to login to an account. This is a source of major frustration and inefficiency and deters repeat purchases. It also creates security risks because customers engage in risky practices such as remaining logged in to their account.

Websites are excellent tools for a customer to login and access shopping carts, checkouts, and secure information. However, each new vendor requires the customer to generate password protected accounts if they wish to log in to their account, and therefore the customer is required to remember a password each time they log in. Mediums such as email, SMS, and social media represent environments which are secure and from which customers rarely log off.

A need exists for a system and method that enables vendors to provide secure access to private information and secure sensitive transactions by using the secure environment of email using authentication to increase security and streamline what is now a complex process for vendors and customers. The system and method may provide a customer with a web-based checkout or login feature while finalizing the checkout and login process through email authentication to streamline the process for the customer. The system and method may allow vendors the convenience of websites and shopping carts, while pairing the convenience of email, SMS, and social media based login.

SUMMARY

Vendors wishing to supply customers with secure accounts logins and transactions are burdened with the task of maintaining user identifications (IDs) and passwords for every customer account. A system and method is disclosed for providing vendors an alternative to a password-based security system. The system and method also allows vendors to manage secure transactions by leveraging various message authentication techniques while allowing the vendor full control over related processes such as secure login, payment processing and fulfillment. The system and method also monitors message requests from customers for the vendor to guarantee that the communication has not been compromised. Consolidating the authentication of users to their messaging minimizes the need for each individual vendor to maintain their own password for access to a customer account. This eliminates the requirement that customers generate a password thus increasing convenience and decreasing security risks associated with the use of passwords. This decreases risk not only for customer and vendor but also decreases the risk exposure across the internet—as the system scales.

Customers who choose not to use a password or require additional security along with a password choose email authentication to access secure accounts, place a greater dependence on the security of their email account to insure secure transactions. In this environment, the security of the email account is especially important. A system and method that monitors the customer email authentication and informs and offers confirmations to the customer through an alternate communication form, such as SMS or social media or an alternate email account is disclosed. The system and method offers monitoring of all accounts registered under an email address, giving the customer a unified set of security standards. The system and method allows the customer to define the criteria by which they are notified and the type of action that may be taken in the event their email account is compromised. The e-commerce system 140 monitors customer, vendor and hacker using various methods to determine bias in their actions. Message confirmations and notifications are sent when accounts are suspected to be potentially compromised. The e-commerce system 140 utilizes various forms of machine learning and blockchain. The customer's email account may be monitored for activity in a similar manner. Customers may be notified when account login occurs or when account preferences are changed.

BRIEF DESCRIPTION OF THE DRAWINGS

A more detailed understanding can be had from the following description, given by way of example in conjunction with the accompanying drawings wherein:

FIG. 9G is a diagram illustrating the flow of transactions between the e-commerce system 140 and customer device for facilitating pledges and payment without a password using with email-based authentication;

DETAILED DESCRIPTION

Figure 1:
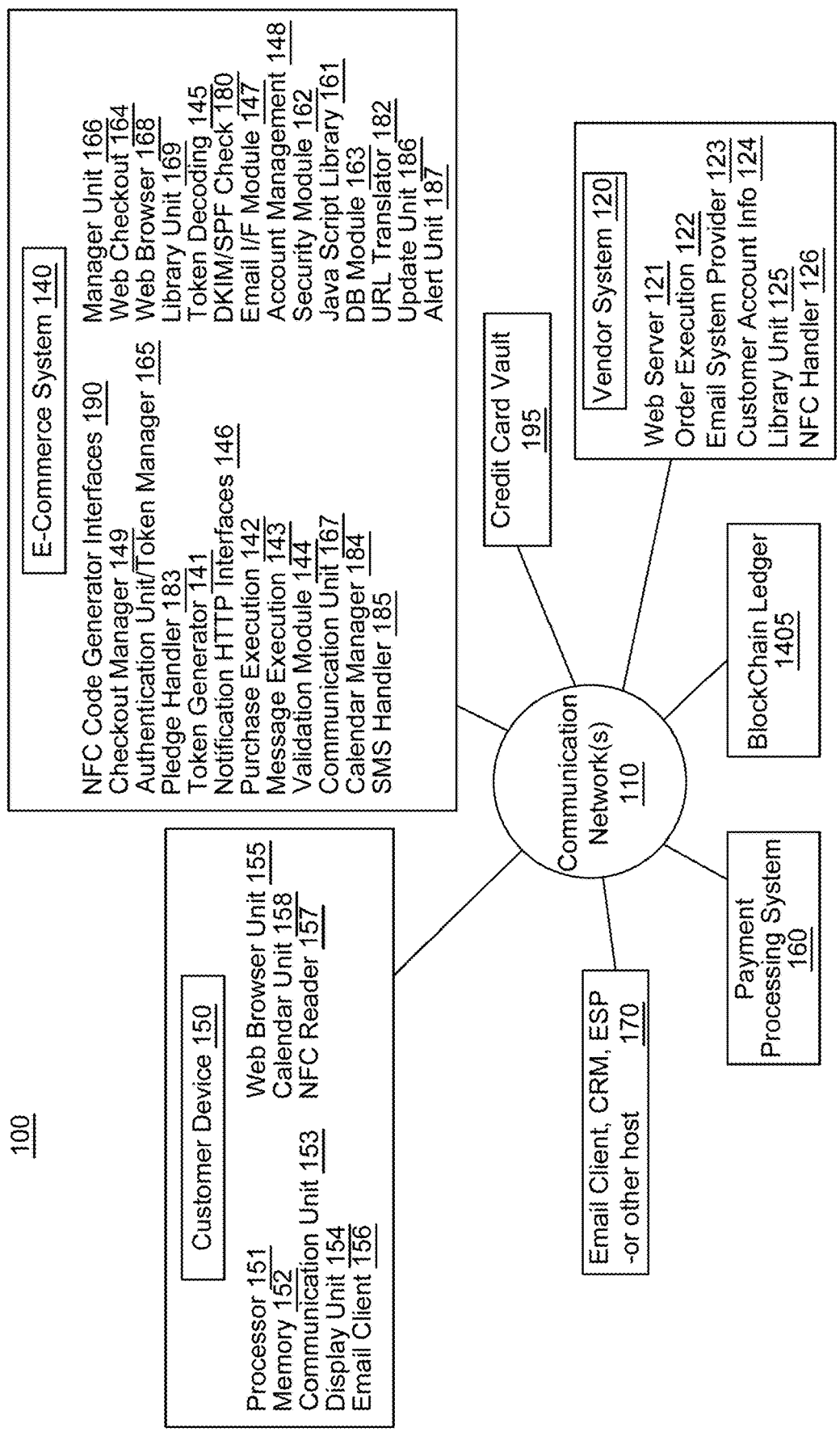
FIG. 1 illustrates a system diagram of an email-based e-commerce system 140 email-based authentication for account login and secure monetary for passwordless transactions.

All embodiments described below may be used in tandem or in relation to specific vendor needs. They may also be integrated with an email service provider, customer relationship management or directly with a payment processor. Payment processing may occur in any number of ways using multiple gateways, credit cards, debit cards, direct carrier billing, automatic clearing houses and blockchain. Although the description below focuses on the use of Short Message Service (SMS), email messaging and social media networks may also be used. The configuration of the system may vary based on client needs. A method and apparatus allows vendors to grant secure server access to a customer by authenticating the customer's email address. To gain secure access send emails addressed to the e-commerce system which the email server automatically embeds a single-use digital signature and upon receiving the email the e-commerce system authenticates the digital signature and logs in the customer to the secure account. A method and apparatus allows the e-commerce system, such as an Email Payment Gateway (also referred to as the e-commerce system), to enable vendors to send emails to customers allowing customers to make payments for specific amounts by selecting mailto links associated with each amount and sending the email to the e-commerce system. Each mailto link holds a token generated by the e-commerce system. The e-commerce system may validate and authenticate the email and decode the token. The system and method solves several problems in relation to management of customer accounts. The e-commerce system provides to vendors a series of controls to manage and streamline the process of registering customers. As shown in FIG. 1, the disclosed methods provide different benefits based on the dynamic nature of the e-commerce system. The e-commerce system offers vendors multiple methods to validate a message based on authenticating identifiers and tokens, and the categorization of these emails into registered and unregistered customers.

The described system and method collects multiple contacts from each customer allowing greater flexibility and security in payment processing and offers greater choice and flexibility in the method of payment. The described system and method may authenticate an SMS payment request and process a payment without the aid of the phone carrier. The present system and method may provide customers with immediate receipts required for taxes and expenses. The described system and method may integrate payment options via SMS, social media, email, and web-based checkouts with other applications such as calendar applications. The present system and method may allow for seamless transitions from one communication format to another on mobile devices. The present system and method using different formats of communication to confirm transactions and act as a fail-safe to confirm a customer's identity online provides greater security. The described system and method provides product information via Short Message Service (SMS) or social media, with short prompted responses to determine a customer's desired purchase and process their payment. The present system and method consolidates a customer's payments into a single message and response. The present system and method provides cashiers in brick and mortar stores, who can offer a method for paying a specific amount by using SMS to message a phone number, offer a simple straightforward method to make a payment using their mobile phone. The present system and method maintains the ease of SMS with the security of other media. The present system and method exploits the capacity to shift between messaging applications, to heighten security, and increase convenience.

A method and apparatus disclosed herein configures the e-commerce System, such as an Email Payment Gateway, also referred to as the e-commerce system, to enable vendors to send emails to customers allowing customers to make payments for specific amounts by selecting mailto hyperlinks associated with each amount and sending the email to the e-commerce system. Each mailto link holds a token generated by the e-commerce system. The e-commerce system may validate and authenticate the email and decode the token. This system may be integrated with SMS and Social Media messaging. The e-commerce system is designed to give customers a fluid relationship between different modes of messaging with the goal of completing a secure payment. The system and method provide an interactive experience to customers allowing the customer greater choice and ease in purchase.

An e-commerce system to facilitate transactions between a customer and a vendor is disclosed. FIG. 1 illustrates a system diagram of an email based e-commerce system that provides vendors an alternative to a password-based security system. The system and method also allows vendors to manage secure transactions by leveraging various message authentication techniques while allowing the vendor full control over related processes such as secure login, payment processing and fulfillment.

FIG. 1 illustrates a system diagram of an Email-Based Security system 100. The Email-Based Security System 100 may integrate SMS and social media for online e-commerce. FIG. 1 shows an example Email-Based Security System 100 that may be used for vendor token generation that may be used in e-commerce transactions. The example Email-Based Security System 100 includes a customer device 150, a vendor server 120, an e-commerce system 140, a banking server (not shown), a payment processing system 160, and an email service provider 170 that may communicate over one or more wired and/or wireless communication networks 110. The wired or wireless communication networks 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, GooglePlus+, LinkedIn, Instagram, Pinterest, Swapchat, Tumblr, and the like. The customer device 150 includes a processor 151, memory 152, a communications unit 153, a display unit 154, a web browser unit 155, which may communicate data to/from the web server module(s) in the vendor server 120 and payment server 160, email client 156, and near field communication (NFC) reader 157. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plug-in modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The customer device 150 may also include a calendar unit or calendar application, and a messaging unit, also referred to as a SMS or social media application.

Calendar unit 158 may also include or be referred to as calendar software or a calendar application. Calendar unit 158 may include calendaring software that at least includes or provides users with an electronic version of a calendar. Additionally, the software may provide an appointment book, address book, and/or contact list. These tools are an extension of many of the features provided by time management software such as desk accessory packages and computer office automation systems. Calendaring is a standard feature of many PDAs, EDAs, and smartphones. The software may be stored or housed locally on a computing device or customer device 150, often designed for individual use, e.g. Lightning extension for Mozilla Thunderbird, Microsoft Outlook without Exchange Server, or Windows Calendar, or may be a networked-based software that allows for the sharing of information between users, e.g. Mozilla Sunbird, Windows Live Calendar, Google Calendar, or Microsoft Outlook with Exchange Server.

SMS or social media application may be any application that provides access to texting including SMS or to social media application wither directly or using a web link.

The vendor system 120 may include a web server 121, order execution unit 122, an email system provider 123, customer account info 124, a library unit 125, and an NFC handler 126. The vendor system 120 may be substituted for a financial management system as illustrated in the examples described herein.

The web server 121 provides a website that may be accessed by a customer device 150. The web server 121 may implement HTTP protocol, and may communicate Hypertext Markup Language (HTML) pages and related data from the website to/from the customer device 150 using HTTP. The vendor server 120 may be connected to one or more private or public networks (such as the Internet), via which the web server 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 120.

The memory may be configured to store information associated with e-commerce transactions. This may include inventory information, information used to generate web pages, customer information, and other e-commerce data.

The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, a Universal Resource Locator (URL) translator 181, and an NFC code generator interface 190. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 120, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator 141 may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token-a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request-typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The authentication unit 165 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly, DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Path-based email authentication provides for the authentication of emails by validating the path across the network of any given email. In particular, it compares of the IP address of the originating email server with a list of IP addresses authorized to send email for a given domain. This list of authorized IP addresses can be obtained by a DNS lookup.

Generally, DKIM is an email validation system designed to detect email spoofing by providing a mechanism to allow receiving mail servers to check that incoming mail from a domain is authorized by that domain's administrators. A digital signature included with the message may be validated by the recipient using the signer's public key as published in a DNS record controlled by the signer. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
bh=MTIzNDU2Nzg5MDEyMzQ1Njc4OTAxMjM
0NTY3ODkwMTI=;

b=dzdVyOfAKCdLXdJOc9G2q8LoXSIEniSbav+
yuU4zGeeruD00IszZ
VoG4ZHRNiYzR

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
b is the main payload of the DKIM Signature
c is the canonicalization algorithm(s) for header and body,
d is the domain
q is the default query method,
l is the length of the canonicalized part of the body that has been signed,
t is the signature timestamp,
x is it's expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, authentication unit 165 may perform any authentication and validation type protocols. DKIM and SPF are used to provide examples of such validation protocols that may be performed in authentication unit 165.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

E-commerce system 140 may also include a pledge handler 183, a calendar manager or calendar application 184, a SMS handler 185, an update unit 186, and an alert unit 187. SMS handler 185 is a device or element within the e-commerce system 140 that can handle SMS communication and can receive, decode/encode SMS communications. An update unit 186 provides updates within the e-commerce system 140. Alert unit 187 is a unit that provides alerts within the e-commerce system 140.

Pledge handler 183 is an element designed to handle pledges. This may include the portion of the system that receives identification of an intent to pay or perform and monitors and tracks such a pledge.

Calendar manager or calendar application 184 may be of the same type as calendar unit 150 of customer device 150. Calendar 184 may be linked or in communication with calendar 158. Calendar application 184 may be any of the types of calendar described above with respect to calendar 158, the type of which may not be influenced by the type of calendar of calendar 158.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

Credit card vault 195 may also be included in Email-Based Security System 100. Credit card vault 195 may include any credit clearing house. This is shown as being independent from any of the other entities in the system including customer device 150, e-commerce system 140, vendor system 120, payment processing system 160, and banking server (not shown) for example. Credit card vault 195 may be housed, received input or be a combination of the clearinghouse portion of any of the other entities in the system including customer device 150, e-commerce system 140, vendor system 120, payment processing system 160, and banking server (not shown) and is shown as a separate entity only for ease of understanding and clarity.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. Pat. No. 9,152,980 which issued on Oct. 6, 2015 entitled EMAIL-BASED E-COMMERCE, which is a continuation of U.S. Pat. No. 8,775,623 which issued on Jul. 8, 2014 entitled SYSTEM AND METHOD FOR EMAIL-BASED E-COMMERCE, and U.S. Pat. No. 9,058,591 which issued on Jun. 16, 2015 entitled EMAIL-BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator 141 that allows vendors to directly create tokens. In another example, a third party may have a token generator 141 to create tokens for use by the vendor system 120.

Email-Based Security System 100 may not require the vendor system 120 to host the token generator 141 on their system. Email-Based Security System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL. A URL may be substituted for a mailto link but may be used to generate an email.

The e-commerce system 140 may include a database of registered customers, such as for payment processing. The e-commerce system 140 may require variable amounts of information to register customers. For example for login the e-commerce system 140 may only require an authenticated email address for registration where as to make a secure payment the e-commerce may require credit card, banking information. Additional registration information may be required based on the level of sensitivity of the customer account. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An Email-Based Security System 100, as described herein, allows an email payment opportunity, secure logon and and/or authentication of customer identity. This may include offering a product or service which is sent to customers and contains one or more mailto links or accessing the mailto link via a web-browser. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the Email-Based Security System 100 to programmatically create either the token or the full mailto link.

In one instance, for a customer to complete an email transaction, the customer's payment information may be contained in the email e-commerce system 140 database 163. In order to determine if the customer's payment information is in database 163 the token may be decoded to recognize the customer when the email arrives at the e-commerce system 140. In other instance, for a customer to complete an email transaction, the token is utilized to retrieve the payment information from an external system.

The vendor sends the first email via the vendor system 120. The customer via customer device 150 responds by activating a mailto link by sending the response to the e-commerce system 140. If the customer is registered and the incoming email is authenticated, when the token is decoded, the transaction is processed or secure access to a server is granted.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this Email-Based Security System 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows or server access separate from their email e-commerce solution, or the vendor may use the Email-Based Security System 100 as a full-featured payment system or secure server system for both web and email transactions without doing any software development. Presenting the customer with a clear process that seamlessly migrates the customer to adopt an email-based checkout process eases the customer into a new technology where transactions happen by email instead of on a URL. Email-Based Security System 100 provides a vendor with a more automated or customized way of handling elements that may be achieved through the use of the email e-commerce system 140.

Figure 2:
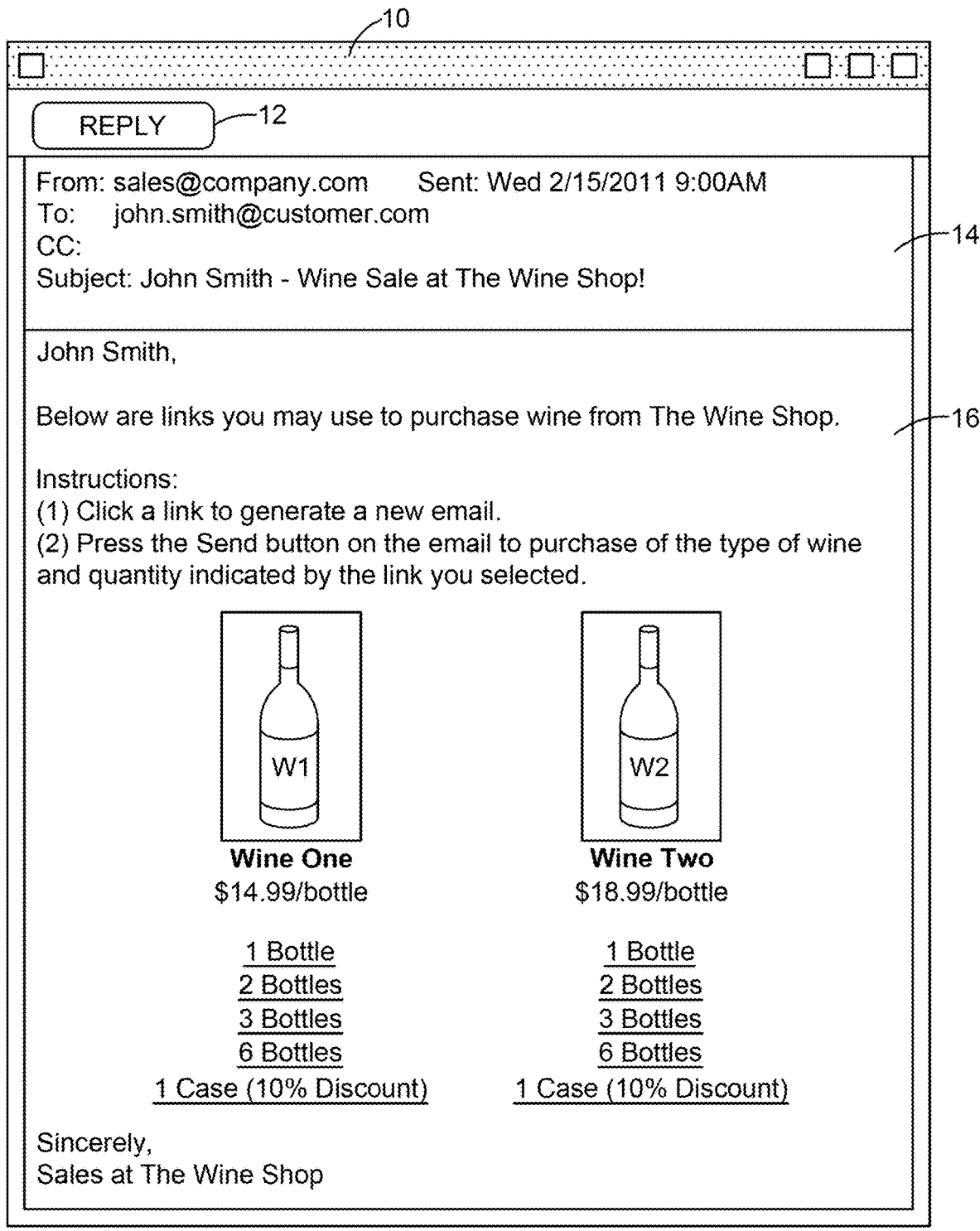
FIG. 2 illustrates an example email message that solicits the purchase of goods from a vendor.

FIG. 2 illustrates an example email message that solicits the purchase of goods from a vendor. FIG. 2 shows an email display window 10 that may be used by the email client module of customer device 150 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 140 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 2, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 150 when that link is selected.

The "1 Bottle" link beneath the picture of the Wine One bottle may include information that, if selected, generates an email message that, if received by the e-commerce system 140, will indicate to the e-commerce system 140 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 140, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 140, will indicate to the e-commerce system 140 that John Smith may like to purchase two bottles of Wine One. According to this example, the "2 Bottles" link may be defined as follows:

<a href="mailto:sales@company.com?subject=Purchase percent 20from percent 20Wine percent 20Shop percent 20 and body=You percent 20have percent 20created percent 20an percent 20order percent 20for percent 20two percent 20bottles percent 20of percent 20Wine percent 20One. percent 20Press percent 20the percent 20Send percent 20button percent 20to percent 20complete percent 20the percent 20order. percent 0A percent 0AProductID0005 percent 20QualifierNA percent 20Qty0002 percent 20CustomerID0777 percent 20CampaignID0003" target="_blank">2 Bottles</a> mailto:sales@company.com?Subject="Press send to pay $42.99 to Wine Shop"? body="TEXT XXX-XXX-XXX-XXX"

In addition, the token identifier may be part of the To: address, or any other portion of an address field, or of the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the e-commerce system 140, the e-commerce system 140 may perform a look-up of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 150 may receive a user input that indicates that one of the links displayed in the message body area 16 is selected. The user input may be, for example, a mouse click, keyboard input, or any other type of input that indicates that a link is selected. The email client module of customer device 150 may, in response to this user input, generate and display an order email message as specified by the selected link.

Figure 3:
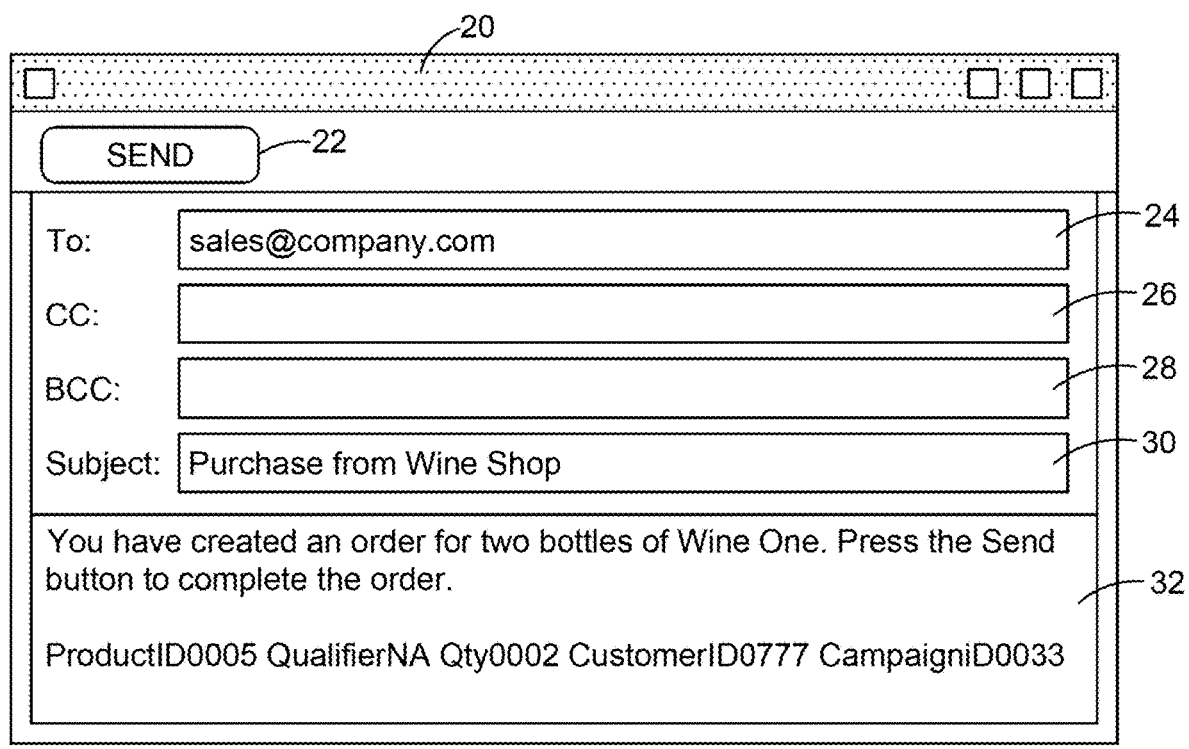
FIG. 3 illustrates an email message for placing an order.

FIG. 3 illustrates an email message for placing an order. FIG. 3 shows an example message composition window 20 that may be displayed in response to a selection of a link from the message body area 16 of the email display window 10 of FIG. 2. The message composition window 20 of FIG. 3 may include a Send button 22, a To area 24, a CC area 26, a BCC area 28, a Subject area 30, and a message body area 32. The Send button 22 in the message composition window 20 of FIG. 3 may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 3 shows an example wherein the "2 Bottles" link beneath the picture of the Wine One and described above with reference to FIG. 2 is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 3, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 2 is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 4:
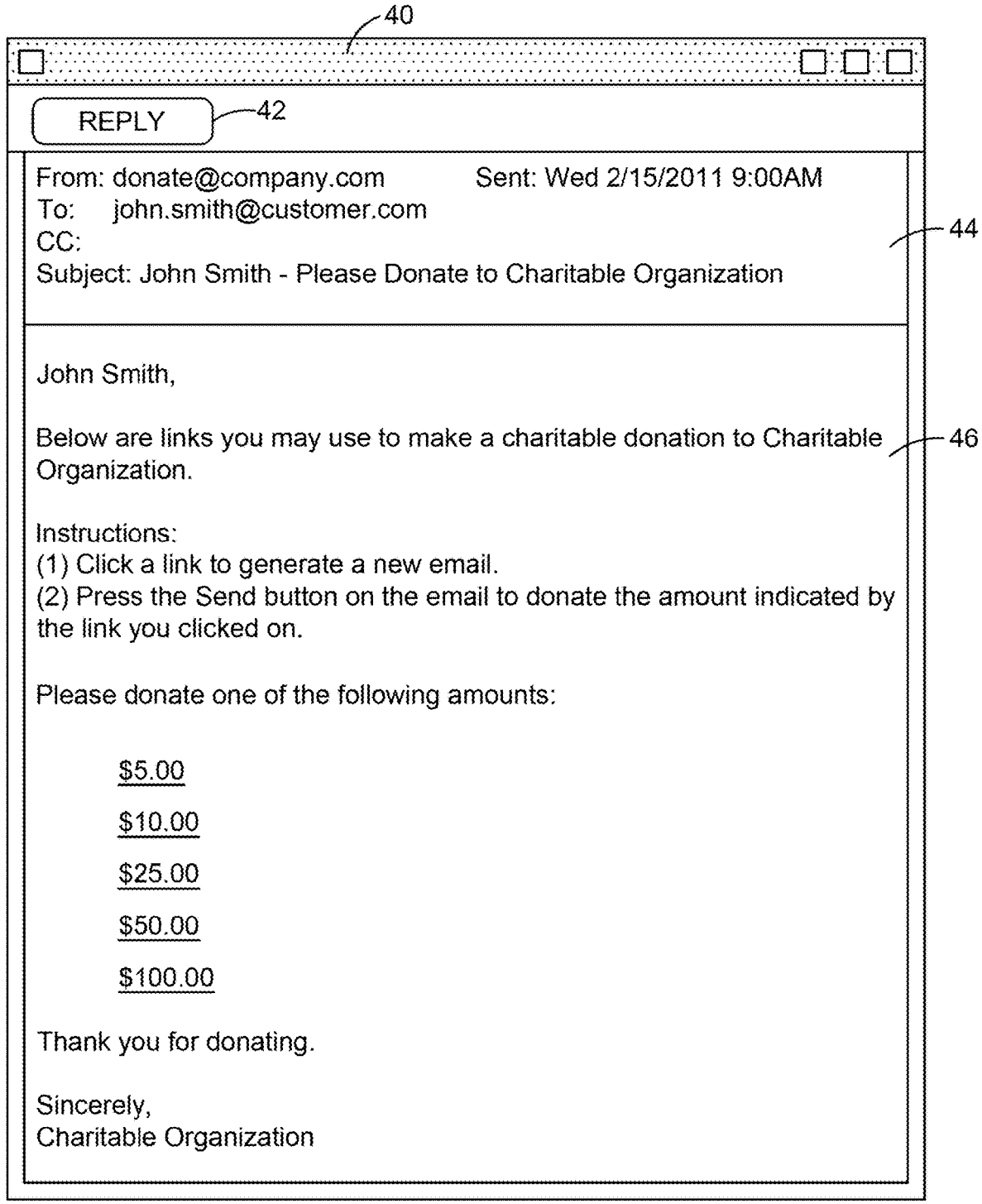
FIG. 4 illustrates an advertisement email message that solicits a donation.

FIG. 4 illustrates an advertisement email message that solicits a donation. FIG. 4 shows an email display window 40 that may be used by the email client module of customer device 150 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 2. According to the example of FIG. 4, the control area 44 shows that the sender of the message has the email address "donate@company.com." This is an email address that may be associated with an account used by the e-commerce system 140 for the communication of email messages. Further to this example, the control area 44 shows that the email address of the example recipient of the message (John Smith) is "john.smith@customer.com."

As shown in FIG. 4, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 2. The "$5.00" link describes an email message that, if received by the e-commerce system 140, will indicate to the e-commerce system 140 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 150 may receive a user input that indicates that one of the links displayed in the message body area 46 is selected. The email client module of customer device 150 may, in response to this user input, generate and display an order email message as specified by the selected link.

Figure 5:
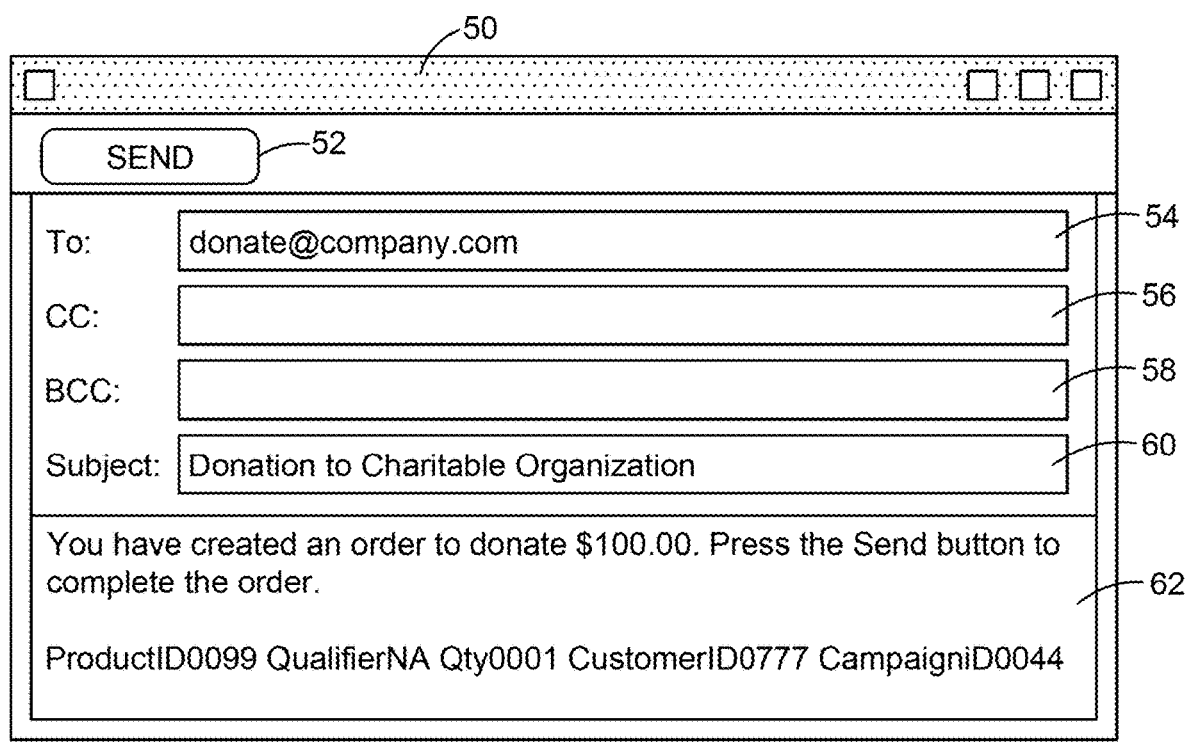
FIG. 5 illustrates an email message for ordering a donation.

FIG. 5 illustrates an email message for ordering a donation. FIG. 5 shows an example message composition window 50 that may be displayed in response to a selection of a link from the message body area 46 of the email display window 40 of FIG. 3. The message composition window 50 of FIG. 5 may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 3.

FIG. 5 shows an example wherein the "$100.00" link from the message body area 46 of the email display window 40 of FIG. 4 is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 150 may send the generated order email message to the e-commerce system 140. This may be performed in response to input from a user of the customer device 150. As one example, the email client module of customer device 150 may, in response to a selection of the Send button 52 in the message composition window 50 of FIG. 5, transmit an order email message based on the contents of the fields 54, 56, 58, 60, 62 in the message composition window 50. As another example, the email client module of customer device 150 may, in response to a selection of the Send button 52 in the message composition window 50 of FIG. 5, transmit an order email message based on the contents of the display areas 54, 56, 58, 60, 62 in the message composition window 50.

As initially presented above, a token may be located within the To: Cc: or Bcc fields of a response email. This token may take the form of a short token, for example. The e-commerce system 140 may generate the short token that is located in the To: field, or any other field, for example, as part of the email address. When the vendor system 120 requests that the token generator 141 generate a mailto link with the identifiers and token, the token generator 141 may generate a "short lookup token" and the "long token" encoded with the identifiers. The short lookup token may be associated with the long token and may be required or otherwise needed to access the information in the long token index. The short token index may be sent in an email to the customer device 150 as a mailto link. The customer using the customer device 150 selects the mailto link and generates the response email addressed to the e-commerce system 140. The short lookup token may be built into the address of the response email. The short lookup token may be of the form:
payment-id-74E4DE00-51E2-457B-8C0B-
648640EF232D@payments.atpay.com, for example.

When the customer using customer device 150 sends the email and the e-commerce system 140 receives the email and authenticates the customer's email address, the e-commerce system 140 may also determine using the short lookup token included in email address of the e-commerce system 140 the long token associated therewith. When the long token is determined, the e-commerce system 140 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

A system is described that uses the e-commerce system 140 to process emails for making payments. As shown in FIG. 1, a single payment processing system is described. The present invention's flexibility and control offers vendors a choice of which payment processor to use. Additionally, a payment processor may be a vendor and offer payments by email. Payment processors and payment gateways may integrate the e-commerce system 140 and restrict access to other payment processors and gateways.

Figure 6A:
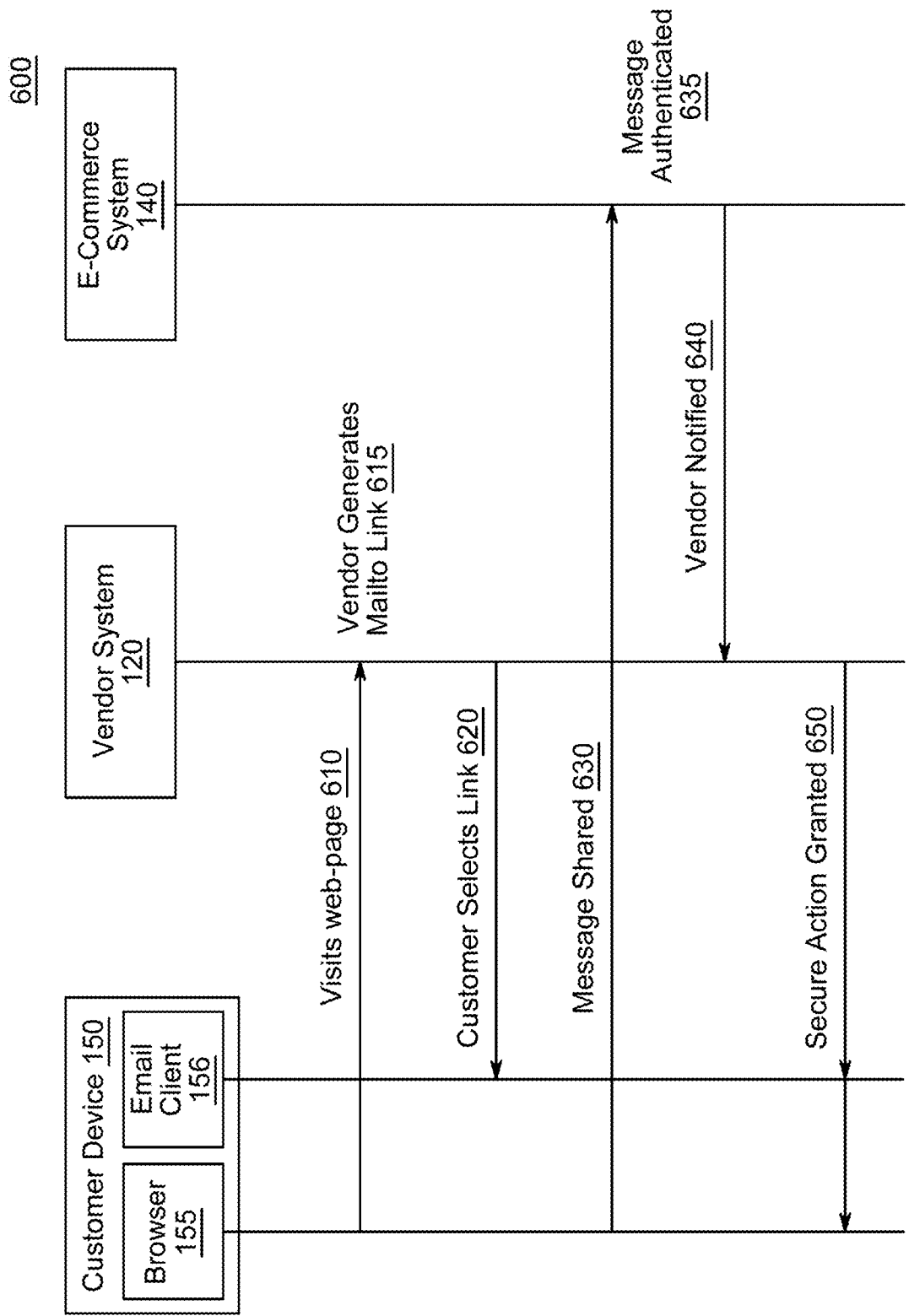
FIG. 6A is a transactional flow diagram illustrating the process of a customer accessing a secure account without the use of a password.

FIG. 6A is a transactional flow diagram 600 illustrating the process of a customer accessing a secure account without the use of a password. A customer using the customer device 150 may access a web-page via a web browser 155. The web-page may be a sign in, login or payment page. The customer using the customer device 150 visits the vendor 120 site or web-page at step 610. The vendor 120 generates a mailto link with at least one identifier at step 615. URLs that generate email messages may substituted for mailto links. The customer 150 selects the mailto link at step 620 and requests a secure sign in, login or payment option. The selection of the mailto link at step 620 opens the email client 156 and generates an email response message addressed with at least one identifier to the e-commerce system 140. The identifier could be anywhere in the message. The customer 150 shares the email message and identifier with the e-commerce system 140 at step 630. The e-commerce system 140 receives the email from the customer device and authenticates the message at step 635.

Various forms of authentication may be used such as SPF, DKIM and DMarc. Authentication may be limited to DKIM, DMarc or SPF path-based authentication. The e-commerce system 140 authenticates the customer email using the digital signature. The e-commerce system 140 may take one or more actions based on the outcome of the authentication process. The e-commerce system 140 may perform a look up of the customer's account using the identifier and or email address. The e-commerce system 140 may not require any identifier. If the customer is not authenticated or is missing information or does not have an account, the customer may be navigated to a signup page for registration with the vendor 120 and the e-commerce system 140. If all requirements are met, the e-commerce system 140 notifies the vendor system 120 of successful authentication and shares the identifier with the vendor 120 at step 640. The vendor 120 then grants secure access to the customer device 150 at step 650. Alternatively the e-commerce system 140 may grant access directly on behalf of the vendor. Although in this example granting access to a secure webpage is described it is an example only. Various secure transactions may be granted. A secure transaction could be access to a secure server, secure website, payment processing, control of a digital currency, record keeping, securities and/or contracts. The process of granting access to a customer may allow access to more than one account and more than one customer. Alternatively the customer may utilize the authentication notification and grant access to a third party vendor. Alternatively or additional in some configurations additional factors of authentication may be applied as described in FIG. 9A.

Figure 6B:
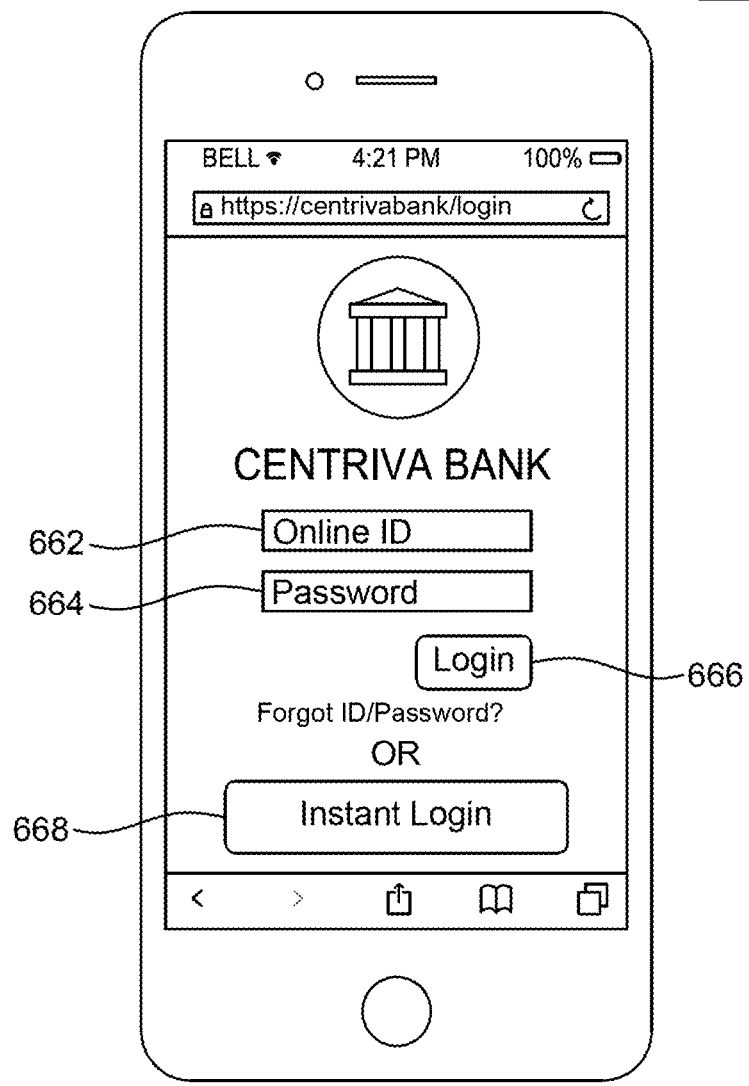
FIG. 6B is an example of a webpage for a secure login option.

FIG. 6B is an example of a webpage 660 viewed at step 610 for a secure login option. As illustrated in example webpage 660, an online ID 662 may be entered with a password 664. Once the information is entered, a login button 666 may be initiated. Alternatively, an instant login may be initiated by depressing the instant login button 668.

Figure 6C:
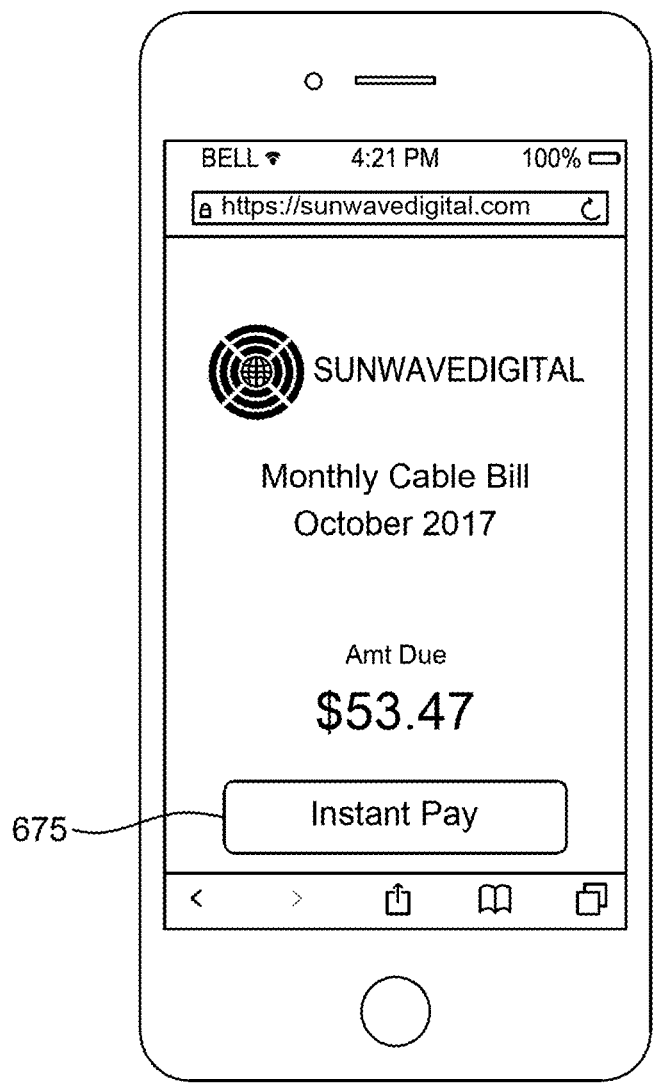
FIG. 6C is an example of a webpage that offers a secure payment option.

FIG. 6C is an example of a webpage 670 that offers a secure payment option. In this example webpage 670, the mailto link selected at step 620 is embedded behind a graphic image of a button 675.

Figure 6D:
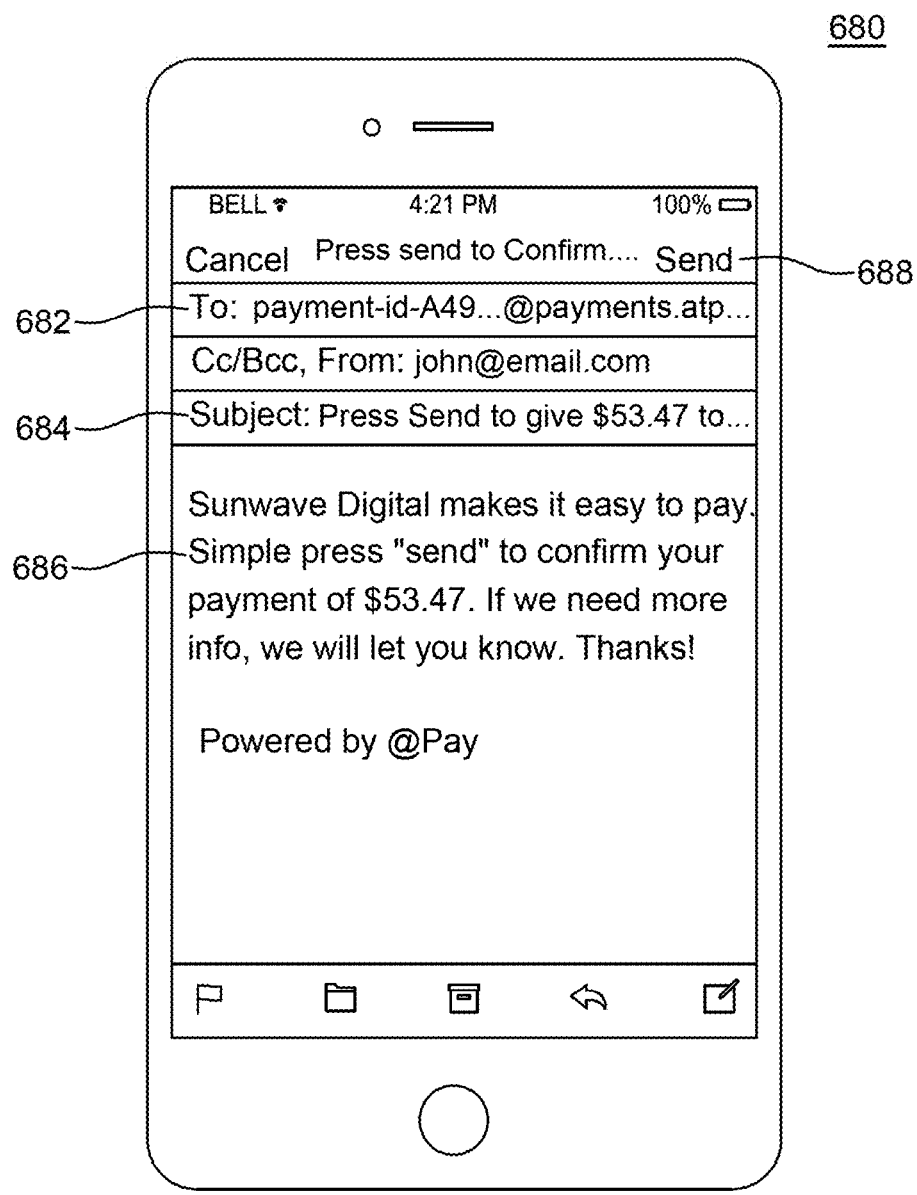
FIG. 6D is an example of the response email.

FIG. 6D is an example illustration of the response email 680. The email is addressed to 682 the e-commerce system 140 and displays an example of the token integrated into the email address. The subject line 684 includes a description of the email message action. The body of the email 686 includes a description of the transaction. The "send" button 688 may be initiated to complete the transaction.

Figure 7:
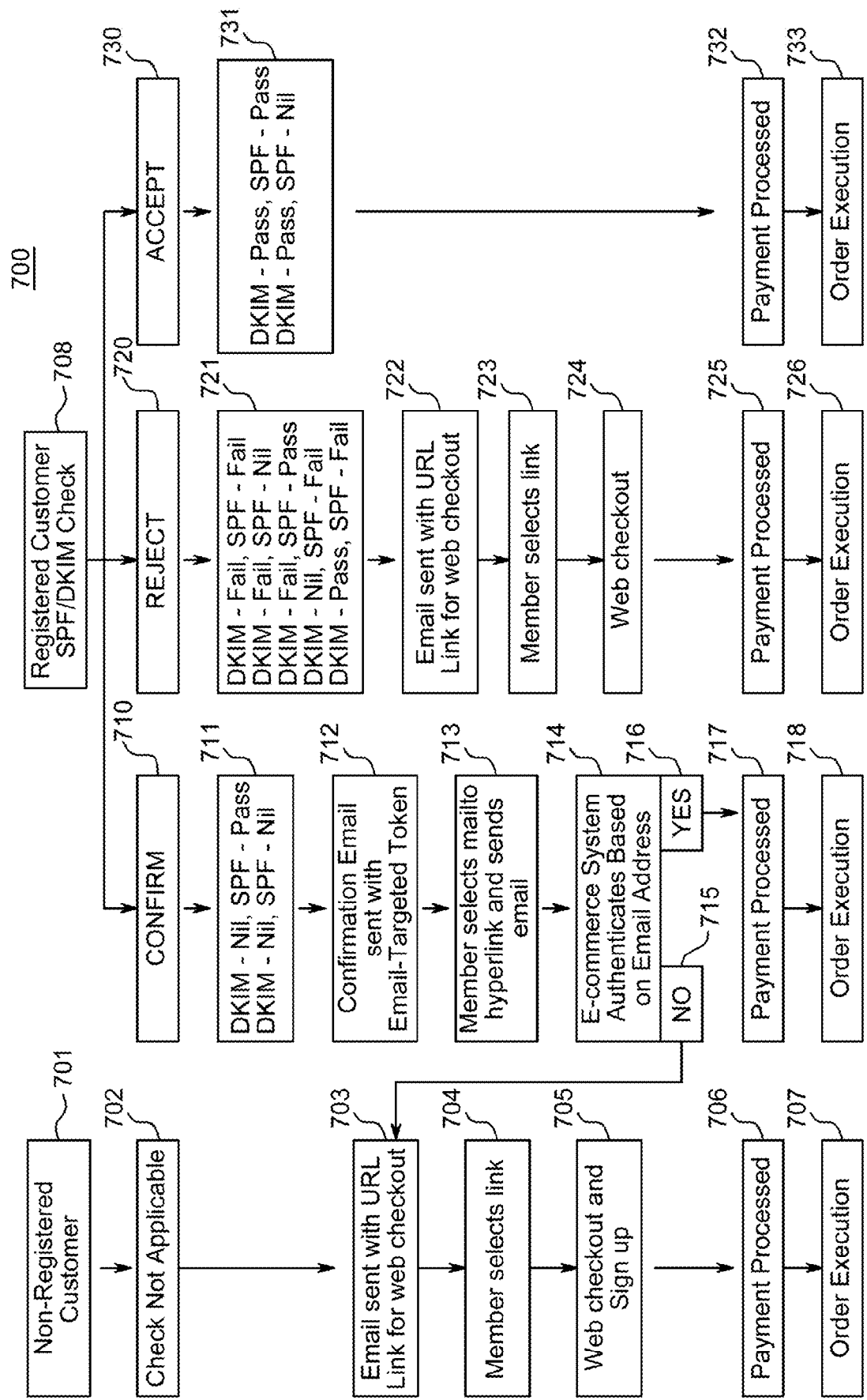
FIG. 7 is flow diagram of an e-commerce system 140 authenticating received emails from registered and non-registered customers.

FIG. 7 is flow diagram of an e-commerce system 140 authenticating received emails from registered and non-registered customers. An email campaign may be directed at any combination of consumers who have registered payment information with the e-commerce system 140 and consumers who have not registered payment information with the e-commerce system 140. When the e-commerce system 140 receives a response email, it must determine whether the response is from a non-registered customer or a registered customer, this may be based, for example, on the email address associated with the sender of the email. Once the e-commerce system 140 has determined whether the email was sent from a registered or non-registered customer, the e-commerce system 140 may determine whether the email was received from an authenticated source.

Whether or not the DKIM and SPF validations succeed, the e-commerce system 140 may determine that an email is received from a non-registered customer (step 701). This may be based on, for example, the email address of the customer or information embedded in the email including the token. If this is the case, the e-commerce system 140 may determine that an SPF/DKIM check is not applicable (step 702). The e-commerce system 140 may send an email to the non-registered customer with an URL hyperlink for a web checkout (step 703). The non-registered customer may select the URL hyperlink in the email which directs the non-registered customer to a webpage based on the URL (step 704). The non-registered customer may then complete a web checkout on the webpage (step 705). By completing the web checkout, the non-registered customer may be registered with the e-commerce system 140, either automatically or by selecting an option. The payment may then be processed (step 706). And the order or donation may be executed (step 707).

The e-commerce system 140 performs an SPF/DKIM check on the email, to check for valid DKIM signatures and SPF records (step 708). These are used to detect whether incoming messages have been mimicked. A mimicked message may be an email message that appears to have been sent by a user, but was sent by another user. This may often be seen in spam messages appearing to be from a known source. Based on the authentication procedure, the e-commerce system 140 may confirm, reject, or accept the authentication.

In one scenario, after the SPF/DKIM check, the e-commerce system 140 may determine that a confirmation of the sender is needed (step 710). The confirmation may be requested, for example, based on user preferences, or if the e-commerce system 140 requests additional information. The e-commerce system 140 may determine a confirmation is needed when the DKIM is Undefined and the SPF is either Pass or Undefined (step 711). In this scenario, the e-commerce system 140 may generate a confirmation email message that includes a mailto link with an email targeted token to confirm the identity via an email message (step 712). In this instance, the email targeted token may be integrated as a secondary system for a two-click experience within the email client. When the customer receives the email, they select the hyperlink and generate a response email that they send back to the e-commerce system 140 (step 713). When the e-commerce system 140 receives the response to the confirmation email message the e-commerce system 140 104 authenticates the customer, based on the email address this message was sent from and the email address embedded within the email-targeted token (step 714). If this is confirmed as a YES (step 716) then the e-commerce system 140 may decode the token and grants access to a server or processes the payment and send notifications to the customer and vendor server (step 717). The e-commerce system 140 may then execute the order (step 718). If the email targeted token arrives back at the e-commerce system 140 and is not recognized as a registered and confirmed as a NO (step 715), then the e-commerce system 140 may send the customer an email with a URL hyperlink driving them to a signup and web checkout page. This web checkout may be located on the e-commerce system 140 or integrated with an API on the vendor server 120 or it may be on a third party system.

In another scenario, the e-commerce system 140 may reject the email (step 720). This may occur when the DKIM Fails and the SPF either comes up Failed, Undefined or Passes OR the SPF Fails and the DKIM is Undefined or Pass (step 721). In this situation, the e-commerce system 140 may not confirm the outgoing email server of the received email message. The e-commerce system 140 may generate a response email addressed to the customer that includes a URL hyperlink for the messages categorized as Reject (step 722). When this URL hyperlink is selected (step 723) the customer opens a web-based checkout page and uses the URL to complete a web checkout (step 724). This web checkout maybe part of the vendor server 120 or hosted by the e-commerce system 140. The web checkout may also request the user to enter registration information. Once the web checkout is complete, the payment may be processed and the order executed (steps 725 and 726).

In the third scenario, the e-commerce system 140 accepts the response (step 730) email and is able to successfully authenticate a registered user. For example, this may occur when the vendor server 120 generates an email and requests a bulk token from the e-commerce system 140 and embeds it in a mailto link in the advertising email. Each mailto link is associated with an offer. The email is sent to the list of customers. When a customer activates the mailto link a response email is generated with the bulk token and that email is addressed to the email e-commerce system 140. The customer sends the response email. Once the email is sent the DKIM/SPF process begins. If the e-commerce system 140 determines that the received email is from a registered customer and both the DKIM and SPF are present and valid, the received message may be categorized and processed as an Accept by the e-commerce system 140 (step 731). The token is decoded and the customer is granted secure access or their payment processed (step 732) and then the order is executed (step 733).

In an alternative embodiment where any customer sending a message that is categorized as either Non-registered, Confirm or a Reject may all receive an email response that drives them to a URL. This may be a preference of the vendor or may be in response to other environmental indicators such as the rate of Confirmations, Rejections and Acceptances the system is currently detecting.

The fidelity of DNS records are important to the security of email payments and secure login. A system and method for constant vigilance in the maintenance of DNS records is described. The system and method compares current and historical DNS records. DNS records from a first transaction are stored, and subsequent DNS records are compared and stored to provide an automated and immediate response based on the comparison. This insures the highest level of security through authentication of incoming emails using SPF, DKIM and DMARC. Each incoming message is evaluated to authenticate the validity of its DNS record. Implementing a fidelity of DNS records algorithm, all incoming emails are parsed into categories based on a rating system. This rating system quantifies the level to which the security of the email may be compromised. This automated system responds accordingly to each rating. High levels of validity identify that the payment may be processed while messages with irregularities may have a confirmation email sent to the customer. Questionable domains are warned of their inconsistencies.

Figure 8:
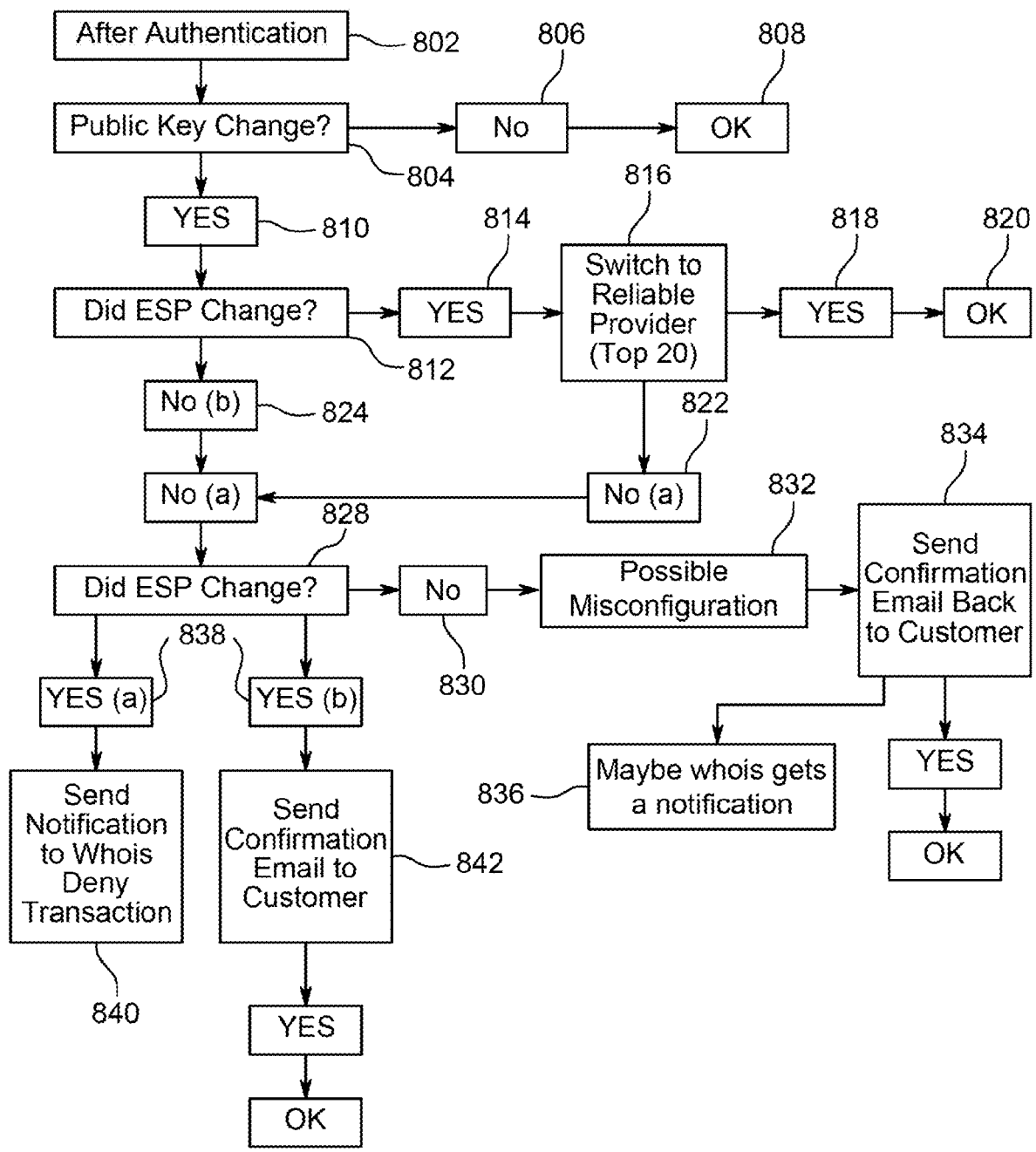
FIG. 8 is a flow diagram illustrating addition security functions by monitoring of the fidelity of DNS records.

FIG. 8 is a flow diagram 800 illustrating security functions by monitoring the fidelity of DNS records. To insure the fidelity of the DNS record the e-commerce system 140 utilizes a fidelity algorithm to monitor changes to the DNS record. Based on the changes to the DNS record, the e-commerce system 140 may take various actions in response. The DNS Record Monitor maybe hosted by the e-commerce system 140 or by a third party.

Flow 800 may be performed after authentication (step 802). The e-commerce system 140 checks if the public key has changed (step 804). If the check provides a response of NO (step 806), transactions are designated OK (step 808) and the transaction proceeds. If the check of the public key provides a response of YES (step 810), the e-commerce system 140 determines if the ESP has changed (step 812). If the ESP is determined to have changed, designated by YES (step 814), the e-commerce system 140 may assess the level of reliability of the new ESP (step 816). If the new ESP is determined to have a high level of reliability, the transaction may be designated YES (step 818) and determined to be OK (step 820). Reliability may be determined based on various criteria and by various means and may be based on requirements of the customer and/or the vendor. A low level of reliability of the new ESP (step 816) may result in the transaction being designated NO (step 822).

When the ESP has not changed, the transaction may be designated NO (step 824) and deemed OK and if the ESP has change to a non-reliable ESP the transaction may be designated NO (step 822). In either NO (steps 822, 824), the e-commerce system 140 may check for change in the SPF (step 828). If the SPF is determined not to have a change, the transaction is designated NO (step 830). Once designated, the transaction is assessed for possible misconfiguration (step 832) and the transaction does not proceed. Based on the designation of NO (step 830) and possible misconfiguration (step 832), a customer device 150 may be sent a confirmation email (step 834) and the domain may be notified (step 836), such as by using the contact information found in the Whois directory or other comparable method. If it is determined that a change has occurred in the SPF Step 828), the transaction may be designated YES (step 838). The domain is notified (step 840) and the transaction denied and/or the customer is sent a confirmation email (step 842). Flow 800 provides an exemplary example only and may vary based on customer and vendor requirements.

Flow 800 may operate where each of public key change, ESP change and SPF change are all checked, ones of the three are checked. Further, one or more of the results to the queries may matter, may govern or a weighted composite answer may be created. The methodology of the importance of the answers may be determined by the vendor 120 or others factors. For example, the public key changing query may be prioritized and flow 800 operationally may be dictated on the public key changing.

Alternatively or additionally the e-commerce may utilize a machine learning algorithms or artificial intelligence program to determine the range of predictable requests for specific users. This may be applied to the authentication process and or the fidelity of DNS records process as described in FIG. 8 or may be a separate authentication method. These may be applied to customer, vendor and/or potential hacker. For example when customers responses vary from the predictable range or are inconsistent with past behaviors the e-commerce system 140 may send a confirmation message to one or all the communication methods. These calculations may include the vendors individually and as a group. The artificial intelligence may also predict behaviors of hackers calculating the predictability of emails accounts that may display a greater possibility of being targeted by hackers. The e-commerce system 140 may proactively warn those users suggesting or requiring greater notifications and confirmations. The DNS Records Monitor may utilize a multi-perspective DNS lookup that allows for the monitoring of multiple registries. Performing a process as described in FIG. 8 the DNS Records Monitor may aggregate those results into its responses.

Figure 9A:
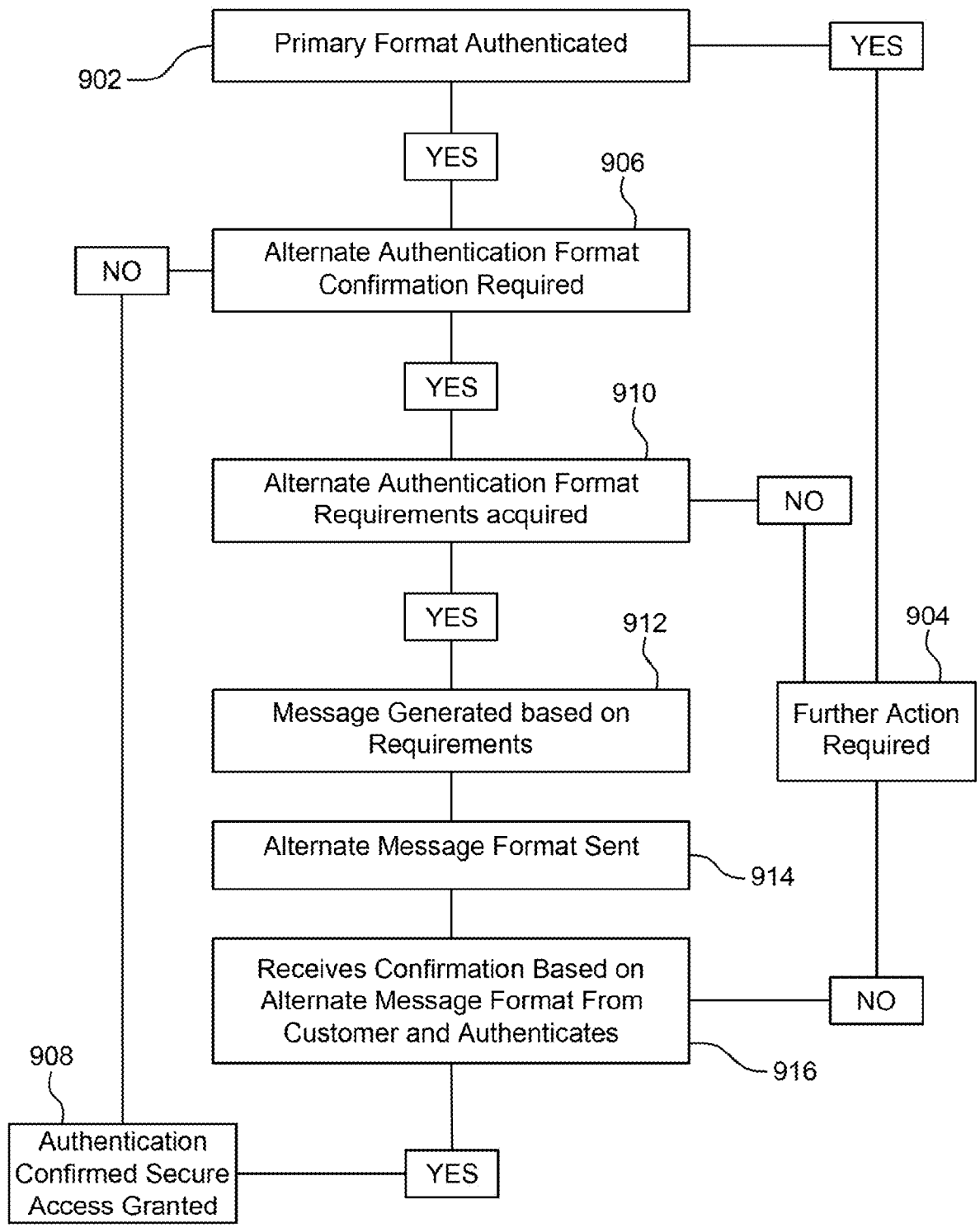
FIG. 9A is a diagram illustrating the responses within the e-commerce system 140 for determining two factor authentication.

FIG. 9A is a diagram illustrating the responses within the e-commerce system 140 for determining two factor authentication. The disclosed invention allows the customer to access a second factor of authentication after completing a first primary authentication format. Factors of authentication may include a password, secret pin, authentication of message such as email, SMS or social media. The order of authentication is may be determined by the vendor system 120, customer or the e-commerce system 140.

FIG. 9A illustrates the additional steps for an extra authentication after the initial email authentication has occurred. The e-commerce system 140 performs (902) a check to authenticate the customer in the primary format. If the primary format authentication is not successful (NO) the e-commerce system 140 will determine that further action is required (904) and may send the customer a message with instructions or URL links requesting more information. If the primary format authentication is successful (YES) the e-commerce system 140 determines (906) whether and alternate authentication format is required. If an alternate authentication format is not required (NO) then the e-commerce system 140 confirms authentication (908) and grants secure access to the customer. If the e-commerce system 140 determines that an alternate authentication format is required (YES) the e-commerce system 140 may perform a lookup (910) to determine the requirements and access the resources for the alternate authentication format. If the requirements are not acquired (NO) the e-commerce system 140 will determine that further action is required (904) and may send the customer a message with instructions or alternative URL links requesting more information. It the requirements are acquired (YES) the e-commerce system 140 generates (912) a message based on the requirements. The type of message may be one of the requirements. Other requirements may include customer email address, social media address, URL link, phone, password, tokens blockchain check among others. The alternate message format is sent (914) with the required formatted message to the customer device.

The message may be an email, SMS social media message, an alert on a webpage among others. The message may have a token or request for a secret pin. The e-commerce system 140 receives (916) a confirmation message from the customer based on the alternate message format and may contain a token or secret pin. This may be receiving a return message, the submission of a token, the entering of a correct password among others. The token may be decoded and the message authenticated. If the authentication is not successful (NO) the e-commerce system 140 will determine that further action is required and may send the customer a message with instructions or alternative URL links. If authentication is successful (YES) then the e-commerce system 140 confirms (908) authentication and grants secure access to the customer. The above described invention widens the possibilities for security. It expands security to authentication of the user via message authentication as well as offering alternatives to secret pins and passwords that rely on users memorizing codes.

Figure 9B:
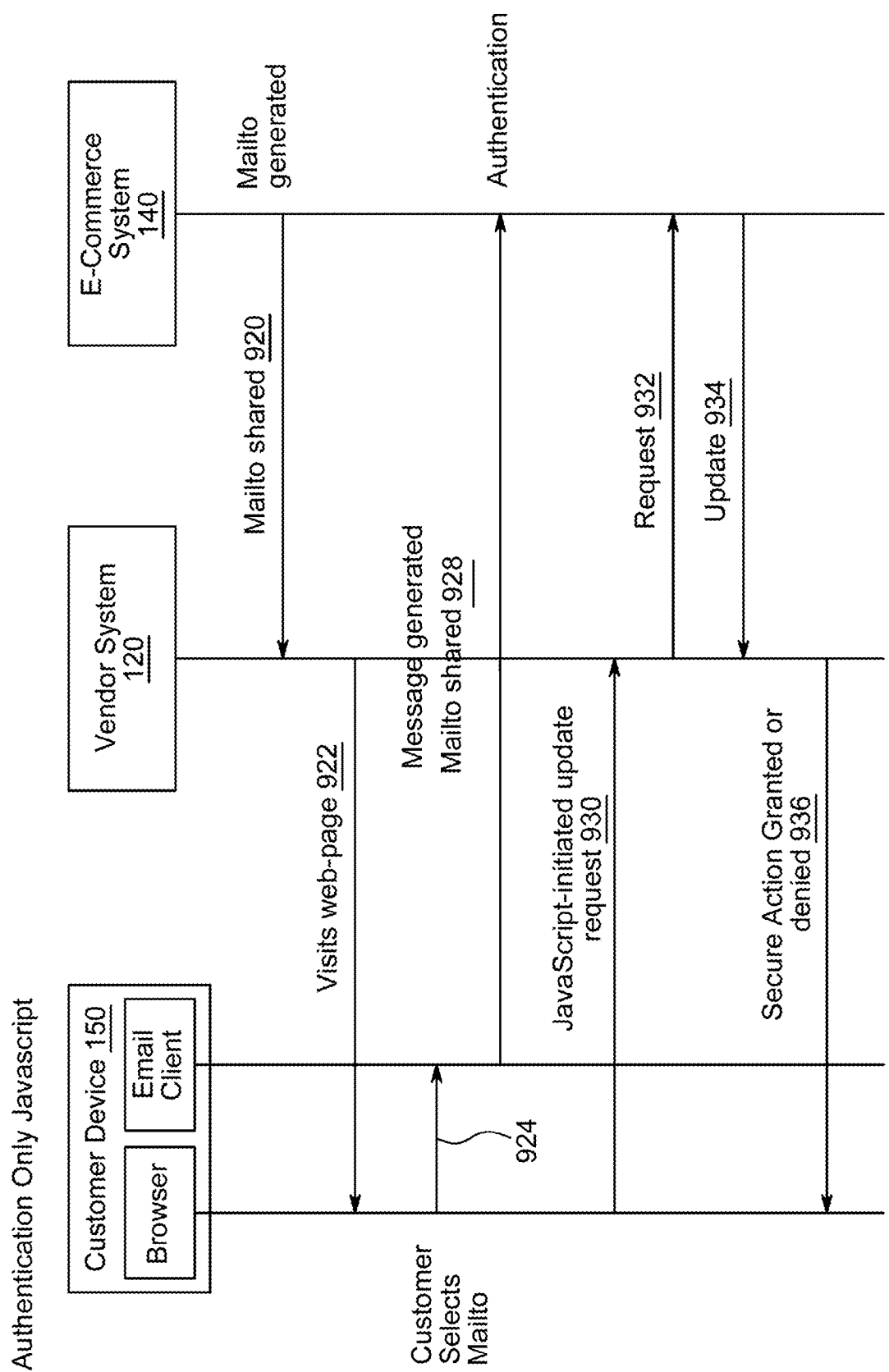
FIG. 9B is a diagram illustrating the flow of transactions between the e-commerce system 140, the vendor and the customer device for granting a secure login using email and JavaScript without a password.

FIG. 9B is a diagram illustrating the flow of transactions between the e-commerce system 140, the vendor 120 and the customer device 150 for granting a secure login using email and JavaScript without a password. The e-commerce system 140 may generate mailto links and tokens for the purpose of granting secure transactions without a password. URLs that generate email messages may substituted for mailto links. The token may contain transaction detail, security keys or secret pins. The authentication of an email message serves as sufficient proof of customer identity.

The e-commerce system 140 shares (920) the mailto link and token with the vendor system 120. The mailto link and token is accessed (922) by the browser unit of the customer device 150 on the vendor system 120. The customer selects (924) the mailto link at device browser unit of the customer device 150. The email client of the customer device 150 then generates and sends (928) an email message addressed to the e-commerce system 140. The email message may contain the token. The token may be anywhere in the email message. The token may be integrated into the email address. The customer may select 'Send' to transmit the message to the e-commerce system 140. Alternatively the message may be sent automatically. The e-commerce system 140 performs a series of checks and authentication.

The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC (Domain-based Message Authentication, Reporting & Conformance). 3) Assurance against DNS attacks, by monitoring the fidelity of DNS records. To insure the fidelity of the DNS record the e-commerce system 140 utilizes a fidelity algorithm to monitor changes to the DNS record as described in FIG. 8. Based on the changes to the DNS record, the e-commerce system 140 may take various actions in response. If the message is determined to be insecure additional confirmations may be sent to the customer and alerts sent to the vendor and/or domains. If the message is determined to be secure and authenticated, the token is decoded, and the transaction proceeds. The DNS Record Monitor may not be required. Authentication may be limited to DKIM, DMARC or SPF path-base authentication. Only one form of authentication be required. The e-commerce system 140 authenticates the digital signature in the customer email. Alternatively or additionally the e-commerce system 140 may publish a "pledge", as a customer's intention to make the transaction. The published pledge maybe be a publicly visible advertisement.

The browser unit of the customer device 150 shares (930) a JavaScripted initiated update request with the vendor system 120. The vendor system 120 submits a request (932) to the e-commerce system 140. The e-commerce system 140 updates (934) the vendor system 120 on the status of the authentication. If the requirements for authentication are not met the vendor system 120 may deny the transaction. If the status update indicates that requirements of authentication are met the vendor system 120 shares (936) the login link with the customer device 150 granting secure access. In some instances, the connection between customer device 150 and vendor system 120 may be maintained by WebSockets. Although in this example granting access to a secure webpage is described it is an example only. Various secure transactions may be granted. A secure transaction could be access to a secure server, secure website, payment processing, control of a digital currency, record keeping, securities and/or contracts. The process of granting access to a customer may allow access to more than one account and more than one customer. Alternatively, the customer may utilize the authentication notification and grant access to a third party vendor. Alternatively, or additionally, in some configurations additional factors of authentication may be applied as described in FIG. 9A.

Figure 9C:
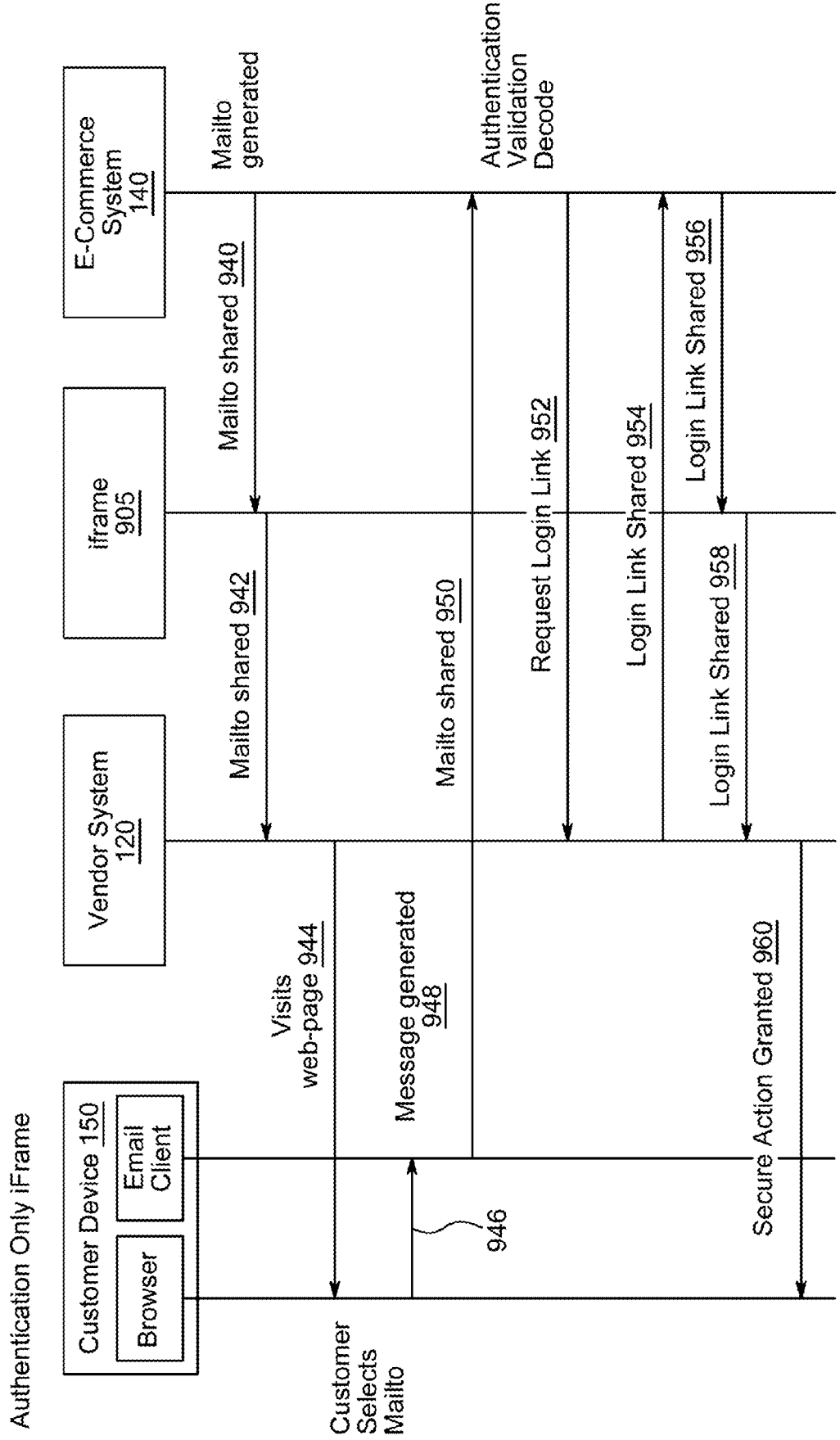
FIG. 9C is a diagram illustrating the flow of transactions between the e-commerce system 140, the vendor and the customer device for granting secure login with email using an iframe without a password.

FIG. 9C is a diagram illustrating the flow of transactions between the e-commerce system 140, the vendor 120 and the customer device 150 for granting secure login with email using an iframe 905 without a password. The e-commerce system 140 may generate mailto links and tokens for the purpose of granting secure transactions without a password. URLs that generate email messages may substituted for mailto links. The token may contain transaction detail, security keys or secret pins. The authentication of an email message serves as sufficient proof of customer identity. The iframe 905 is a connection shared between the e-commerce system 140 and the vendor that allows the e-commerce system 140 access to the vendor page without the vendor making a request. This connection may be achieved by other means. The e-commerce system 140 shares (940) the mailto link with token via the iframe 905. The iframe 905 shares (942) the mailto link and token with the vendor system 120 on the vendor webpage. The mailto login link is accessed (944) by browser unit on the customer device 150. The customer selects (946) the mailto link login link at browser unit of the customer device 150. The email client of the customer device 150 then generates an email message addressed to the e-commerce system 140 at the email client. The email message may contain the token. The token may be anywhere in the email. The token may be integrated into the email address. The customer may select 'Send' to share the message to the e-commerce system 140. Alternatively the message may be sent automatically. The email client of the customer device 150 shares (950) the message with the e-commerce system 140.

The e-commerce system 140 performs a series of checks and authentication. The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC. 3) Assurance against DNS attacks, by monitoring the fidelity of DNS records. To insure the fidelity of the DNS record the e-commerce system 140 utilizes a fidelity algorithm to monitor changes to the DNS record as described in FIG. 8.

Based on the changes to the DNS record, the e-commerce system 140 may take various actions in response. If the message is determined to be insecure additional confirmations may be sent to the customer and alerts sent to the vendor and/or domains. The e-commerce system 140 may authenticate the message. The e-commerce system 140 may decode the token. If the message is determined to be secure and authenticated, the transaction proceeds and the e-commerce system 140 requests (952) the login link from the vendor system 120. The DNS Record Monitor may not be required. Authentication may be limited to DKIM, DMARC or SPF path-base authentication. Only one form of authentication be required. The e-commerce system 140 authenticates the digital signature in the customer email.

In response vendor system 120 shares (954) the login link with the e-commerce system 140. The e-commerce system 140 shares (956) the login link to the iframe (905). The e-commerce system 140 triggers the iframe 905 to share (958) the login link redirect with the customer device 150 by redirecting the parent window to the login link. The vendor system 120 then grants access (960) to the customer device 150. Although in this example grants access to a secure webpage it is an example only. Various secure transactions may be granted. A secure transaction could be access to a secure server, secure website, payment processing, control of a digital currency, record keeping, securities and/or contracts. The process of granting access to a customer may allow access to more than one account and more than one customer. Alternatively the customer utilize the authentication notification and grant access to a third party vendor. Alternatively or additional in some configurations additional factors of authentication may be applied as described in FIG. 9A.

Figure 9D:
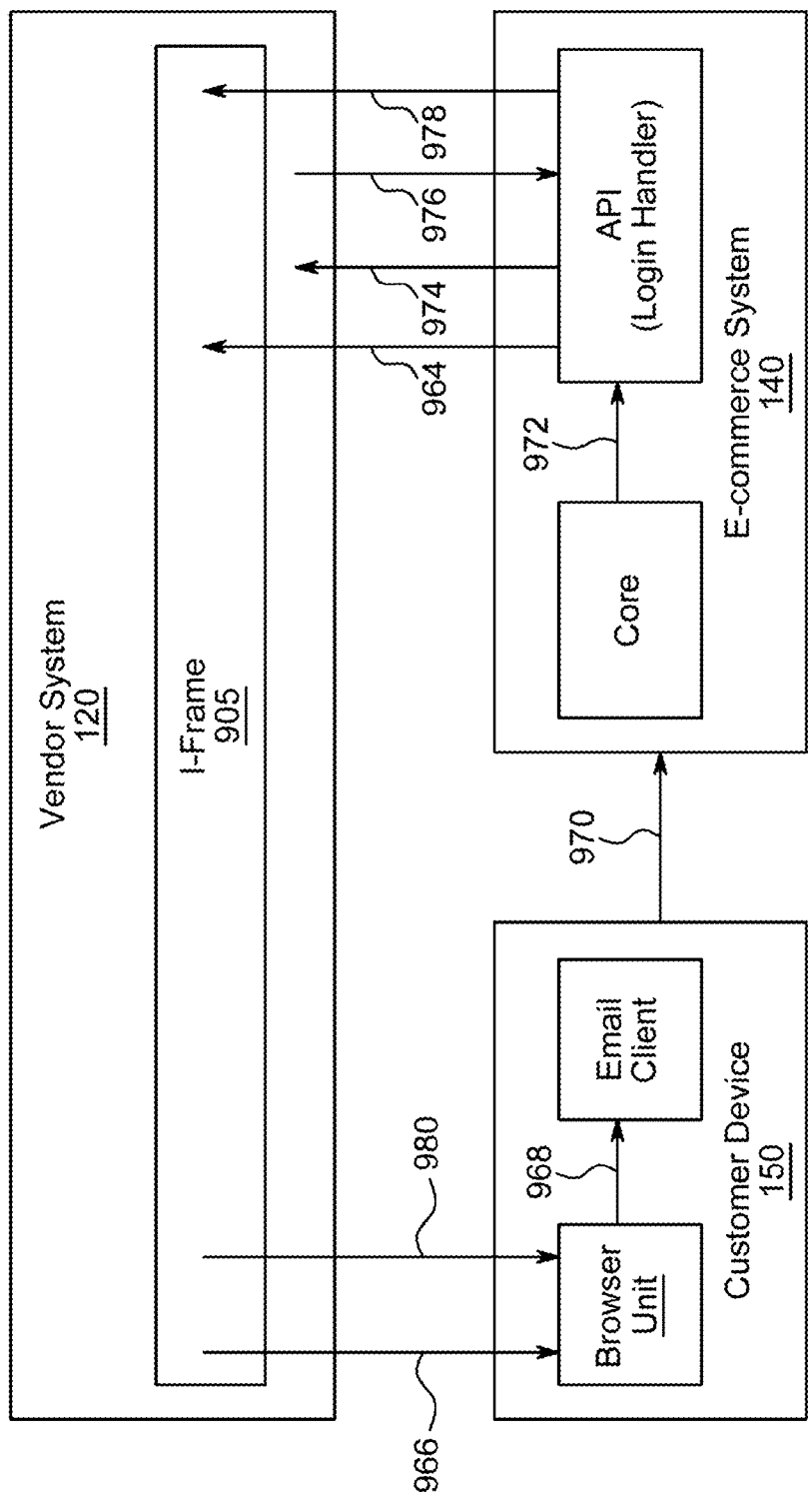
FIG. 9D is a diagram illustrating the flow of transactions between the e-commerce system 140, the vendor and the customer device for granting a secure transaction without a password. The vendor system 120 includes a payment processing and secure login, website unit, and iFrame.

FIG. 9D is a diagram illustrating the flow of transactions between the e-commerce system 140, the vendor system 120 and the customer device 150 for granting a secure transaction without a password. The vendor system 120 includes a payment processing and secure login, website unit, and iframe 905. The customer device 150 includes an email client and a web browser unit. The e-commerce system 140 includes and Core Unit providing authentication, an API that includes a login handler. The e-commerce system 140 shares the mailto login link with the vendor system 120 at Step 964. The mailto login link is made available to the browser unit of the customer device 150 via the iFrame 905 at Step 966. Selecting the mailto link login link at the browser unit of customer device 150, causes the email client to generate an email message which is addressed to the e-commerce system 140 at Step 968. The email client customer device 150 then shares the message with the core of e-commerce system 140 at Step 970. The core at the ecommerce system 140 then performs a series of checks and authentication.

The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC. 3) Assurance against DNS attacks, by monitoring the fidelity of DNS records. To insure the fidelity of the DNS record the e-commerce system 140 utilizes a fidelity algorithm to monitor changes to the DNS record as described in FIG. 8.

Based on the changes to the DNS record, the e-commerce system 140 may take various actions in response. If the message is determined to be insecure additional confirmations may be sent to the customer and alerts sent to the vendor and/or domains. If the message is determined to be secure and authenticated, the transaction proceeds and is shared with the API login handler at step 972. The DNS Record Monitor may not be required. Authentication may be limited to DKIM, DMARC or SPF path-base authentication. Only one form of authentication be required. The e-commerce system 140 authenticates the digital signature in the customer email.

The API login handler of the e-commerce system 140 requests the login link from the vendor system 120 at step 974. In response vendor system 120 shares the login link with the login handler unit of the e-commerce system' 140 in Step 976. The e-commerce system 140 shares the login link to the iframe 905 at Step 978. The e-commerce system 140 then triggers the iframe 905 to redirect the parent window to the login link at Step 980 thereby granting access to the server.

Although in this example step 980 grants access to a secure webpage it is an example only. Various secure transactions may be granted. A secure transaction could be access to a secure server, secure website, payment processing, control of a digital currency, record keeping, securities and/or contracts. The process of granting access to a customer may allow access to more than one account and more than one customer. The e-commerce system 140 may grant the transaction without a request from the vendor system 120. The e-commerce system 140 may generate mailto links and tokens for the purpose of granting secure transactions without a password. URLs that generate email messages may substituted for mailto links. The token may contain transaction detail, security keys or secret pins. The authentication of an email message serves as sufficient proof of customer identity. The iframe 905 is a connection shared between the e-commerce system 140 and the vendor that allows the e-commerce system 140 access to the vendor page without the vendor making a request. Alternatively the customer utilize the authentication notification and grant access to a third party vendor. Alternatively or additional in some configurations additional factors of authentication may be applied as described in FIG. 9A.

Figure 9E:
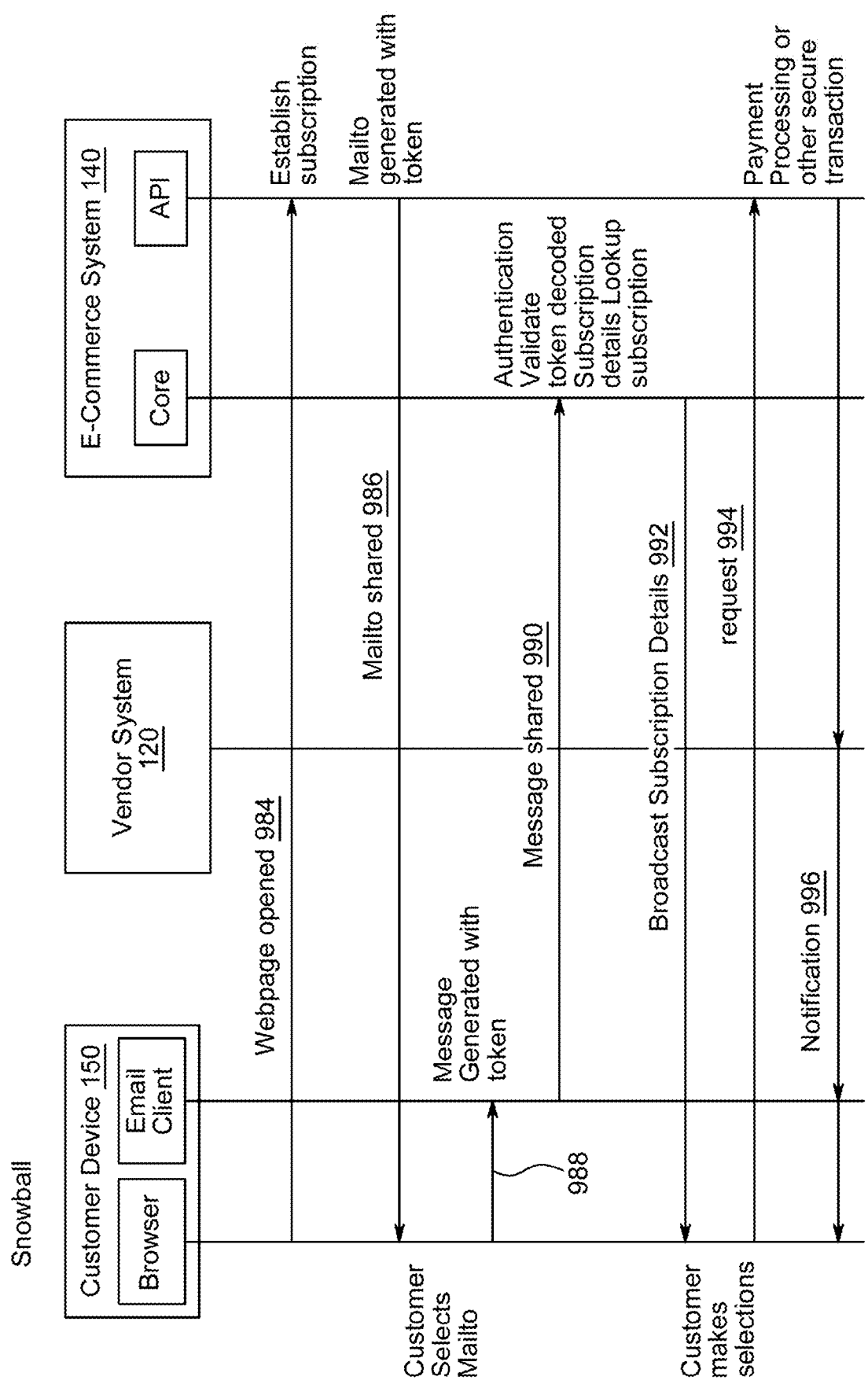
FIG. 9E is a diagram illustrating the flow of transactions between the e-commerce system 140, the vendor and the customer device for granting a secure transactions using email with WebSockets without a password.

FIG. 9E is a diagram illustrating the flow of transactions between the e-commerce system 140, the vendor 120 and the customer device 150 for granting a secure transactions using email with WebSockets without a password. The disclosed invention allows the customer to access a secure connection without a password by utilizing a unique email authentication method and then maintain a secure channel that enables updates via the customer's browser unit. The e-commerce system 140 may generate mailto links and tokens for the purpose of granting secure transactions without a password. URLs that generate email messages may substituted for mailto links. The token may contain transaction detail, security keys or secret pins. The authentication of an email message serves as sufficient proof of customer identity. The browser unit of the customer device 150 accesses (984) a web page of the e-commerce system 140. This page graphically may appear to the customer as the vendor website but is hosted by the e-commerce system 140. The page may offer the customer any one of several types of requests. It may be a request to make a payment, a reservation, a pledge, access to a secure server, request for a quote or may be a shopping cart function. In this example, the customer selects an amount they want to pay and the e-commerce system 140 establishes a subscription for the transaction and generates a mailto link and token at the API unit. The token may contain the subscription details. Alternatively the customer may choose a different type of secure transaction other than a payment such as access to a secure server. The e-commerce system 140 shares (986) the mailto login link that includes a token and subscription with the browser unit of the customer device 150. The customer device 150 then selects (988) the mailto link using the browser unit. The mail client of the client device 150 then generates an email message addressed to the e-commerce system 140.

The email message may contain the token and subscription. The token may be anywhere in the email. The token may be integrated into the email address. The customer may select 'send' to transmit (990) the message to the e-commerce system 140 core unit. Alternatively the message may be sent automatically. The e-commerce system 140 receives the email message.

The core unit at the e-commerce system 140 performs a series of checks and authentication. The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC. 3) Assurance against DNS attacks, by monitoring the fidelity of DNS records. To insure the fidelity of the DNS record the e-commerce system 140 utilizes a fidelity algorithm to monitor changes to the DNS record as described in FIG. 8.

Based on the changes to the DNS record, the e-commerce system 140 may take various actions in response. If the message is determined to be insecure additional confirmations may be sent to the customer and alerts sent to the vendor and/or domains. The e-commerce system 140 may validate and authenticate the message. The DNS Record Monitor may not be required. Authentication may be limited to DKIM, DMARC or SPF path-base authentication. Only one form of authentication be required. The e-commerce system 140 authenticates the digital signature in the customer email.

The e-commerce system 140 may decode the token and perform a lookup with the subscription details. If the message is determined to be secure and authenticated, the transaction proceeds and the e-commerce system 140 looks up the subscription. The e-commerce system 140 may determine that all requirements are met and may perform the secure transaction at this point, for example to process the payment. Alternatively or additionally the e-commerce system 140 may publish a "pledge", as a customer's intention to make a payment. The published pledge maybe be a publicly visible advertisement. (Not depicted)

The core of the e-commerce system 140 utilizes a WebSocket connection and broadcast (992) the subscription details to the browser unit of the customer device 150. The customer may be presented with a series of selections or options on the browser screen. The customer having accessed a secure channel, makes a selection at the browser unit. This may be achieved by a WebSocket connection. These selections may be a choice of many possible options for example credit card selection, an amount change or deliver instructions, these serve as an example only. The customer device 150 may exchange a series of requests (994) with the e-commerce system 140. The series of exchanges may also update the pledge advertisement, for example in an auction amounts could be increased. In this sample there is only one request shared with the API unit of the e-commerce system 140 but multiple exchanges are possible.

The 140 API unit of e-commerce system 140 processes the payment and sends (996) a notification to the customer device. Although in this example payment processing is an example only. Various secure transactions may be granted. A secure transaction could be access to a secure server, secure website, payment processing, control of a digital currency, record keeping, securities and/or contracts. Alternatively, a secure transaction may be granted to either the vendor, third-party or the customer. Alternatively or additional in some configurations additional factors of authentication may be applied as described in FIG. 9A.

Figure 9F:
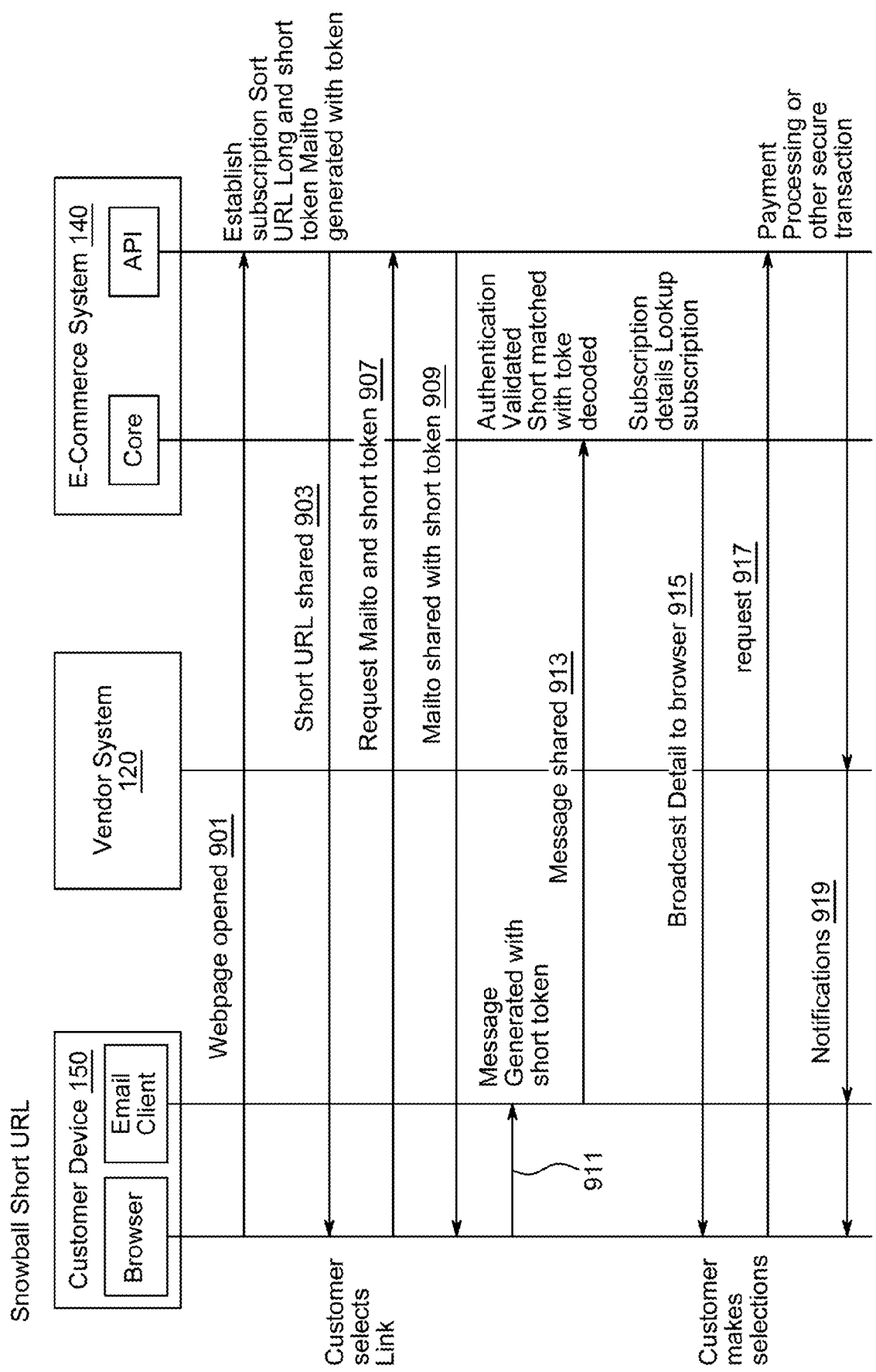
FIG. 9F is a diagram illustrating the flow of transactions between the e-commerce system 140, the vendor and the customer device for granting a secure transactions without a password using WebSockets with email-based authentication and a short URL without a password.

FIG. 9F is a diagram illustrating the flow of transactions between the e-commerce system 140, the vendor 120 and the customer device 150 for granting secure transactions without a password using WebSockets with email-based authentication and a short URL without a password. The disclosed invention allows the customer to access a secure connection without a password by utilizing a unique email authentication method and then maintain a secure channel that enables updates via the customer's browser unit. The e-commerce system 140 may generate mailto links and tokens for the purpose of granting secure transactions without a password. URLs that generate email messages may substituted for mailto links. The token may contain transaction detail, security keys or secret pins. The authentication of an email message serves as sufficient proof of customer identity. The browser unit of the customer device 150 accesses (901) a web page at the e-commerce system 140. This page graphically may appear to the customer as the vendor website but is hosted by the e-commerce system 140. The page may offer the customer any one of several types of requests. It may be a request to make a payment, a reservation, a pledge, access to a secure server, request for a quote or may be a shopping cart function. This page graphically may appear to the customer as the vendor website but is hosted by the e-commerce system 140. The customer selects an amount they want to pay and the e-commerce system 140 establishes a subscription for the transaction and generates a short URL link, a long token and a corresponding short token at the API unit. The e-commerce system 140 shares (903) the short URL Link with the browser unit of the customer device 150. The customer selects the short URL link and requests (907) the mailto with the short token from the e-commerce system 140. The e-commerce system 140 then shares (909) the mailto link with short token with the browser of the customer device 150. The mailto link triggers (911) the browser to open the email client of the customer device 150. The mail client of the customer device 150 then generates and sends (913) an email addressed to the e-commerce system 140 that contains the short token. The email message may contain the token and subscription. The token may be anywhere in the email. The token may be integrated into the email address. The customer may select send to transmit the message to the core unit of the e-commerce system 140. Alternatively the message may be sent automatically. The core unit performs a series of checks and authentication.

The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC (Domain-based Message Authentication, Reporting & Conformance). 3) Assurance against DNS attacks, by monitoring the fidelity of DNS records. To insure the fidelity of the DNS record the e-commerce system 140 utilizes a fidelity algorithm to monitor changes to the DNS record as described in FIG. 8.

Based on the changes to the DNS record, the e-commerce system 140 may take various actions in response. If the message is determined to be insecure additional confirmations may be sent to the customer and alerts sent to the vendor and/or domains. The e-commerce system 140 may validate the message. The e-commerce system 140 may decode the token and subscription details. If the message is determined to be secure and authenticated, the short token is matched with the long token and the long token is decoded. The DNS Record Monitor may not be required. Authentication may be limited to DKIM, DMARC or SPF path-base authentication. Only one form of authentication be required. The e-commerce system 140 authenticates the digital signature in the customer email. The long token may contain the subscription. The transaction proceeds and the e-commerce system 140 looks up the subscription. Alternatively the e-commerce system 140 may choose to perform the secure transaction, for example to process the payment. Alternatively or additionally the e-commerce system 140 may publish a "pledge", as a customer's intention to make a payment. The published pledge maybe be a publicly visible advertisement. (Not depicted)

The core of the e-commerce system 140 utilizes the WebSocket to broadcast (915) the subscription details to the browser unit of the customer device 150. The customer may be presented with a series of selections or options on the browser screen. The customer having accessed a secure channel, makes a selection at the browser unit. This may be achieved by a WebSocket connection. These selections may be a choice of many possible options for example credit card selection, an amount change or deliver instructions, these serve as an example only. The customer may exchange a series of requests (917) with the e-commerce system 140. In this sample there is only one request shared with the e-commerce system 140 API unit. The e-commerce system 140 processes the payment and sends (919) a notification to the client device 150. Although in this example granting access to a secure payment is described it is an example only. Various secure transactions may be granted. A secure transaction could be access to a secure server, secure website, payment processing, control of a digital currency, record keeping, securities and/or contracts. The process of granting access to a customer may allow access to more than one account and more than one customer. Alternatively the customer may utilize the authentication notification and grant access to a third party vendor. Alternatively or additional in some configurations additional factors of authentication may be applied as described in FIG. 9A.

FIG. 9G is a diagram illustrating the flow of transactions between the e-commerce system 140 and customer device 150 for facilitating pledges and payment without a password using with email-based authentication. Pledging is where a customer commits to a payment to a vendor but has yet to actually pay the amount to the vendor. In this example the vendor could be a charity or nonprofit accepting contributions. The disclosed invention allows the customer to access a secure connection without a password by utilizing a unique email authentication method and then maintain a secure channel that enables updates via the customer browser unit. The browser unit of the customer device 150 accesses a web page at the e-commerce system 140. This page graphically may appear to the customer as the vendor website but this page is hosted by the e-commerce system 140. The website page may display a series of pledge options. The pledges may be in differing dollar amounts. The customer selects an amount they want to pledge and shares it with the commerce system 140 in Step 921. The e-commerce system 140 establishes a subscription for the transaction and generated a mailto login link and token at the API unit. The e-commerce system 140 shares the mailto link that includes a token and subscription with the browser unit of the customer device 150 in Step 923. The customer selects the mailto link login link using device browser unit of the customer device 150 and generates an email message addressed to the e-commerce system 140 in Step 931. The email message may contain the token and subscription. The token may be anywhere in the email or be part of the emails address. The customer may select send to transmit the message to the e-commerce system 140 in Step 925. Alternatively the message may be sent automatically. The e-commerce system 140 performs a series of checks and authentication. The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity.

The e-commerce system 140 may perform a check based on DMARC (Domain-based Message Authentication, Reporting & Conformance). 3) Assurance against DNS attacks, by monitoring the fidelity of DNS records. To insure the fidelity of the DNS record the e-commerce system 140 utilizes a fidelity algorithm to monitor changes to the DNS record as described in FIG. 8. Based on the changes to the DNS record, the e-commerce system 140 may take various actions in response. If the message is determined to be insecure additional confirmations may be sent to the customer and alerts sent to the vendor and/or domains. The e-commerce system 140 may validate and authenticate the message. The DNS Record Monitor may not be required.

Authentication may be limited to DKIM, DMARC or SPF path-base authentication. Only one form of authentication be required.

The e-commerce system 140 authenticates the digital signature in the customer email. The e-commerce system 140 may decode the token and subscription details. The subscription may be part of the token. If the message is determined to be secure and authenticated, the transaction proceeds and the e-commerce system 140 looks up the subscription. The core utilizes the WebSocket and broadcast the subscription details to the browser unit of the customer device 150 in Step 927. The customer having accessed a secure channel maybe presented with a series of selections or options on the browser screen. One of these may be to make payment on customer's pledge. The customer may also choose how they wish to pay or to dedicate their pledge to the memory of another person. The customer makes a selection at the browser unit of the customer device. This selection may also be to pay at a later time. The customer may exchange a series of requests with the e-commerce system 140. In this sample there is only one request shared with the e-commerce system 140 in Step 929. The e-commerce system 140 processes the payment. Although in this example granting access to a secure pledge and payment is described, it is an example only. Various secure transactions may be granted. A secure transaction could be access to a secure server, secure website, payment processing, control of a digital currency, record keeping, securities and/or contracts. The process of granting access to a customer may allow access to more than one account and more than one customer. Alternatively the customer utilize the authentication notification and grant access to a third party vendor. Alternatively or additional in some configurations additional factors of authentication may be applied as described in FIG. 9A.

Figure 9H:
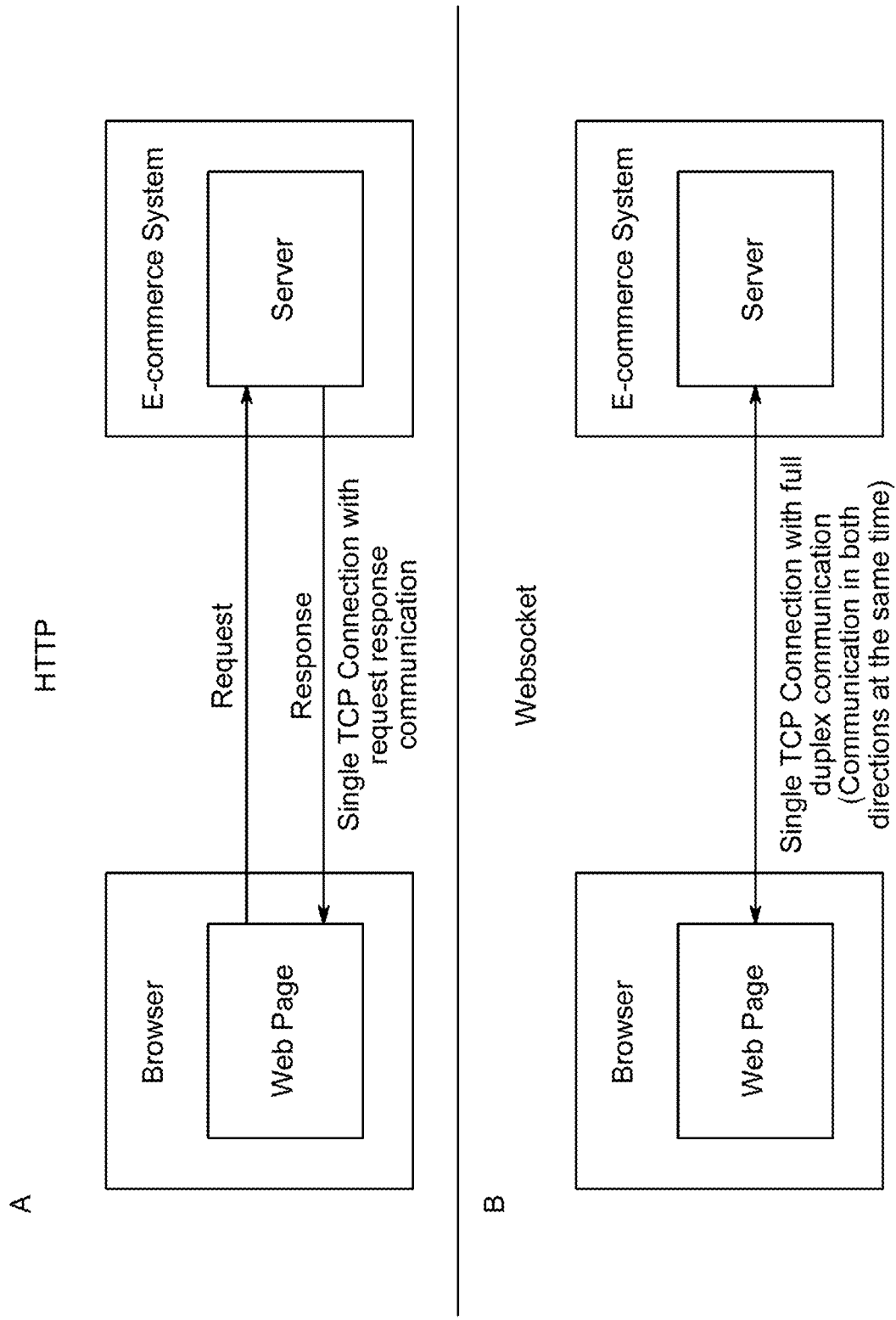
FIG. 9H illustrates the difference between request response communication versus full duplex communication in a Single Transmission Control Protocol (TCP) Connection.

FIG. 9H illustrates the difference between request response communication versus full duplex communication in a Single Transmission Control Protocol (TCP) Connection. The disclosed invention allows secure access to servers for a wide range of activity where privacy is essential. Gaining access to login using email-based authentication as a replacement for passwords requires various solutions. One obstacle to login using email-based authentication is eliminating the need for additional request, steps or messages. FIG. 9H Section A illustrates a single transmission control protocol connection with a request response communication requires the server to wait on receiving a request from the webpage. This also results in a high volume of requests passing between the webpage and the e-commerce system 140 server and would require extra steps for the customer. To lower the volume of requests and to enable fluid toggling between a browser and an email account and shorter wait times requires a continuous connection on a network using transmission control protocol between the ecommerce system and the vendor webpage. Full duplex communication enables communication between the e-commerce system 140 and the web page on the vendor browser. One way of accomplishing this is by implementing a version of WebSockets adapting it to use with an email client. FIG. 9H Section B is an diagram illustrating the relationship between the e-commerce system 140 and the vendor webpage when implementing WebSockets. Once a channel is establishes the e-commerce server can call at any time without additional requests from the vendor webpage. By adapting an email-based authentication with WebSockets a password is not required and access can occur in a more automated fashion. For example at step 974 of FIG. 9D, the e-commerce system 140 is not required to wait for a request from the vendor server but can proceed with the transaction. This significantly reduces the number of requests between the e-commerce system 140 and the vendor webpage and allows for a dynamic user experience that reduces the number of steps required by the customer. The present disclosure is a design for a system that integrates secure channels adapting WebSockets with a range of unique authentication techniques to eliminate password requirements while still providing vendors confirmation of a customer's online identity.

Figure 10A:
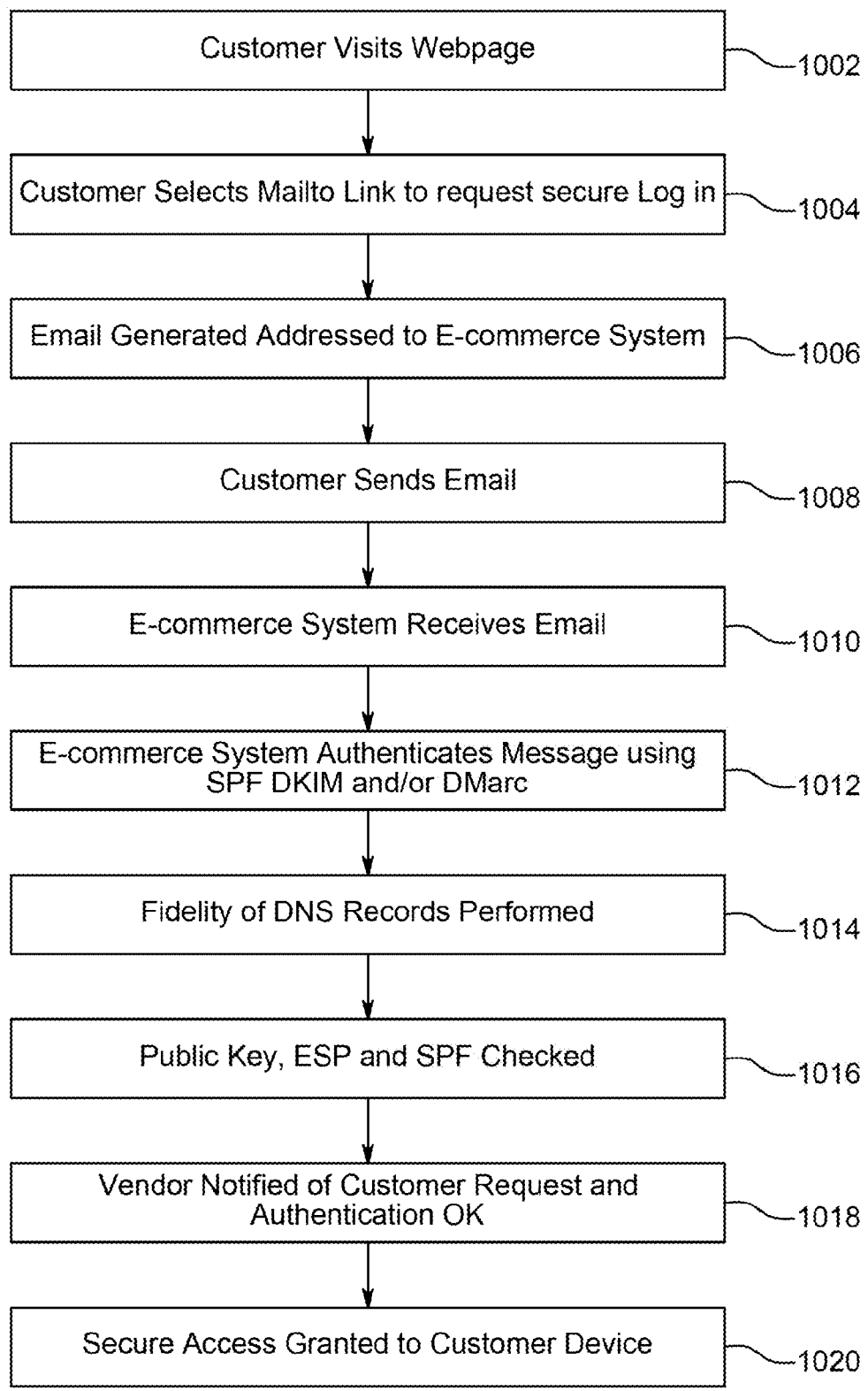
FIG. 10A is a transactional flow diagram illustrating the process for granting access to a secure account using email authentication.

FIG. 10A illustrates a method 1000 for granting access to a secure account using email authentication. Method 1000 includes the customer using the customer device 150 to visit the vendor web page at step 1002 and selects the mailto link to request a secure log in at step 1004. URLs that generate email messages may substituted for mailto links. The customer may select the mailto link. The customer device 150 generates an email addressed to the e-commerce system 140 at step 1006 and the customer sends the email to the e-commerce system 140 at step 1008. The e-commerce system 140 receives the email at step 1010. The e-commerce system 140 authenticates the message using SPF, DKIM and/or Dmarc at step 1012. Authentication may be limited to DKIM, DMARC or SPF path-base authentication. Only one form of authentication be required. The e-commerce system 140 authenticates the customer email using the digital signature. One example of a digital signature might be "b=dzdVyOfAKCdLXdJOc9G2q8LoXSIEniSbav+yuU4zGeeruD00IszZ VoG4ZHRNiYzR" The e-commerce system 140 may vary the specific form of authentication based on vendor needs and use other related forms of authentication. The email may contain instructions or identifiers that require further decoding however in this example no identifiers are required. Authentication of the customer email may be all that is required. Fidelity of DNS records is performed at step 1014. The public key, the ESP and the SPF records are checked at step 1016. Fidelity of DNS records may result in a score or rating. If the fidelity of DNS records is determined to be insecure additional confirmations may be sent to the customer and alerts sent to domains. If the fidelity of DNS records is determined to be secure, the transaction proceeds. In some instances, the DNS Record Monitor may not be required.

The e-commerce system 140 shares the identifier with the vendor system 120. The vendor 120 is notified that the customer request and authentication is determined OK and can proceed at step 1018. Vendor 120 may use the identifier to determine the session to be initiated. The vendor 120 grants secure access to the account via customer device 150 at step 1020.

Figure 10B:
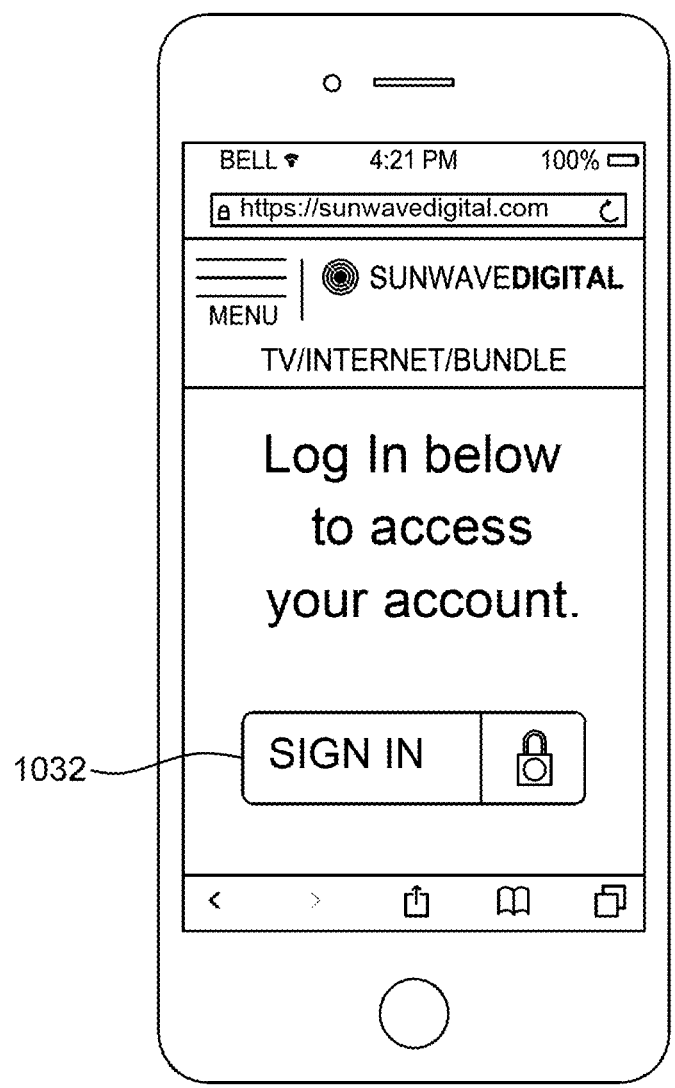
FIG. 10B is an example of a possible interface for granting access to a secure account using email authentication.

FIG. 10B is an example interface 1030 for granting access to a secure account using email authentication at step 1004. The mailto link may be presented as a graphic image such as a button or icon 1032. The mailto link contains at least one identifier.

Figure 10C:
FIG. 10C is an example of an email generated from the mailto link for granting access to a secure account using email authentication.

FIG. 10C is an example of an email 1040 generated from the mailto link for granting access to a secure account using email authentication at step 1008.

The email is addressed to 1042 the e-commerce system 140 and demonstrates an example of the token integrated into the email address. The subject line 1044 includes a description of the email message action. The body of the email 1046 includes a description of the transaction. The "send" button 1048 may be initiated to complete the transaction.

Figure 10D:
FIG. 10D is an example of a page that the customer device may display while awaiting secure access.

FIG. 10D is an example of a page 1050 that the customer device 150 may display while awaiting secure access.

Figure 10E:
FIG. 10E is one example of a secure page.

FIG. 10E is one example of a secure page 1060. In one version the vendor 120 or ecommerce system 140 may send a secure log in link via email to the email address of the customer. By selecting the link, the customer accesses a secure webpage 1060.

Figure 11:
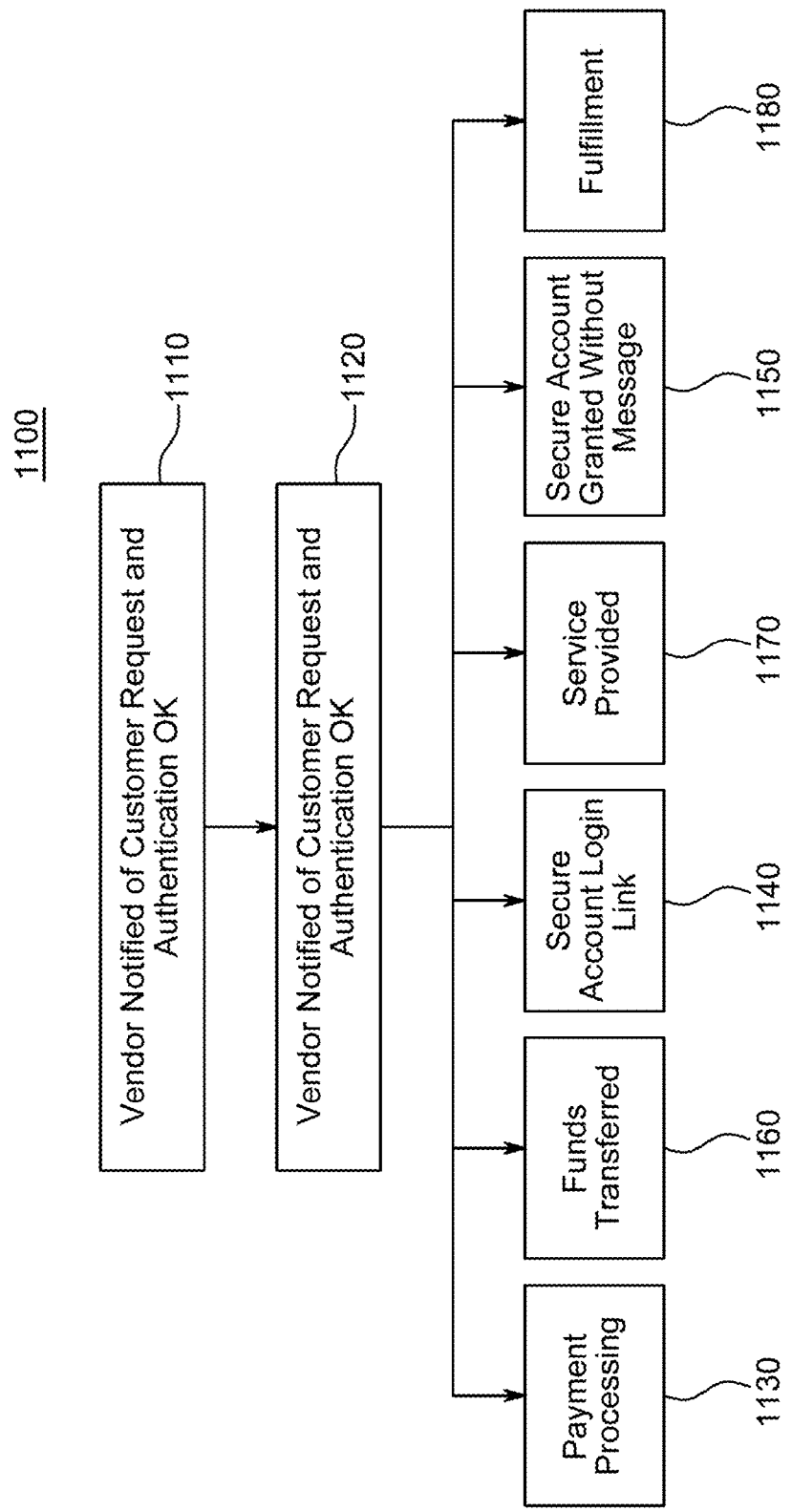
FIG. 11 is a diagram illustrating the possible form of secure actions that may be taken.

FIG. 11 is a diagram 1100 illustrating the secure actions that may be taken. Some or all actions may be provided by the vendor 120, e-commerce system 140 or third party. The specific configuration between entities may be determined by the vendor 120 needs. The vendor 120 is notified of customer request and that the authentication is determined OK at step 1110. In this example, secure access is granted to the customer device 150 at step 1120. This access may be used to approve an online payment at step 1130. This access may be used access a secure online account by sending the customer message containing a secure login link at step 1140. This access may be to any for a secure online account at step 1150 for example an e-commerce site, an online checkout or cart, credit card or bank account, financial portfolio, content provider, bill payment, donation account or file sharing service. The customer may be granted access without a message with a link being sent to them.

The customer may view a URL page and may automatically have the page grant access after the authentication is determined OK. Other actions that may be taken based on an OK determination are the transfer of funds at step 1160, service provided at step 1170 and fulfillment at step 1180. These actions may be online such as providing an online gift certificate or access to an audio or video file. A service or fulfillment may also be provided in a brick and mortar fashion, with the customer physically present for the service or initiating a shipment.

Figure 12A:
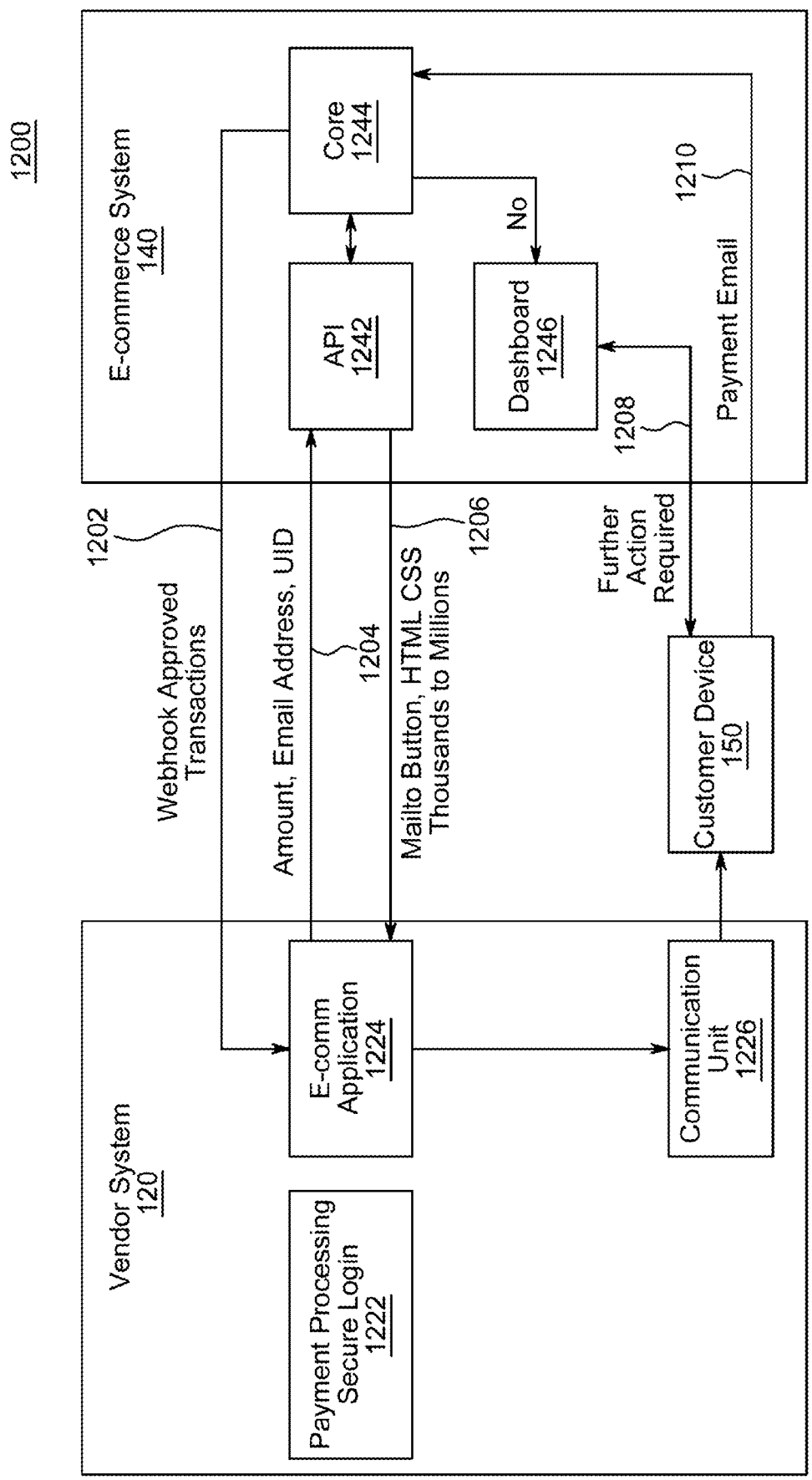
FIG. 12A is a diagram illustrating the flow of transactions between the e-commerce system 140 vendor and customer device.

FIG. 12A is a diagram 1200 illustrating the flow of transactions between the e-commerce system 140, the vendor 120 and the customer device 150. The vendor system 120 includes a payment processing secure login 1222, an e-commerce application 1224, and a communication unit 1226. The e-commerce system 140 includes an API 1242, a core 1244 and a dashboard 1246.

The customer device 150 may send and receive messages such as emails, SMS, social media, phone calls, quick response codes, near field communication and web browser access and payment emails 1210. The customer device 150 may also receive communications from the e-commerce system 140 or other third parties. The e-commerce system 140 communicates with the vendor 120 and the customer device 150 and authenticates messages from the customer device 150 at the core unit 1244. If the authentication is determined a NO, the core unit 1244 shares the result with the dashboard unit 1246. The dashboard unit 1246 may communicate with customer device 150 if further action is required 1208. The core unit 1244 together with the API unit 1242 may authenticate incoming messages from customer devices 150. The core unit 1244 together with the API unit 1242 may perform a webhook updating 1202 to the vendor system 120 of approved transactions at the vendor's 120 e-commerce system 140 application 1224. The vendor system 120 at the vendor's e-commerce system 140 application 1124 shares information with the e-commerce system's 140 API unit 1242. Information may include price, amount email address, UID 1104, Mailto links Buttons HTML and CSS 1106. The vendor system 120 may include a unit that controls payment processing and/or a secure login function 1222 and communication unit 1226 that controls messages to the customer device.

Figure 12B:
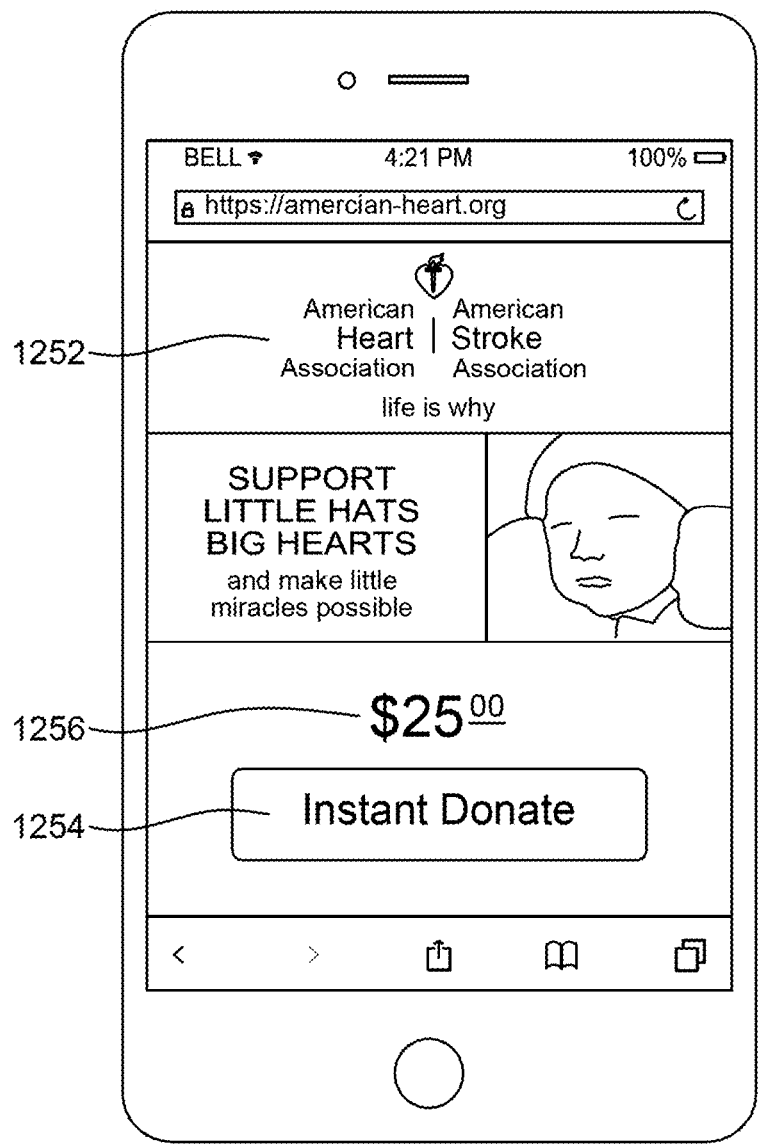
FIG. 12B is an example screen used to make a donation via the vendor website.

FIG. 12B is an example screen 1250 used to make a donation via the vendor website. The website 1252 may be displayed. The screen 1250 may include an actionable button 1254 along with an amount 1256 for performing the transaction, in this case making a $25 donation.

Figure 13A:
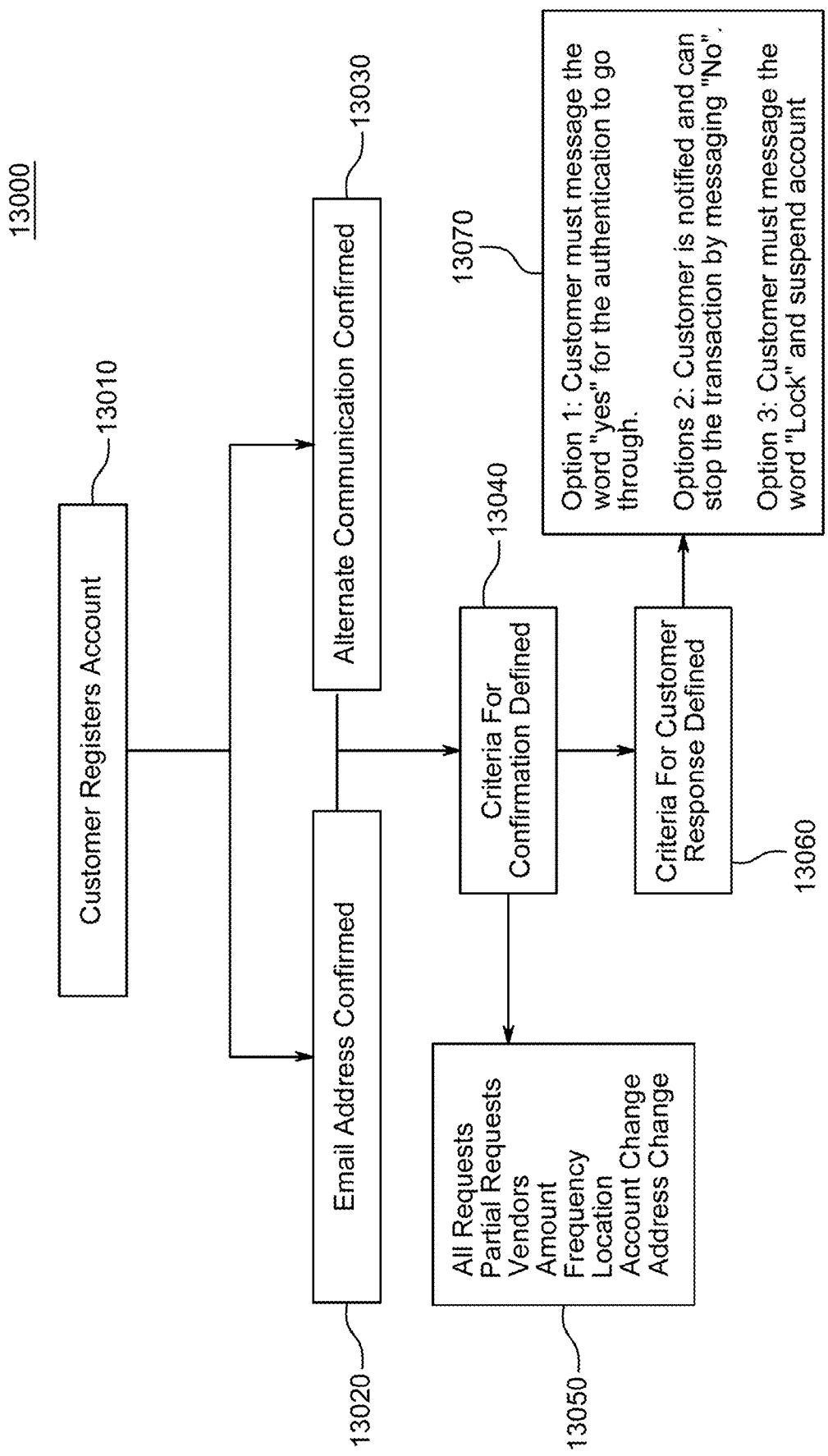
FIG. 13A is a diagram illustrating the customer setup for an account to monitor their email account utilizing two factor authentication.

FIG. 13A is a diagram 13000 illustrating the customer setup for an account to monitor their email account utilizing two factor authentication. The customer via the customer device 150 registers their email account at step 13010 by accessing a webpage or an application. This webpage maybe a password secure page or a page secured by email based authentication. The application may be in various forms such as a mobile application. The customer's email address is confirmed at step 13020 and a customer may input an alternate method of communication which also may be confirmed at step 13030. Alternate method of communication may be SMS or a social media account, for example. There may be more than one alternate method of communication. The confirmations may require test messages being sent to those accounts with required responses to fully register the customer.

The customer defines the criteria where a confirmation message is required at step 13040. One option may be that every request for authentication requires a confirmation message at step 13050. Possible criteria are that 'All Request', 'Partial Requests' only from specific 'Vendors" accounts, a confirmation or notification may be required based on the 'Amount' of money or data requested, The 'Frequency' of authentications and changes in "Location". If changes to the account are requested or and address change is requested this may require a confirmation message (i.e., an extra factor of authentication of a customer's identity).

The customer may also define the criteria for customer response at step 13060. This defines the options for the type of actions the customer may be able to take at step 13070. A first option includes the customer being sent a confirmation message and the customer must message a word such as "YES" for the authentication to go through. A second option includes the customer being sent a confirmation message and can stop the transaction by messaging "NO". A third option includes the customer being sent a confirmation message and must message the word "LOCK" and suspend account until further action is taken. In some configurations no action may be required and only offered to the customer as an option. Secret pins may be substituted for the required responses. The options presented are examples. Many other possible action may be offered.

Figure 13B:
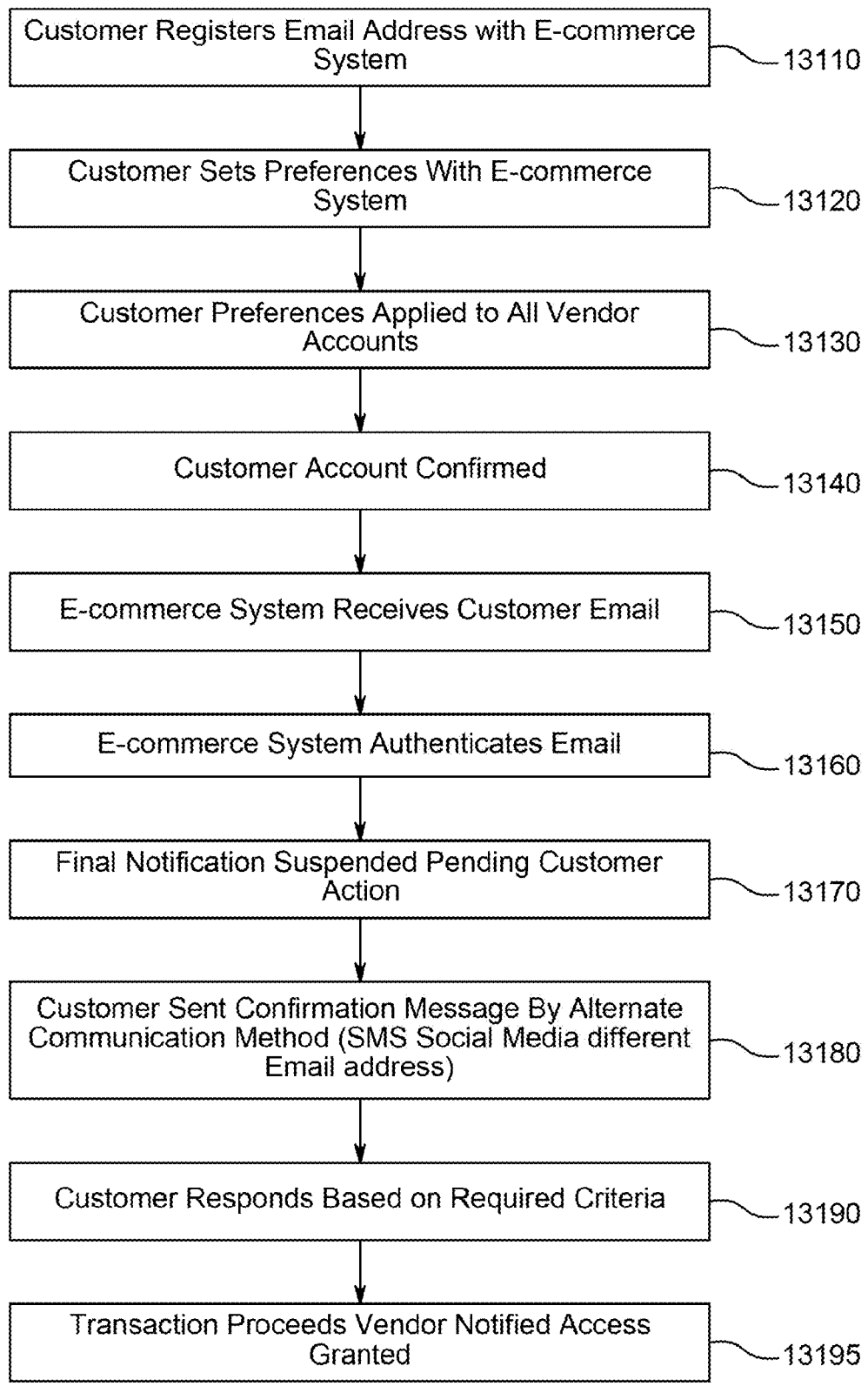
FIG. 13B is a diagram illustrating the steps to monitor the security of an email based authentication for accessing secure accounts utilizing two factor authentication.

FIG. 13B is a diagram 13100 illustrating the steps to monitor the security of an email based authentication for accessing secure accounts utilizing two factor authentication. A customer using customer device 150 registers an email address with the e-commerce system 140 at step 13110. The customer may be required to configure preferences with the e-commerce system 140 at step 13120. These preferences may be some of the criteria required for confirming authentication. The preferences may be applied to all of the vendor 120 accounts associated with the customer's email address at step 13130. Alternatively, the customer using customer device 150 may set the vendor 120 list individually. The customer account is confirmed at step 13140. This may require the customer responding to a separate set of messages confirming and authenticating the messaging accounts. The e-commerce system 140 may receive a customer email that requires authentication at step 13150. The e-commerce system 140 authenticates the email at step 13160. Additional lookup may be required based on identifiers in the email. Final notification of the vendor 120 may be suspended pending customer action at step 13170. The customer is sent a confirmation message by alternate communication method (SMS Social Media different Email address) at step 13180. The customer responds based on required criteria at step 13190. This response may include selecting a link, sending a message or entering a pin. The transaction proceeds based on result of the response at step 13195. Criteria for response may be based on authentication requirements described in FIGS. 7 and 8. If all criteria are met, the vendor 120 is notified and access granted to customer device 150. In the case that the criteria are not met, the e-commerce system 140 may suspend the account or send additional message confirmations. Additional alternate communication addresses may be used.

Figure 13C:
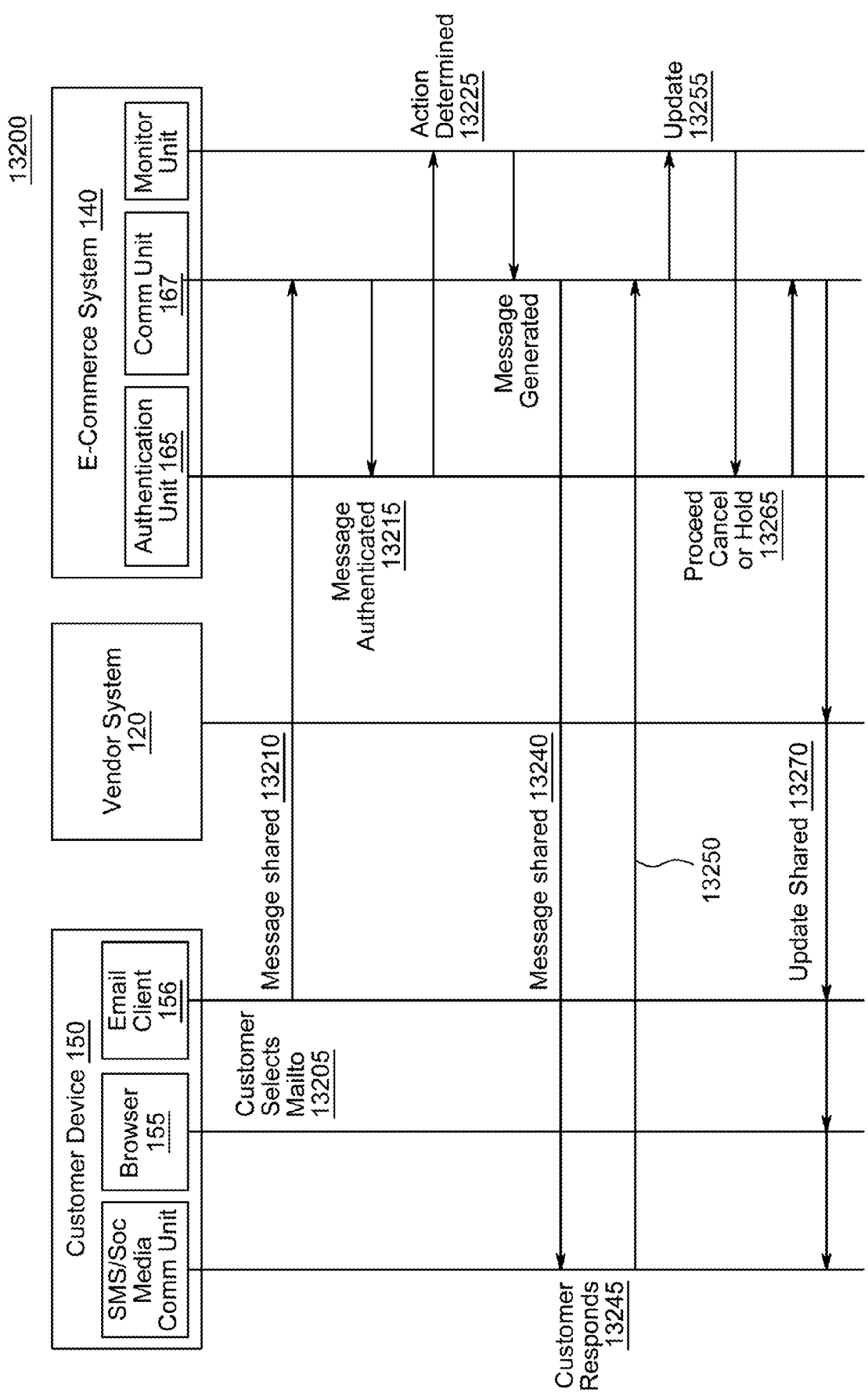
FIG. 13C is a transactional flow diagram 900 illustrating two-factor authentication for account login and password-less transactions utilizing two factor authentication.

FIG. 13C is a transactional flow diagram 13200 illustrating two-factor authentication for account login and passwordless transactions utilizing two factor authentication. The customer using customer device 150 accesses a mailto link at step 13205. The mailto link may be accessed multiple ways such as in a message or on a webpage or in an electronic document. The mailto link may be generated with at least one identifier. A message is generated from the mailto link with the message addressed to the e-commerce system 140. The customer selects the mailto link and shares the message at step 13210 with the e-commerce system 140 at the communication unit 167. The communication unit 167 shares the message with the authentication unit 165 at step 13215. Various forms of authentication may be used such as SPF, DKIM and DMarc. The e-commerce system 140 may take various actions based on the outcome of the authentication process. The e-commerce system 140 may perform a lookup of the customer's account using the identifier and or email address. The e-commerce system 140 may not require any identifier.

If the customer is not authenticated or is missing information or does not have an account, the customer may be navigated to a signup page for registration with the vendor 120 and the e-commerce system 140. If the authentication is determined OK, the authentication unit 165 may update the monitor unit. The monitor unit accesses the customer account and determines the action to be taken at step 13225.

Various type of actions may be taken including sending a notification requiring a confirmation. In a first example, the customer may be sent a confirmation message and the customer must message a word such as "YES" for the authentication to go through. In a second example, the customer may be sent a confirmation message and can stop the transaction by messaging "NO". In a third example, the customer is sent a confirmation message and must message the word "LOCK" and suspend account until further action is taken. In some configurations no action may be required and only offered to the customer as an option. Secret pins may be substituted for the required responses. The option presented are examples. Many other possible actions may be offered.

The communication unit 167 and the monitor unit determine the action to be taken and generate a confirmation message at step 13235. The confirmation message is shared at step 13240 to the alternate communication method address of the customer at the communication unit of the customer device 150. An example of an alternative communication method is SMS, social media or a different email account. The customer responds to the message at step 13245. For example, the customer may need to enter the prompt 'YES' to approve confirm access. A configuration may also include a situation where no action is necessary and the customer may only be offered the option to suspend the account pending further confirmations. The customer generates a confirmation response message. The confirmation response message is shared with the e-commerce system 140 at the communication unit 167 at step 13250. The communication unit 167 updates the monitor unit at step 13255. The monitor unit shares the update with the authentication unit 165 at step 13265. Based on that update, the authentication unit 165 updates the communication unit 167 and the command is initiated. This command may be a function of the e-commerce system 140, vendor 120 or customer device 150 at step 13270. One command may be to allow the transaction to proceed or to cancel it. Alternatively the account could be temporarily suspended pending further action.

As described above the customer or vendor may determine the criteria for the e-commerce to send a confirmation or a notification. Alternatively or additionally the e-commerce may utilize a machine learning algorithms or artificial intelligence program to determine the range of predictable requests for specific users. These may be applied to customer, vendor and/or potential hacker. For example when customers responses vary from the predictable range or are inconsistent with past behaviors the e-commerce system 140 may send a confirmation message to one or all the communication methods. These calculations may include the vendors individually and as a group. The artificial intelligence may also predict behaviors of hackers calculating the predictability of emails accounts that may display a greater possibility of being targeted by hackers. The e-commerce system 140 may proactively warn those users suggesting or requiring greater notifications and confirmations.

Figure 14A:
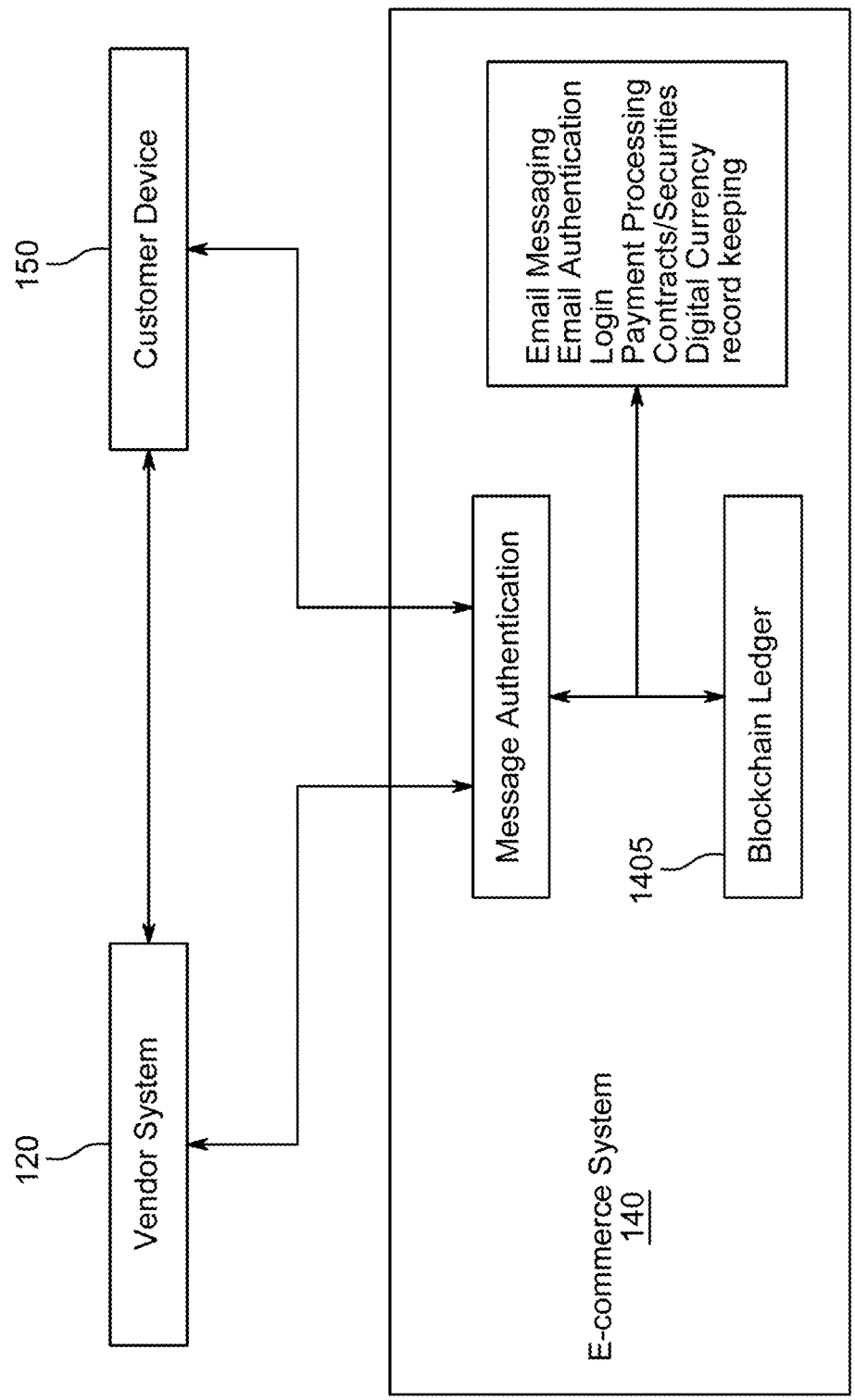
FIG. 14A is a diagram illustrating the relationship of the e-commerce system 140 that facilitates email-based authentications of a range of secure transactions secured by a blockchain ledger.

FIG. 14A is a diagram illustrating the relationship of the e-commerce system 140 1 that facilitates email-based authentications of a range of secure transactions secured by a blockchain ledger 1405. In an online environment where customer device 150 and the vendor system 120 use email authentication as a replacement for a password. Vendor system 120 may communicate directly with the customer device 150. In some instances the vendor system 120 and customer may use the e-commerce system 140 as an intermediary or register with the e-commerce system 140 to manages transactions. In the disclosed invention the e-commerce system 140 provides email authentication but also facilitates a unified access to blockchain ledger 1405 as a security measure. The e-commerce system 140 may provide email authentication for multiple types of online transactions. For example the e-commerce system 140 may provide email messaging, email authentication, conventional payment processing, payment processing of virtual or digital currencies, contracts and securities and record keeping. In this configuration the e-commerce system 140 manages the transactions for vendors and customers.

Figure 14B:
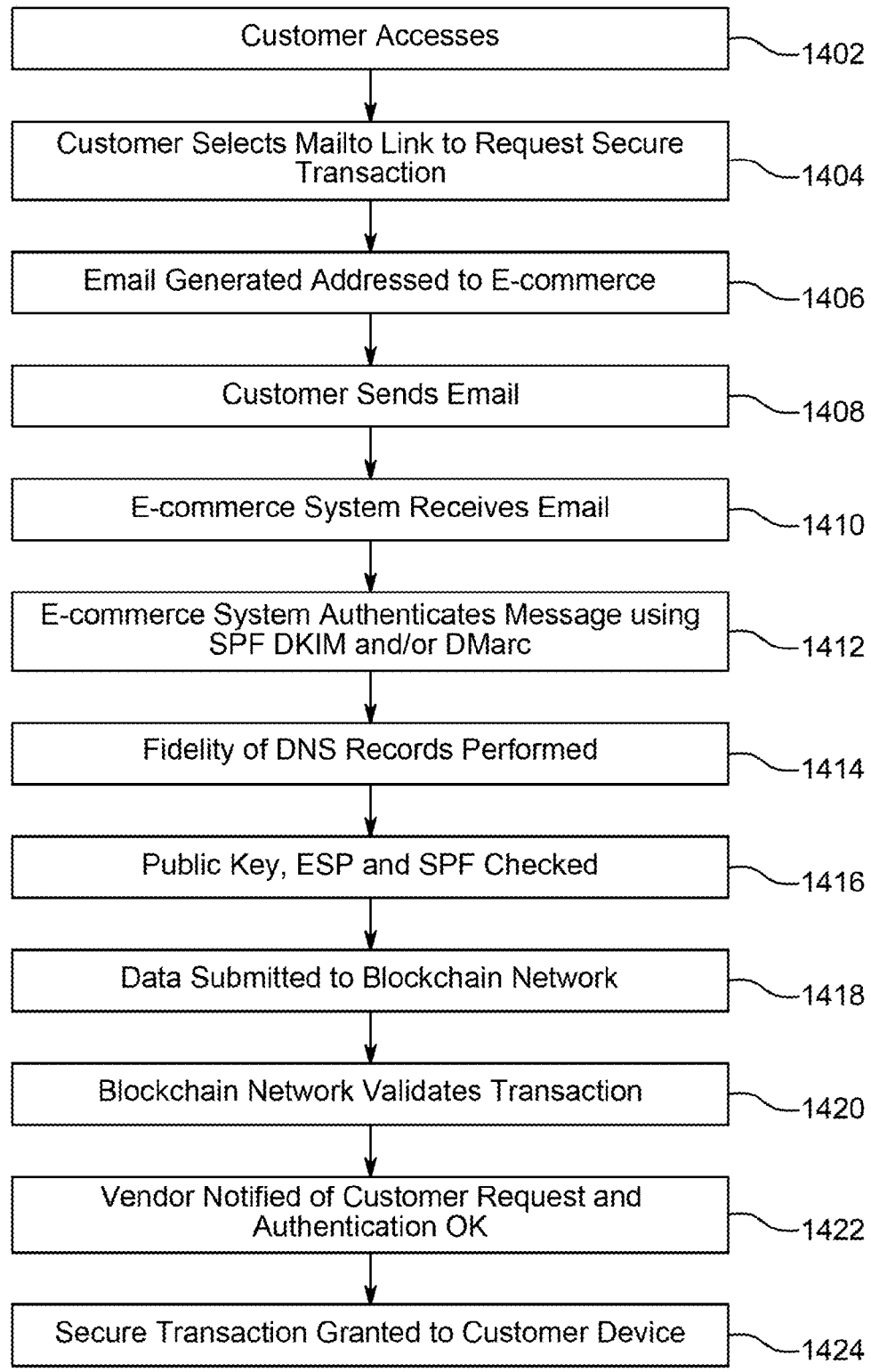
FIG. 14B is a diagram illustrating the flow of transactions to that enable login using email-based authentication with a blockchain network.

FIG. 14B is a diagram illustrating the flow 140 0 of transactions to that enable login using email-based authentication with a blockchain ledger 1405. The customer may access (1402) the mailto login link through various means. For example, they may access it on a webpage or a vendor webpage with an iframe controlled by the e-commerce system 140 or a secure channel such as a WebSocket, on a document, email message, SMS or social media post. The customer selects (140 4) the mailto login link or is automatically selected by and application. The customer device 150 generates (1406) an email addressed to the e-commerce system 140. The email may hold a token. The customer device 150 sends (1408) the email or the email may be automatically sent by the application and is not visible to the customer. The e-commerce system 140 receives the email (1410) and authenticates (1412) the email message. The e-commerce system 140 may authenticate the email message using various methods. For example SPF, DKIM and/or DMarc may serve as authentication. Authentication may be limited to DKIM, DMARC or SPF path-base authentication. Only one form of authentication may be required. A check (1414) on the fidelity of DNS registry may be performed. Public Key, ESP and SPF may be checked (1416). The transaction data is submitted (1418) to the blockchain ledger 1405. The blockchain ledger 1405 validates (1420) and authenticates (1422) the transaction. If the transaction is determined not valid the e-commerce system 140 is notified and the transaction may be denied or further action may be taken. Vendor notified of the customer request and authentication OK and determined as secure. The secure transaction is granted (1424) to the customer device 150. A secure transaction could be access to a secure server or website or payment processing control of a digital currency, record keeping, securities or contract.

Figure 14C:
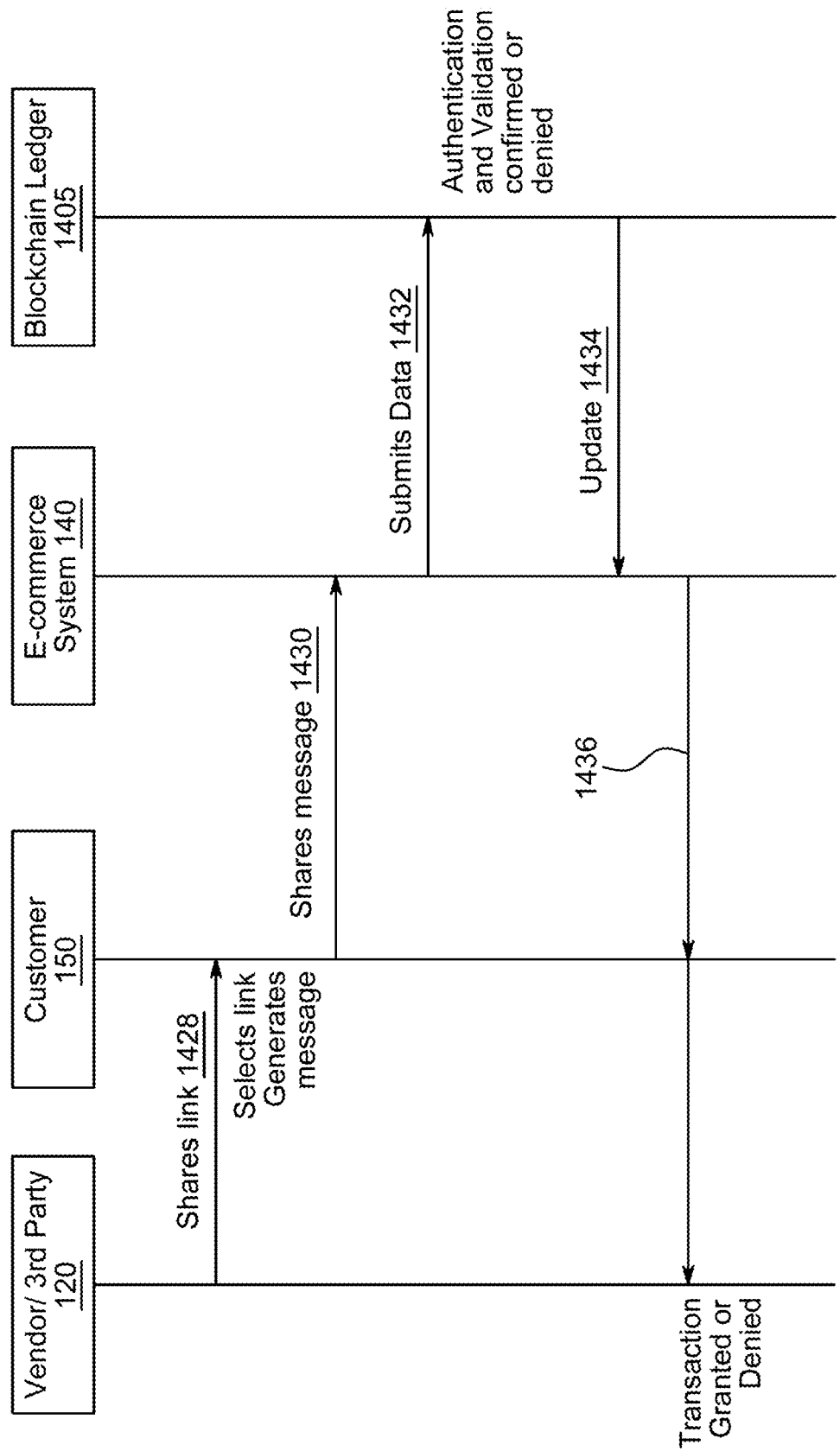
FIG. 14C is a transactional flow diagram describing a messaging system for gaining access to a secure server via email-based authentication login with blockchain.

FIG. 14C is a transactional flow diagram describing a messaging system for gaining access to a secure server via email-based authentication login with blockchain. The vendor system 120 shares (1428) a login link with the customer device 150. This link may be a mailto link or a URL link that delivers the mailto link. The mailto link may include a token. The customer device 150 generates and sends (1430) an email to the e-commerce system 140. Where a token is required, the token may be anywhere in the email. The customer may be required to send the message by selecting the send button however the sending of the email may be automated and the customer may not need to take any action for the email message to be sent. The e-commerce system 140 may perform authentication and validation of the message. The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC (Domain-based Message Authentication, Reporting & Conformance). 3) Assurance against DNS attacks, by monitoring the fidelity of DNS records. To insure the fidelity of the DNS record the e-commerce system 140 utilizes a fidelity algorithm to monitor changes to the DNS record as described in FIG. 8.

Based on the changes to the DNS record, the e-commerce system 140 may take various actions in response. If the message is determined to be insecure additional confirmations may be sent to the customer and alerts sent to the vendor and/or domains. If the message is determined to be secure and authenticated, the transaction proceeds. The DNS Record Monitor may not be required. Authentication may be limited to DKIM, DMARC or SPF path-base authentication. Only one form of authentication be required. The e-commerce system 140 authenticates the digital signature in the customer email.

The data is shared (1432) with the blockchain ledger 1405. The above described recording and authentication of the may also be submitted to the blockchain or a function of the blockchain. A series of authentication and validations maybe performed. In order to proceed a valid block may be required to be generated. Alternatively the transaction may require a confirmation of pre-existing content in the blockchain or the lack of content. The blockchain ledger 1405 confirms or denies the transaction. The blockchain ledger 1405 updates (1434) the e-commerce system 140 with the status of the transaction. The e-commerce system 140 may grant the transaction to the vendor or the customer. The transaction may be granted to more than one party.

Alternatively the e-commerce system 140 updates (1434) the vendor or third party or customer system of the status of the transaction. The vendor system 120 or third party or customer may grant (1436) the transaction. The vendor system 120 or third party or customer may take a variety of actions based on the status of the transaction. The vendor system 120 or customer grants or denies the requested transaction. For example a transaction may be granting access to a secure server, payment processing control of a digital currency, record keeping, securities or contracts.

Figure 14D:
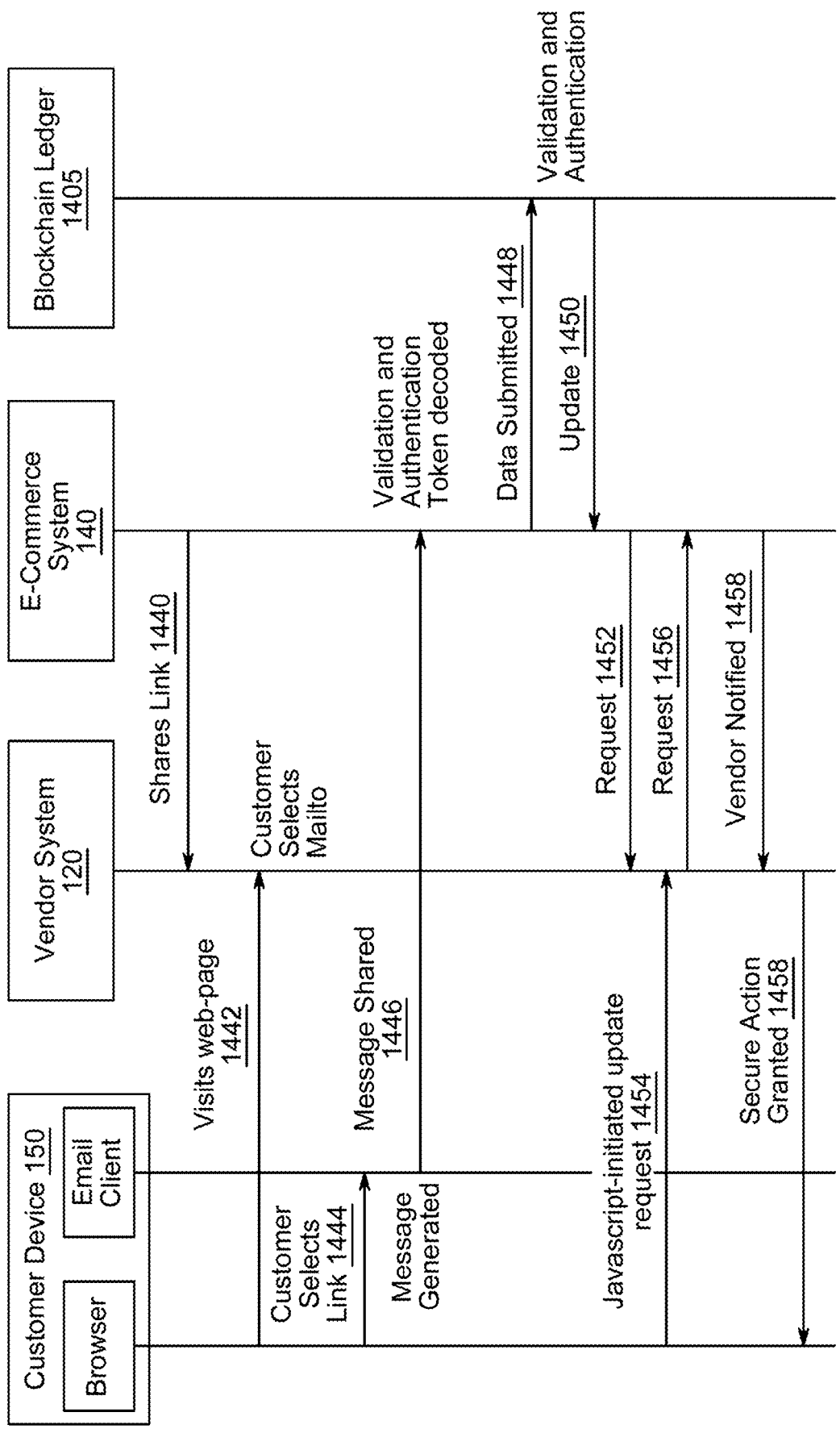
FIG. 14D is a diagram illustrating the flow of transactions between the e-commerce system 140, the vendor and the customer device for granting a secure transaction without a password using a JavaScript with blockchain.

FIG. 14D is a diagram illustrating the flow of transactions between the e-commerce system 140, the vendor system 120 and the customer device 150 for granting a secure transaction without a password using a JavaScript with blockchain. The e-commerce system 140 may generate mailto links and tokens for the purpose of authenticating customers for secure online transactions such as secure login.

The e-commerce system 140 shares (1440) the mailto login link and token with the vendor system 120. Alternatively the e-commerce may host a page for the vendor where the customer may access the link and token. The mailto login link is accessed (1442) by the browser unit of the customer device 150. The customer selects (1444) the mailto link using the browser unit of the customer device 150. The link causes the email client of the customer device 150 to generate and send (1446) an email message addressed to the e-commerce system 140 at the email client. The email message may contain the token. The token may be anywhere in the email message. The token may be part of the email address. The customer may select 'Send' to transmit the message to the e-commerce system 140. Alternatively the message may be sent automatically. The e-commerce system 140 performs a series of checks and authentication. The e-commerce system 140 authenticates the email using the digital signature. These include but are not limited to the following. 1) Verification of digital signature, Uses DKIM (DomainKey Identified Mail) protocol 2) Verification of secure path, Uses SPF (Sender Policy Framework) protocol which tracks the path of every email message, from server to server, to ensure authenticity. The e-commerce system 140 may perform a check based on DMARC (Domain-based Message Authentication, Reporting & Conformance). 3) Assurance against DNS attacks, by monitoring the fidelity of DNS records. To insure the fidelity of the DNS record the e-commerce system 140 utilizes a fidelity algorithm to monitor changes to the DNS record as described in FIG. 8. The DNS Record Monitor may not be required. Authentication may be limited to DKIM, DMARC or SPF path-base authentication. Only one form of authentication be required. The e-commerce system 140 authenticates the digital signature in the customer email.

Based on the changes to the DNS record, the e-commerce system 140 may take various actions in response. If the message is determined to be insecure additional confirmations may be sent to the customer and alerts sent to the vendor and/or domains. The token is decoded.

The e-commerce system 140 may determine that a submission to a blockchain ledger 1405 is required. The e-commerce system 140 may submit (1448) data to the blockchain ledger 1405. A series of authentication and validations maybe performed. In order to proceed a valid block may be required to be generated. Alternatively the transaction may require a confirmation of pre-existing content in the blockchain or the lack of content. The blockchain ledger 1405 confirms or denies the transaction.

The blockchain ledger 1405 updates (1450) the e-commerce system 140 with the status of the transaction. If the message is determined to be secure and authenticated, the transaction proceeds and the e-commerce system 140 is updated. The browser unit of the customer device 150 shares (1454) a Javascripted initiated update request with the vendor system 120. The vendor system 120 submits (1456) a request to the e-commerce system 140. The e-commerce system 140 notifies (1458) the vendor system 120 on the status of the authentication. The vendor system 120 grants the user device 150 access by shares the login link with the customer device 150 granting secure access. Although in this example grants access to a secure webpage it is an example only. Various secure transactions may be granted and the blockchain ledger 1405 may be updated based on several exchanges over the secure channel initiated between the ecommerce, customer and vendor. A secure transaction could be access to a secure server, secure website, payment processing, control of a digital currency, record keeping, securities and/or contracts. Alternatively the system could enable the customer to grant access to other parties. The process of granting access to a customer may allow access to more than one account and more than one customer. Alternatively the customer may utilize the authentication notification and grant access to a third party vendor. Alternatively or additional in some configurations additional factors of authentication may be applied as described in FIG. 9A.

Figure 14E:
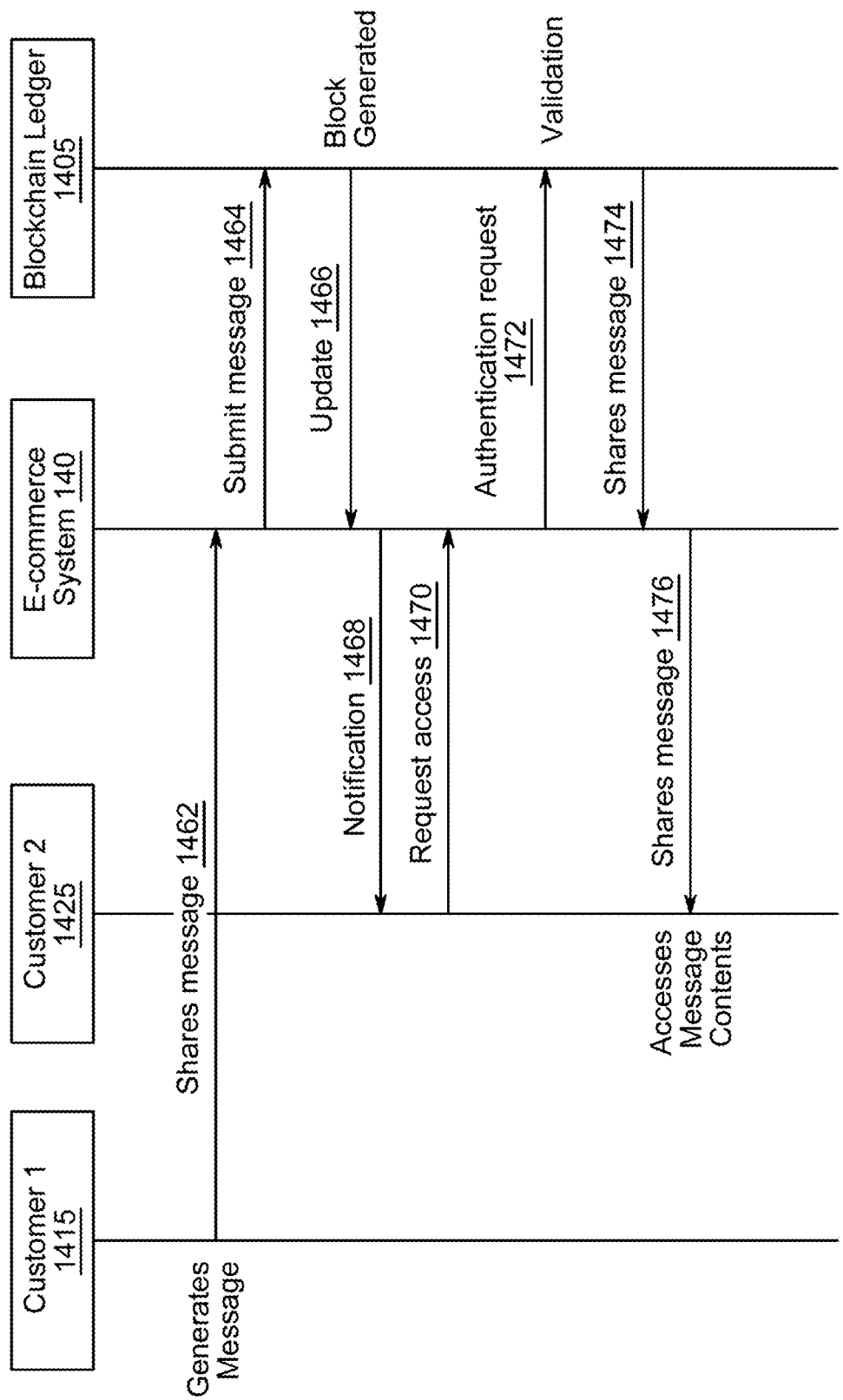
FIG. 14E is a transactional flow diagram describing a messaging system where customers, vendors and the ecommerce system can send a receive messages secured by a blockchain.

FIG. 14E is a transactional flow diagram describing a messaging system where customer devices 150, vendor system 120 and the e-commerce system 140 can send a receive messages secured by a blockchain. The e-commerce system 140 facilitates a messaging system where message content are secured in a blockchain ledger 1405. In this example customer 1 1415 is the sender of a message, customer 2 1425 is the receiver. The e-commerce system 140 manages the messages and monitors and manages access to the blockchain.

Customer 1 1415 generates a message and shares (1462) that message with the e-commerce system 140. This may be done on a secure web browser or application. The e-commerce system 140 may manage the public and private keys for the customer or keys may be provided by the Customer 1 1415. In the case of a distributed network the e-commerce system 140 may not have direct access to the message contents but only manages access to the blockchain ledger 1405 for the customer and vendors. The e-commerce system 140 submits (1464) the message to the blockchain ledger 1405. The block containing the message and hash and previous hash are generated at the blockchain ledger 1405. The blockchain ledger 1405 updates (1466) the e-commerce system 140. The e-commerce system 140 may notify (1468) Customer 2 1425 who is the intended receiver of the message that a message is posted for them on the blockchain. Alternatively the notification may be the message. Alternatively the customer device 150 of Customer 2 1425 may query the system to see if there are messages waiting. The Customer 2 1425 may request access to the message through providing a private key, a separate pin, email authentication and/or password. The customer device 150 of Customer 2 1425 requests (1470) access to the blockchain from the e-commerce system 140. This may happen in an automated fashion where no action is required from the Customer 2 1425 but is a function of an application. The e-commerce system 140 authenticates the request. The e-commerce system 140 request (1472) the message from the blockchain ledger 1405 by providing the private key. The blockchain ledger 1405 validates and authenticates the key and shares (1474) the message with e-commerce system 140. The e-commerce system 140 shares (1476) the message with the customer device 150 of Customer 2 1425. The message originating from device 150 of Customer 1 1415 is accessed at the Customer 2 1425.

One advantage to using email-based authentication with blockchain is the streamlining of negotiating and entering into contractual agreements without the necessity of a physical paper document. In this disclose invention the email authentication and a blockchain serve as a digital signature for all parties.

Figure 14F:
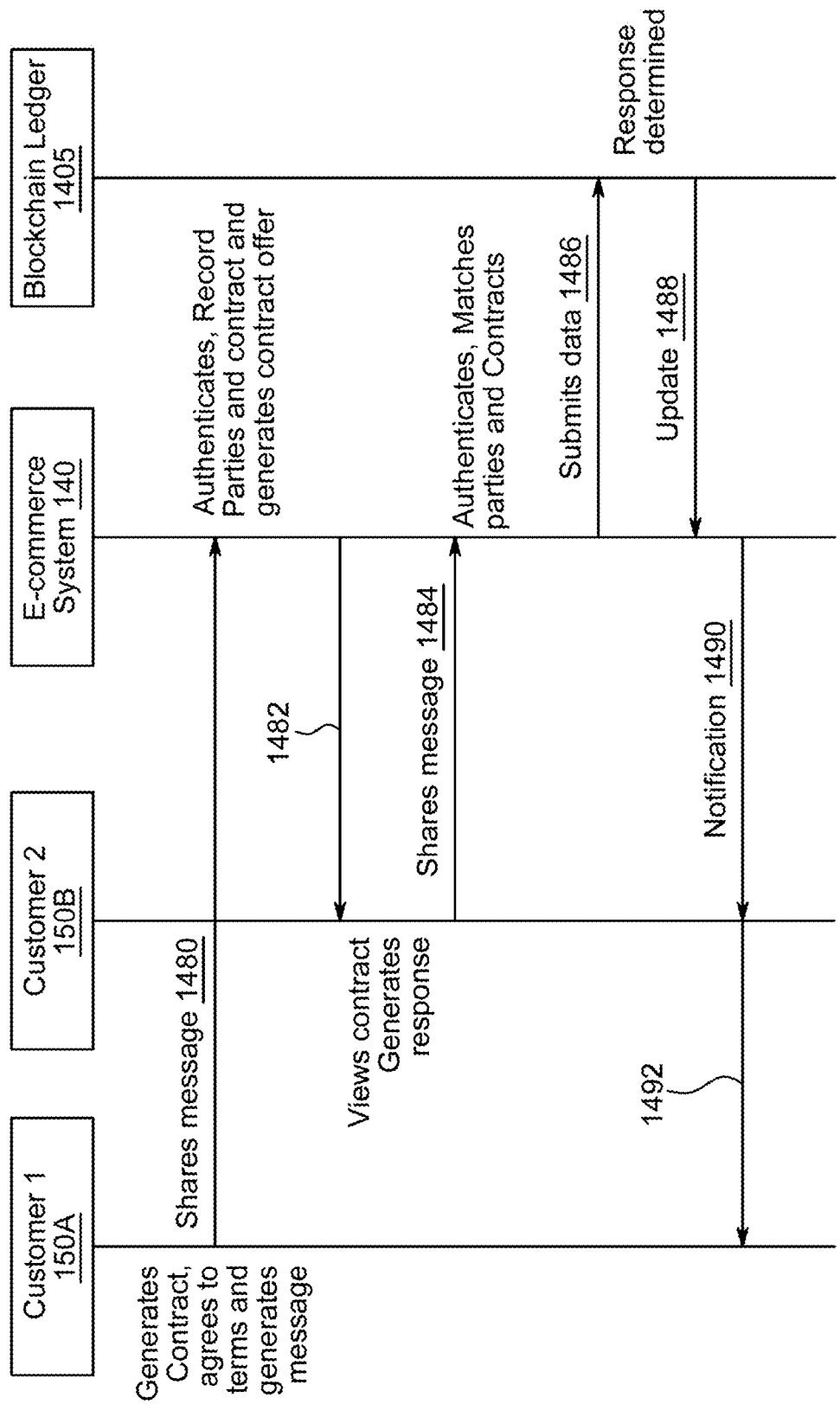
FIG. 14F is a transactional flow diagram describing a messaging system where customers, vendors and the e-commerce system 140 can enter into a contract secured by blockchain.

FIG. 14F is a transactional flow diagram describing a messaging system where customer devices 150A, 150B and the e-commerce system 140 can enter into a contract secured by blockchain. The e-commerce system 140 manages contractual agreements between parties using a messaging system. The messages may be SMTP email, SMS or social media messages. In this example they are email-based messages. The e-commerce system 140 receives updated contracts in messages and authenticates the user identities and are secured in a blockchain ledger 1405. The blockchain may be centralized network or decentralized. In this example the contract is between Customer 1 1415 and Customer 2 1425.

Alternatively the contract could include any number of parties, such as any numbers of customers, vendors or the e-commerce system 140. The contract may consist of the written text within the message, an attached document, publicly known agreement such as a law or a token. The contract may be made available to Customer 1 1415 by a message or by accessing the contact on a web browser or other application using customer device 150A. The web browser of application or email client application may present a mailto or URL link that generates a message that contains the contract and a token. The Customer 1 1415 may be presented with a series of links that represent options such as "Agree" entering into the contract with Customer 2, "Decline" choosing not to enter into the contract with customer 2, or "Edit" that allows customer 1 to update the text of the contract. Each link may have a corresponding token.

Customer 1 Device 150A generates a message with a contract and token, agrees to the terms of the contract and shares (1480) that message and contact with the e-commerce system 140. Alternatively, agreeing to the contract may only require the sending of the message and may function as a signature. In the present example, the customer select the link and generates an email response. The e-commerce system 140 receives the message, authenticates, validates and may decode a token if present. The e-commerce system 140 determines that Customer 1 1415 has agreed to the terms of the contract. The e-commerce system 140 then generates and sends (1482) an offer email addressed to Customer 2 device 150B that confirms that customer 1 has agreed to the terms and includes an example of the contractual agreement.

The token contained in this message may contain update based on the contracts progress, Customer 2 1425 views the message and contract. Customer 2 1425 may be offered the same choices as customer one such as Agree, Decline or Edit. These options may be in the form of a link. Responding to the contract may take multiple forms. It may require a written response within the message or document. It may require selecting a link, such as a URL or mailto link that generates the response message.

Alternatively, agreeing to the contract may only require the sending of the message and may function as a signature.

Customer 2 Device 150B generates a response message with contract and token and shares (1484) it with the e-commerce system 140.

The e-commerce system 140 authenticates and validates the message and decodes a token. The e-commerce system 140 may perform a series of lookups to determine the parties that are required to respond and to insure that the contracts are unchanged and the agreement conditions are met. In the case where the contract is separate from the message such as an attachment the attachment may contain a token which is later decoded. This may also be checked against the blockchain ledger 1405. If requirements are not met the e-commerce system 140 may reject the agreement and notify the parties that the contract requires further negotiation or that there is a breach in security. If requirements are met the e-commerce system 140 may submit (1486) the contract data to the blockchain ledger 1405. The e-commerce system 140 may manage the public and private keys for the customer or keys may be provided by the customers. In the case of a distributed network the e-commerce system 140 may not have direct access to the message contents but only manages access to the blockchain ledger 1405 for the customer and vendors.

The e-commerce system 140 submits the data to the blockchain. The block containing the message and hash and previous hash are generated at the blockchain ledger 1405. The blockchain ledger 1405 updates (1488) the e-commerce system 140. The e-commerce system 140 may submit the content of the contract as well as the email authentication data described in FIGS. 7 and 8.

The submission to the blockchain secures the contract content the messaging content and message authentication. The blockchain ledger 1405 updates (1486) the e-commerce system 140. The e-commerce system 140 may notify (1490) Customer 1 1415 and may notify (1492) Customer 2 1425 of the status contract agreement. The content of the agreement may be coded directly in the blockchain ledger 1405. The contract may be triggered by an event or set to be initiated or nullified based on certain conditions being met. For example it may be set to initiate at a certain date. Additional notifications may be sent based on those conditions. The e-commerce system 140 may manage the agreements but may provide anonymity to the parties, customers and vendors. The payment methods described in this disclosure may be integrated into the contractual process. For example in the case where a contract requires a payment as a part of the agreement and/or where if entering into a legal agreement requires a minimum economic transaction.

Figure 14G:
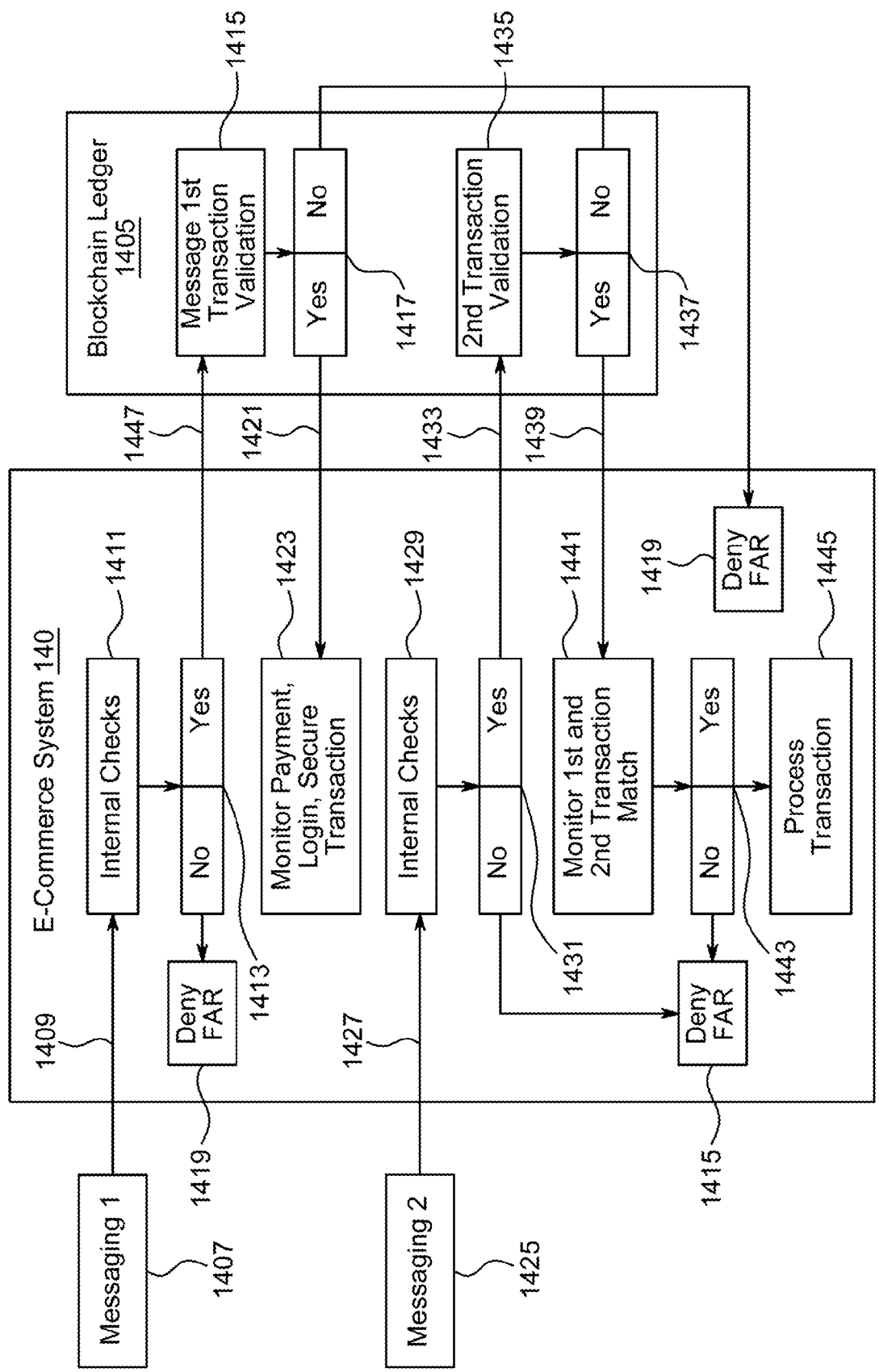
FIG. 14G is an illustration of the flow of transactions for email based authentication login where multiple transactions on a blockchain are monitored.

FIG. 14G is an illustration of the flow of transactions for email based authentication login where multiple transactions on a blockchain are monitored. A customer generates a first email message 1407 addressed to the e-commerce system 140. In this disclosure multiple different types of transactions are secured by blockchain through a single email account. The customer device 150 shares (1409) the message with the e-commerce system 140. The e-commerce system 140 may engage in internal checks and authentications (1411) of the message to determine if the message 1047 is secure. If the determination (1413) is 'NO' then the first message 1407 is not secure and further action is required (FAR) (1419) by e-commerce system 140, the customer device 150 or vendor system 120. If the determination (1413) is 'YES' is then the first message 1407 is determined as secure and the data is submitted (1447) to the blockchain ledger 1405. The blockchain ledger 105 then validates (1415) the block. The determination (1417) of 'NO' is a block that is not secure and further action is required (FAR)(1415) by the e-commerce system 140, customer device 150 or vendor system 120. The determination (1417) of 'YES' is a message determined as secure and notifies (1421) the monitor at the e-commerce system 140. The monitor may check (1423) that the current authentication against previous authentications either in the blockchain or other checks to ensure security. The message is determined secure and the transaction or login is granted.

A customer device 150 then generates a second email message 1425 and sends (1427) the second email message 1425 to the e-commerce system 140. The e-commerce system 140 then may engage in internal checks and authentications (1429) of the second message 1425 to determine if the message is secure. The determination (1431) of 'NO' the second message 1425 is not secure and further action is required (FAR) (1415) by the customer or vendor. The determination (1431) of 'YES' is a message determined as secure and the data is submitted (1433) to the blockchain ledger 1405. The blockchain ledger 1405 validates (1435) the block. The determination (1437) of 'NO' is a block that is not secure and further action is required (FAR) (1415) by the e-commerce system 140, customer device 150 or vendor system 120. The determination (1437) of YES' is the second message 1425 determined as secure and notifies (1439) the monitor at the e-commerce system 140. The monitor may check (1441) the request against previous requests. In this example the second message authentication requires the first message authentication in order to proceed. The monitor determines (1441) that the first and the second authentication timestamps occurred in the proper order and that all requirements are met. If the determination (1443) of 'NO' the second message 1425 is not secure and further action is required (FAR) (1415) by the customer device 150 or vendor system 120. If the determination (1443) of 'YES' the second message 1425 is secure transaction and the transaction is processed (1445) or login is granted. The monitor may send alerts to the customer based on set criteria such as an amount requested to be withdrawn from a bank account or agreements with a series of parties.

One benefit of using an email-based authentication method with blockchain is that all transaction and blockchain validations maybe centralized to a single email account. This enables the customer to open secure accounts with multiple vendors but use a single email address for authentication and blockchain. The blockchain can validate the email messaging as well as additional transactions associated with that email account.

Figure 14H:
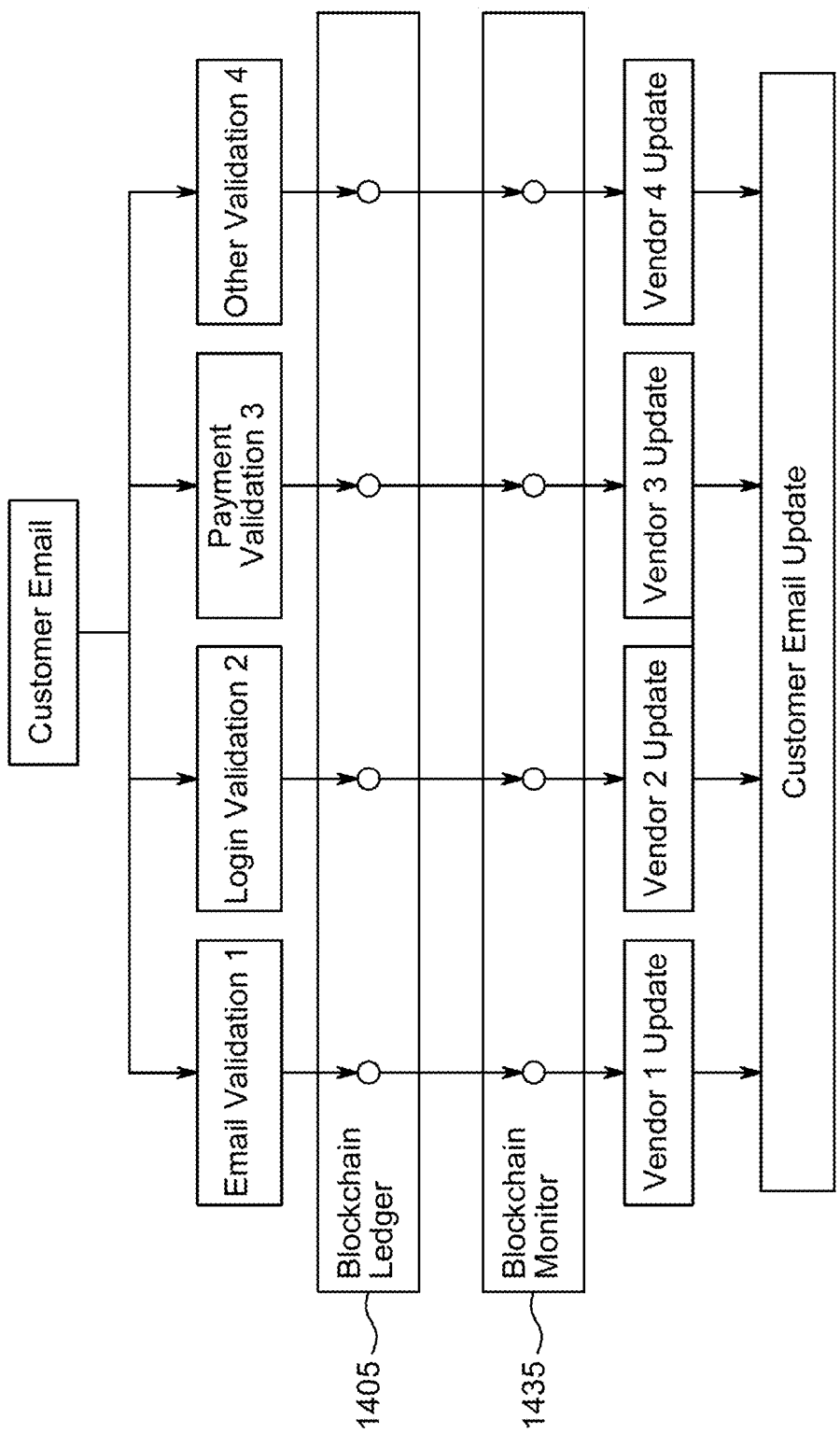
FIG. 14H is a diagram illustrating the use of a blockchain under a single email account with multiple vendor accounts for email based secure login.

FIG. 14H is a diagram illustrating the use of a blockchain under a single email account with multiple vendor accounts for email based secure login. Based on the customer email address multiple vendor accounts are established. Each vendor requires an authentication to access a secure page or process. Validation 1 may consist of the email message being authenticated and validated by blockchain process. An example of this may be similar to the process described in FIG. 14B. When a message login request is authenticated it is shared with the blockchain for validation and authentication. It may require more than one blockchain to validate and authentication. In this example a single blockchain is used on a distributed network for all the vendors. A single blockchain that ties various email authentications together may have a significant benefit. A single blockchain ledger 1405 is designed where each blocks data can accommodate various types of transactions. Various forms of data such as message authentication, payment transactions or secure login may be in the data of a block. More than one transaction may be required to logically accomplish a task.

For example a customer may need to gain access to a site before they are charged for a product. The blockchain might reject a transaction where the sequence is not in order. Insufficient funds, accounts determined to not be secure or duplicate transactions among other may result in a rejection status. Results are monitored by the blockchain monitor 1435 and updates are provided to the vendors and the customer. In an instance where one vendor account is determine not secure the other vendor accounts may be notified and or the email authentication at the e-commerce system 140 may place a hold on the account until the customers can confirm the transactions.

Figure 14I:
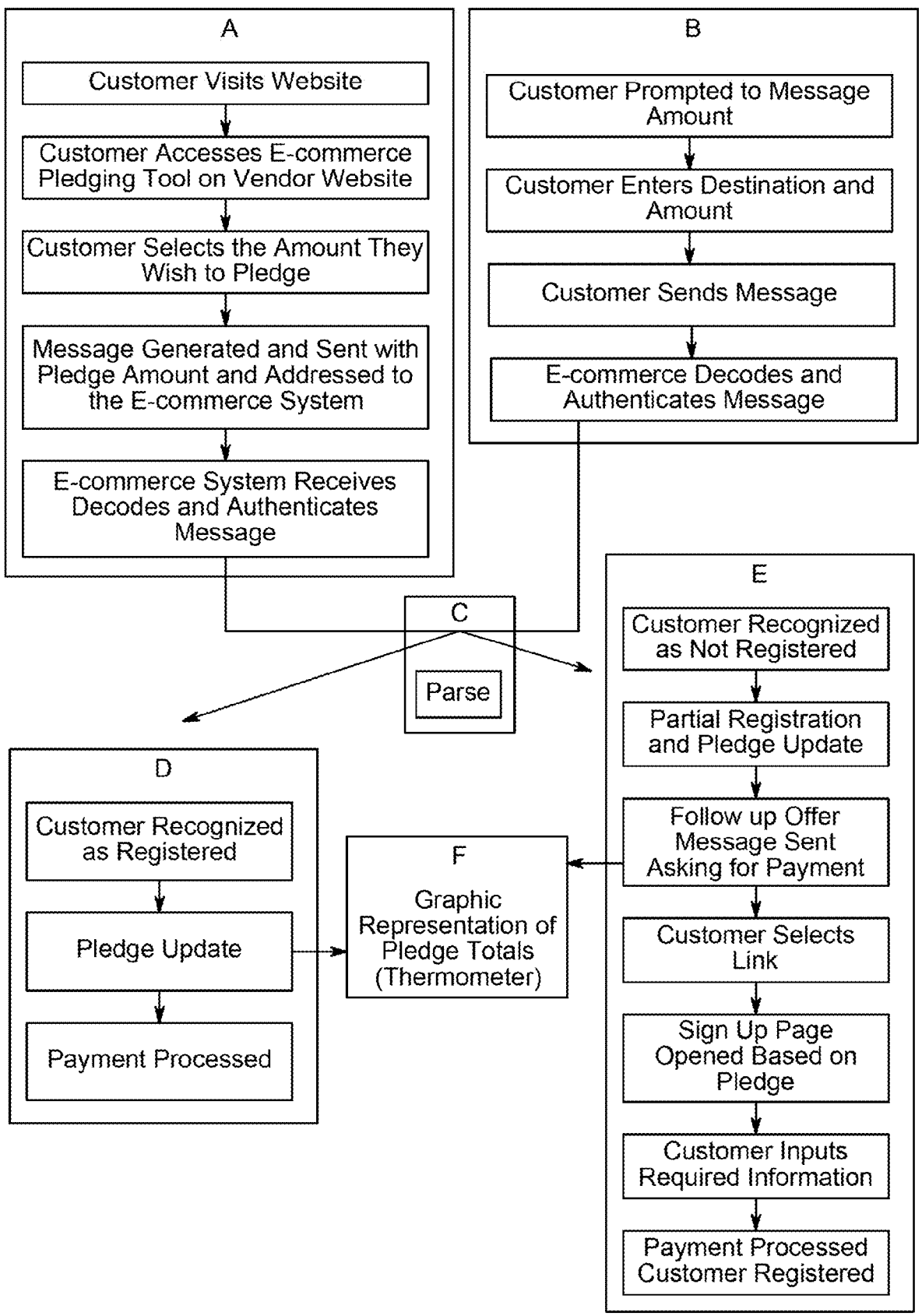
FIG. 14I is a diagram illustrating the steps required for the e-commerce system to process pledges and provide updates and payment options.

FIG. 14I is a diagram illustrating the steps required for the e-commerce system 140 to process pledges and provide updates and payment options. Pledges are the expression of the desire or promise to make a payment and has an additional value to vendors beyond the eventual monetary payment. Alternatively a pledge may include a promise to take action. For vendors, pledges are a way to gauge how many or how much a customer is able or willing to donate or purchase. Additionally this data adds value to marketing campaigns and often spurs customer participation in fundraisers and sales. The disclosed invention integrates a series of marketing tools for collecting pledges and integrates them into a payment platform. FIGS. 3A and B illustrate methods where a customer may make a pledge. Section A illustrates a hosted web page, iframe, JavaScript connection or other method of establishing a secure channel with a customer. The customer using the customer device 150 accesses the vendor's website using a web browser or other application. The customer accesses the pledging tool which may be an iframe inserted on the page or another format that establishes a secure channel or as its own webpage hosted by the e-commerce system 140 but appears as part of the vendor's site. In one example, this may be a series of mailto links each associated with a different amount the customer may wish to pledge. Alternatively, the customer may be able to enter an amount they wish to pledge and a specific link is generated for them by the e-commerce system 140. The customer selects the amount they wish to pledge. The customer using the customer device 150 selects the mailto link and triggers the email client to open. Using the email client, the response email is generated and is addressed to the e-commerce system 140 and may include a token. The token may be anywhere in the email. The customer sends the email sharing the token with the e-commerce system 140. The e-commerce system 140 authenticates the email and decodes the token. The e-commerce receives the message authenticates and decodes the message. Alternatively, the customer may enter their information on the vendor's webpage and submit the information via a webpage. Alternatively a transaction may be completed as described in FIGS. 14B-14G.

Section B illustrates a method where the customer is prompted to message the e-commerce system 140 their pledge. This prompt may be verbal, print based, email, SMS, social media based or other form of messaging. The prompt requires the customer using the customer device 150 to message to a specific address. This address is managed by the e-commerce system 140. The customer enters address of the e-commerce system 140 and the amount they wish to pledge. The entering of address and amount may be automated. The customer sends the message. The e-commerce system 140 receives the message decodes tokens if tokens are present and authenticates the message.

Section C describes the step where all pledges from customers are parsed based on whether the customers are registered or not registered with the e-commerce system 140.

Section D describes the process for a customer registered with the e-commerce system 140. The customer is recognized as registered with the e-commerce system 140. The customer pledge is updated to the vendors campaign based on the amount the customer chose to pledge. Based on the customer's status as registered with the e-commerce system 140 the e-commerce system 140 may process the payment based on the pledge amount. Alternatively the e-commerce system 140 may message the user a confirmation message requiring a response to the e-commerce system 140 to complete the payment.

Section E describes the process for a customer not registered with the e-commerce system 140. The e-commerce system 140 recognizes that the customer is not registered. The customer is categorized as partially registered. The customer pledge is updated to the vendor's campaign based on the amount the customer chose to pledge and the address of the customer. Based on the customer's status as partially registered with the e-commerce system 140, the e-commerce system 140 generates a follow up offer message and sends it on behalf of the vendor. This message may have a link included in the message. The customer using the customer device 150 accesses the message and the customer selects the link. By selecting the link the browser application is triggered on the customer's device and opens a signup web page based on the pledge amount. The customer enters the required information for the payment and the customer submits the information for payment. If all requirements are met then the e-commerce system 140 processes the payment.

Section F describes the e-commerce system 140 providing updates on the campaign's status. Based on the campaign requirements the e-commerce system 140 may periodically update the vendor and customer on the amounts pledged. For example the e-commerce system 140 may provide a graph displaying the amount pledged up to that point. The customer may receive these from the vendor or the e-commerce system 140. The vendor may have the capacity to limit information that customers can access based on registration factors. Alternatively or additionally this updated information may be applied in marketing analysis and data mining.

Figure 15:
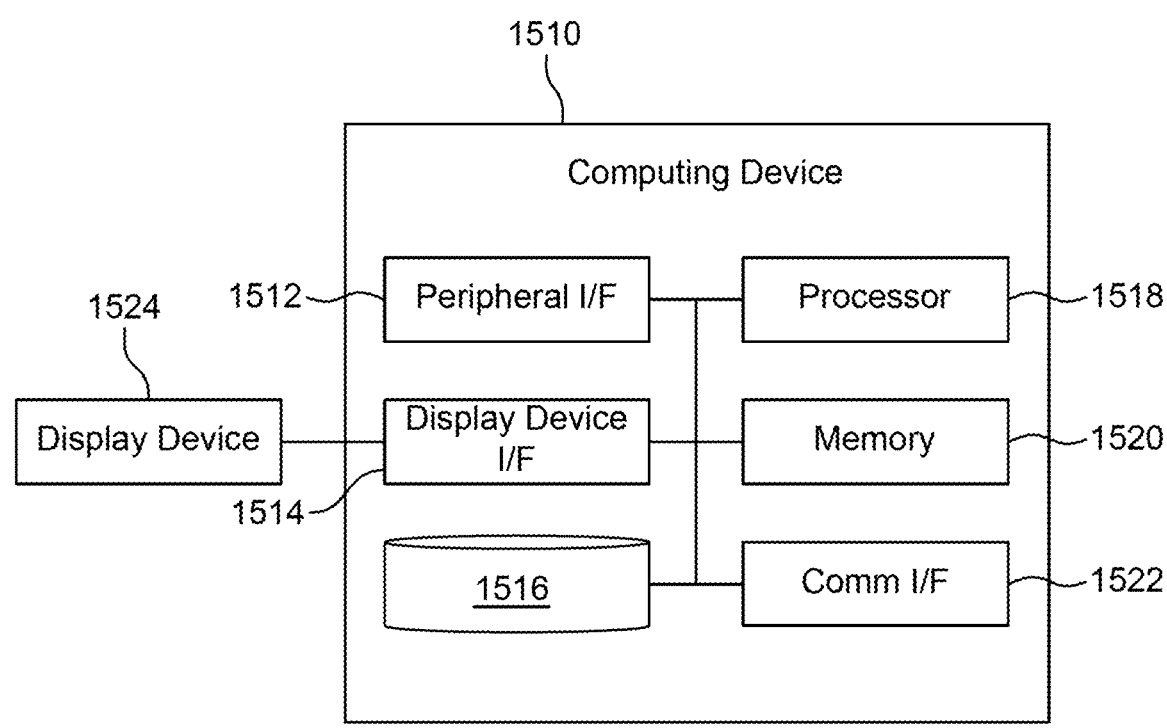
FIG. 15 shows an example computing device that may be used to implement features describe above with reference to FIGS. 1-14.

FIG. 15 shows an example computing device 1510 that may be used to implement features describe above with reference to FIGS. 1-14. The computing device 1510 includes a processor 1518, memory device 1520, communication interface 1522, peripheral device interface 1512, display device interface 1514, and data storage device 1516. FIG. 15 also shows a display device 1524, which may be coupled to or included within the computing device 1510.

The memory device 1520 may be or include a device such as a Dynamic Random Access Memory (D-RAM), Static RAM (S-RAM), or other RAM or a flash memory. The data storage device 1516 may be or include a hard disk, a magneto-optical medium, an optical medium such as a CD-ROM, a digital versatile disk (DVDs), or Blu-Ray disc (BD), or other type of device for electronic data storage.

The communication interface 1522 may be, for example, a communications port, a wired transceiver, a wireless transceiver, and/or a network card. The communication interface 1522 may be capable of communicating using technologies such as Ethernet, fiber optics, microwave, xDSL (Digital Subscriber Line), Wireless Local Area Network (WLAN) technology, wireless cellular technology, and/or any other appropriate technology.

The peripheral device interface 1512 is configured to communicate with one or more peripheral devices. The peripheral device interface 1512 operates using a technology such as Universal Serial Bus (USB), PS/2, Bluetooth, infrared, serial port, parallel port, and/or other appropriate technology. The peripheral device interface 1512 may, for example, receive input data from an input device such as a keyboard, a mouse, a trackball, a touch screen, a touch pad, a stylus pad, and/or other device. Alternatively or additionally, the peripheral device interface 1512 may communicate output data to a printer that is attached to the computing device 1510 via the peripheral device interface 1512.

The display device interface 1514 may be an interface configured to communicate data to display device 1524. The display device 1524 may be, for example, a monitor or television display, a plasma display, a liquid crystal display (LCD), and/or a display based on a technology such as front or rear projection, light emitting diodes (LEDs), organic light-emitting diodes (OLEDs), or Digital Light Processing (DLP). The display device interface 1514 may operate using technology such as Video Graphics Array (VGA), Super VGA (S-VGA), Digital Visual Interface (DVI), High-Definition Multimedia Interface (HDMI), or other appropriate technology. The display device interface 1514 may communicate display data from the processor 1518 to the display device 1524 for display by the display device 1224. As shown in FIG. 15, the display device 1524 may be external to the computing device 1210, and coupled to the computing device 1510 via the display device interface 1514. Alternatively, the display device 1524 may be included in the computing device 1500.

An instance of the computing device 1510 of FIG. 15 may be configured to perform any feature or any combination of features described above as performed by the customer device 150. Alternatively or additionally, the memory device 1520 and/or the data storage device 1516 may store instructions which, when executed by the processor 1518, cause the processor 1518 to perform any feature or any combination of features described above. Alternatively or additionally, each or any of the features described above may be performed by the processor 1518 in conjunction with the memory device 1520, communication interface 1522, peripheral device interface 1512, display device interface 1514, and/or storage device 1516.

As used herein, the term "processor" broadly refers to and is not limited to a single- or multi-core processor, a special purpose processor, a conventional processor, a Graphics Processing Unit (GPU), a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

As used to herein, the term "computer-readable medium" broadly refers to and is not limited to a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVDs, or BD, or other type of device for electronic data storage.

Although the methods and features are described above with reference to the example architecture of FIG. 1, the methods and features described above may be performed, mutatis mutandis, using any appropriate architecture and/or computing environment. Further although certain functions have been described as being performed by the hardware of the e-commerce system 140 or the vendor system 120, a person skilled in the art would appreciate that in some instances the functions are implemented in software or a combination of hardware and software. In addition, in certain instances, the functions described with respect to the e-commerce system 140 may be performed by the vendor system 120. In other instances some of the functions described as being implemented by the vendor system may be implemented by the e-commerce system 140.

Although features and elements are described above in particular combinations, each feature or element can be used alone or in any combination with or without the other features and elements. For example, each feature or element as described above with reference to FIGS. 1-15 may be used alone without the other features and elements or in various combinations with or without other features and elements. Sub-elements and/or sub-steps of the methods described above with reference to FIGS. 1-15 may be performed in any arbitrary order (including concurrently), in any combination or sub-combination.

Although features and elements are described above in particular combinations, one of ordinary skill in the art will appreciate that each feature or element can be used alone or in any combination with or without the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A method for improving security of a computer system by limiting an ability of a user to access a secure webpage utilizing Simple Mail Transfer Protocol (SMTP), the method comprising:
displaying an image on a webpage that contains an embedded mailto link that, when activated by the user, generates a request to access the secure webpage, wherein the request is generated outside of a browser-based form submission and is an email that is transmitted to an e-commerce system using an email client;
receiving a message from the e-commerce system in response to the user activating the embedded mailto link, wherein the message contains a result of an authentication performed by the e-commerce system;
granting the user access to the secure webpage in response to the result of the authentication indicating the user was successfully authenticated, wherein the secure webpage is conditionally accessible only after receiving the result of the authentication; and
denying the user access to the secure webpage in response to the result of the authentication indicating the user was not successfully authenticated;
wherein the authentication includes:
confirming a sender of the email, and
validating the user based on a unique identifier contained in the email, wherein the unique identifier is unique to the request.

2. The method according to claim 1, wherein the confirming is performed using at least one of Domain Key Identified Mail (DKIM) authentication or Domain-based Message Authentication, Reporting & Conformance (DMARC).

3. The method according to claim 1, wherein the authentication further comprises:
verifying fidelity of a Domain Name System (DNS) record for the sender of the email.

4. The method according to claim 3, wherein the verifying is performed using Sender Policy Framework (SPF) protocol.

5. The method according to claim 1, wherein the confirming is performed by searching a blockchain ledger for the unique identifier.

6. The method according to claim 5, wherein the blockchain ledger is updated after the user is authenticated.

7. The method according to claim 1, wherein:
the image is displayed on a first webpage and
the granting includes automatically changing from the first webpage to a second webpage.

8. The method according to claim 7, wherein the secure webpage contains information that is unique to the user.

9. The method according to claim 1, wherein a secure channel to a device of the user is established utilizing WebSockets.

10. A system for improving security of a computer system by limiting an ability of a user to access a secure webpage utilizing Simple Mail Transfer Protocol (SMTP), the system comprising:
a communication interface that is communicatively coupled to a device of the user and an e-commerce system via a network;
a memory; and
one or more processors communicatively coupled to the communication interface and the memory;
wherein the one or more processors are collectively configured to:
display an image on a webpage that contains an embedded mailto link that when activated by the user generates a request to access the secure webpage, wherein the request is generated outside of a browser-based form submission and is an email that is transmitted to the e-commerce system using an email client;
receive a message from the e-commerce system in response to the user activating the embedded mailto link, wherein the message contains a result of an authentication performed by the e-commerce system
grant the user access to the secure webpage in response to the result of the authentication indicating the user was successfully authenticated, wherein the secure webpage is conditionally accessible only after receiving the result of the authentication; and
deny the user access to the secure webpage in response to the result of the authentication indicating the user was not successfully authenticated;
wherein the authentication includes:
confirming a sender of the email, and
validating the user based on a unique identifier contained in the email, wherein the unique identifier is unique to the request.

11. The system according to claim 10, wherein the one or more processors confirm the sender by performing at least one of Domain Key Identified Mail (DKIM) authentication or Domain-based Message Authentication, Reporting & Conformance (DMARC).

12. The system according to claim 10, wherein the authentication further comprises:
verifying fidelity of a Domain Name System (DNS) record for the sender of the email.

13. The system according to claim 12, wherein the verifying is performed using Sender Policy Framework (SPF) protocol.

14. The system according to claim 10, wherein the sender is confirmed by searching a blockchain ledger for the unique identifier.

15. The system according to claim 14, wherein the blockchain ledger is updated after the user is authenticated.

16. The system according to claim 10, wherein:
the image is displayed on a first webpage and
the one or more processors collectively change a page that is displayed to the user from the first webpage to a second webpage in response to the grant.

17. The system according to claim 16, wherein the secure webpage contains information that is unique to the user.

18. A non-transitory computer readable storage medium storing instructions for improving security of a computer system by limiting an ability of a user to access a secure webpage utilizing Simple Mail Transfer Protocol (SMTP), the instructions when executed by a processor, cause the processor to execute a method comprising:
displaying an image on a webpage that contains an embedded mailto link that, when activated by the user, generates a request to access the secure webpage, wherein the request is generated outside of a browser-based form submission and is an email that is transmitted to an e-commerce system using an email client;
receiving a message from the e-commerce system in response to the user activating the embedded mailto link, wherein the message contains a result of an authentication performed by the e-commerce system;
granting the user access to the secure webpage in response to the result of the authentication indicating the user was successfully authenticated, wherein the secure webpage is conditionally accessible only after receiving the result of the authentication; and
denying the user access to the secure webpage in response to the result of the authentication indicating the user was not successfully authenticated;
wherein the authentication includes:
confirming a sender of the email, and
validating the user based on a unique identifier contained in the email, wherein the unique identifier is unique to the request.

19. The non-transitory computer readable storage medium according to claim 18, wherein the confirming is performed using at least one of Domain Key Identified Mail (DKIM) authentication or Domain-based Message Authentication, Reporting & Conformance (DMARC).

20. The computer readable storage medium according to claim 18, wherein the authentication further comprises:
verifying, by the e-commerce system, fidelity of a Domain Name System (DNS) record for the sender of the email.

* * * * *